(12) United States Patent
Smith

(10) Patent No.: US 9,144,358 B2
(45) Date of Patent: *Sep. 29, 2015

(54) MOTOR, FAN AND DIRT SEPARATION MEANS ARRANGEMENT

(71) Applicant: BLACK & DECKER INC., Newark, DE (US)

(72) Inventor: Kevin Smith, Durham (GB)

(73) Assignee: BLACK & DECKER INC., Newark, DE (US)

( * ) Notice: Subject to any disclaimer, the term of this patent is extended or adjusted under 35 U.S.C. 154(b) by 147 days.

This patent is subject to a terminal disclaimer.

(21) Appl. No.: 13/648,482

(22) Filed: Oct. 10, 2012

(65) Prior Publication Data

US 2013/0091815 A1      Apr. 18, 2013

(30) Foreign Application Priority Data

Oct. 12, 2011   (EP) .................................... 11184828

(51) Int. Cl.
   *B01D 45/12*  (2006.01)
   *A47L 9/16*   (2006.01)
   (Continued)

(52) U.S. Cl.
   CPC ............. *A47L 9/1641* (2013.01); *A47L 5/24* (2013.01); *A47L 5/28* (2013.01); *A47L 9/0036* (2013.01); *A47L 9/0045* (2013.01); *A47L 9/0081* (2013.01); *A47L 9/02* (2013.01); *A47L 9/102* (2013.01); *A47L 9/106* (2013.01); *A47L 9/127* (2013.01);
   (Continued)

(58) Field of Classification Search
   CPC ....... A47L 9/1641; A47L 9/325; A47L 9/106; A47L 9/165; A47L 9/2889; A47L 9/0045; A47L 9/0036; A47L 9/0081; A47L 9/02; A47L 5/28; A47L 9/1666; A47L 9/1683; A47L 9/2884; A47L 9/22; A47L 9/1625
   USPC .............. 55/345, 321, 337, DIG. 3, 424, 426, 55/428, 429
   See application file for complete search history.

(56) References Cited

U.S. PATENT DOCUMENTS 5,421,058 A     6/1995  Zahuranec
5,592,716 A *   1/1997  Moren et al. .................... 15/412
(Continued)

FOREIGN PATENT DOCUMENTS

EP    0042723    12/1981
EP    1752076    2/2007
(Continued)

OTHER PUBLICATIONS

EP Search report on EP Patent Application 11184828.

*Primary Examiner* — Dung H Bui
(74) *Attorney, Agent, or Firm* — John Yun

(57) ABSTRACT

A motor, fan and dirt separating means arrangement for a vacuum cleaner, the arrangement comprising: a motor with a drive shaft; a fan coupled to the motor for generating air flow; and a dirt separating means located in a cleaning path of the air flow, the cleaning path being between a dirty air inlet and the fan, wherein the motor is located in a cooling path of the air flow, the cooling path being between a clean air inlet and the fan, wherein the air flow through the cleaning path is substantially greater than through the cooling path in normal operating conditions and wherein the cleaning path and the cooling path of the air flow combine substantially at the fan inlet. A vacuum cleaner comprising the motor, fan and dirt separating means arrangement.

13 Claims, 42 Drawing Sheets

(51) Int. Cl.
  *B01D 50/00* (2006.01)
  *B01D 45/16* (2006.01)
  *B01D 46/24* (2006.01)
  *A47L 9/10* (2006.01)
  *A47L 5/24* (2006.01)
  *A47L 5/28* (2006.01)
  *A47L 9/00* (2006.01)
  *A47L 9/02* (2006.01)
  *A47L 9/12* (2006.01)
  *A47L 9/22* (2006.01)
  *A47L 9/28* (2006.01)
  *A47L 9/32* (2006.01)

(52) U.S. Cl.
  CPC ............... *A47L 9/165* (2013.01); *A47L 9/1625* (2013.01); *A47L 9/1666* (2013.01); *A47L 9/1683* (2013.01); *A47L 9/22* (2013.01); *A47L 9/2884* (2013.01); *A47L 9/2889* (2013.01); *A47L 9/325* (2013.01); *B01D 45/12* (2013.01); *B01D 45/16* (2013.01); *B01D 46/2411* (2013.01); *B01D 50/002* (2013.01)

(56) References Cited

U.S. PATENT DOCUMENTS 5,638,575 A 6/1997 Sin
6,481,050 B1 11/2002 Wilson et al.

FOREIGN PATENT DOCUMENTS

| EP | 1955630 | 8/2008 |
| GB | 1420278 | 1/1976 |
| GB | 2440110 | 1/2008 |

* cited by examiner

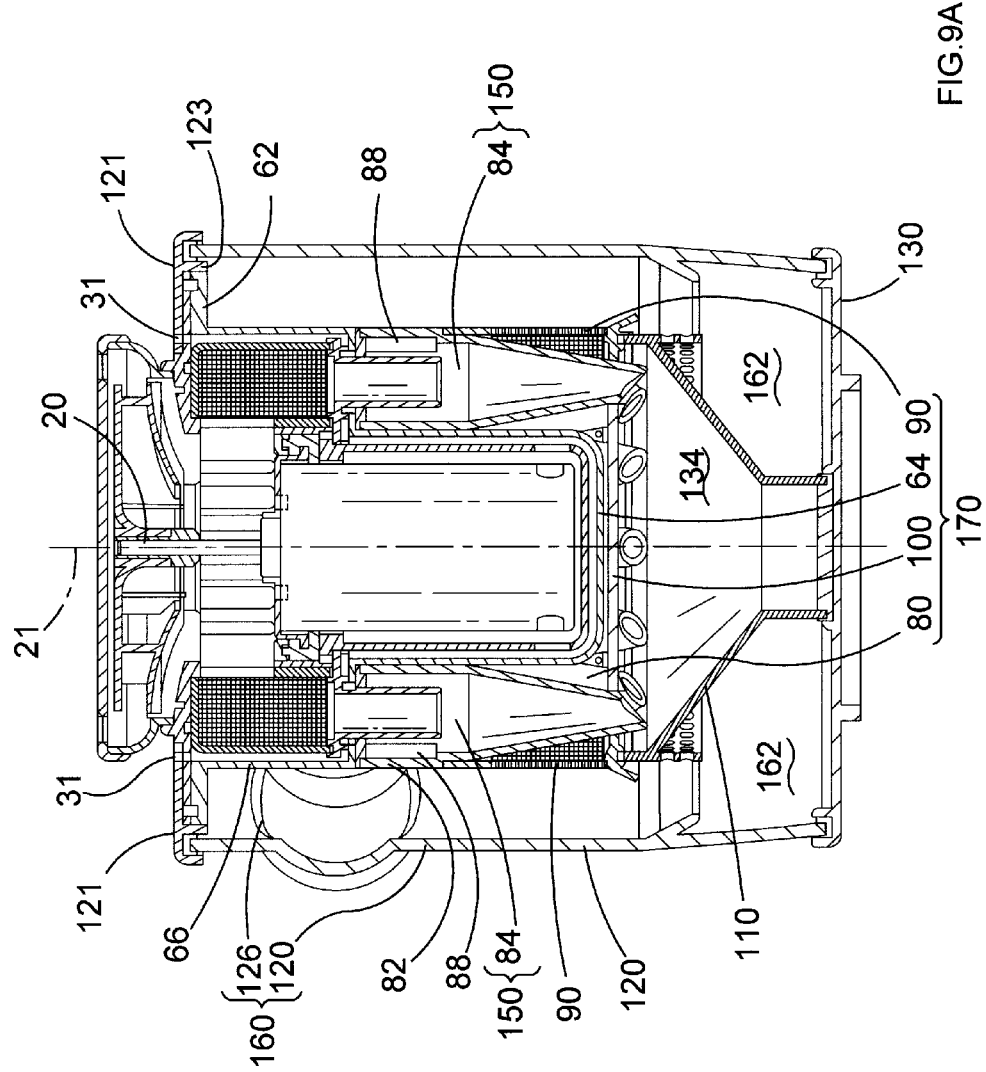

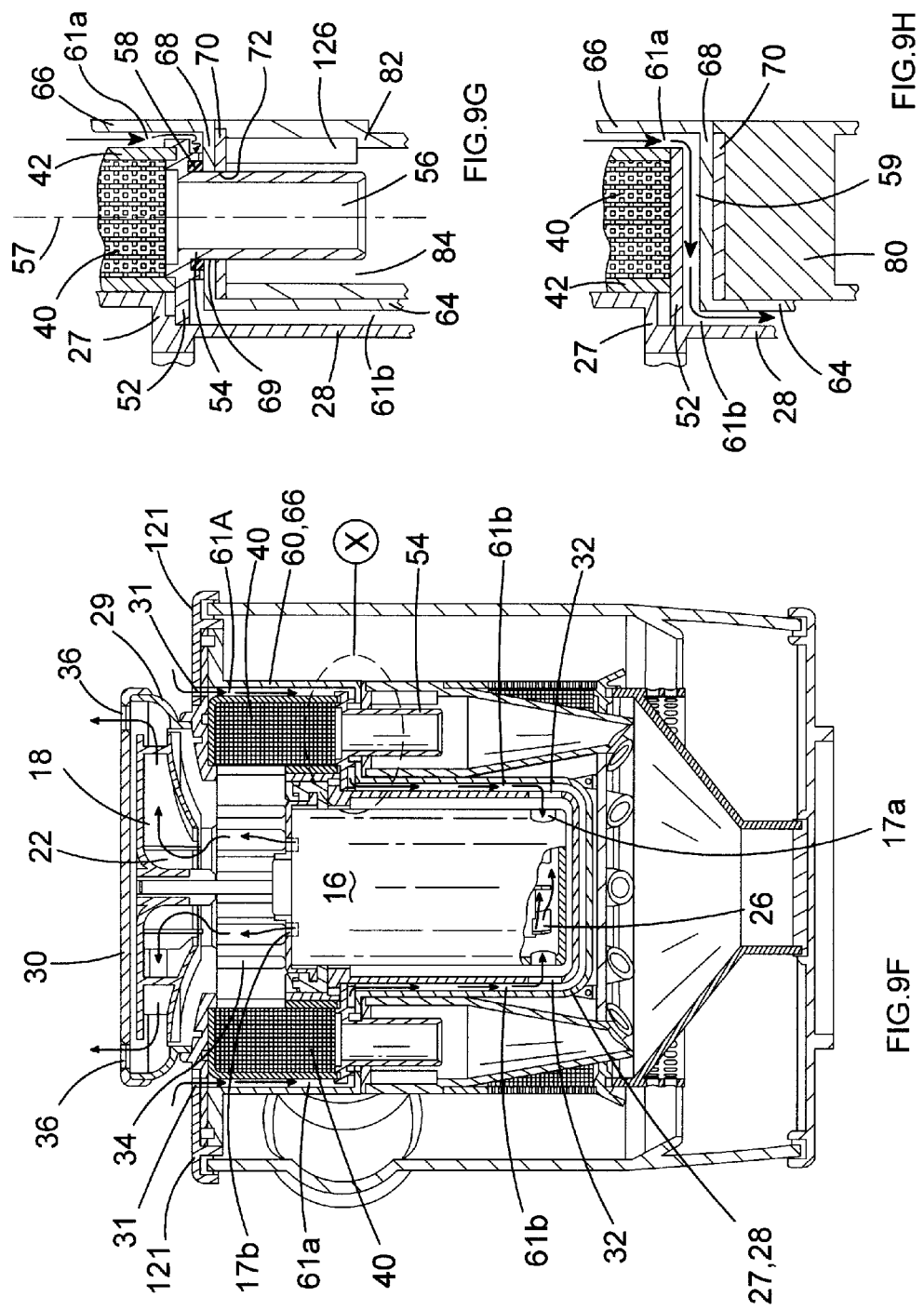

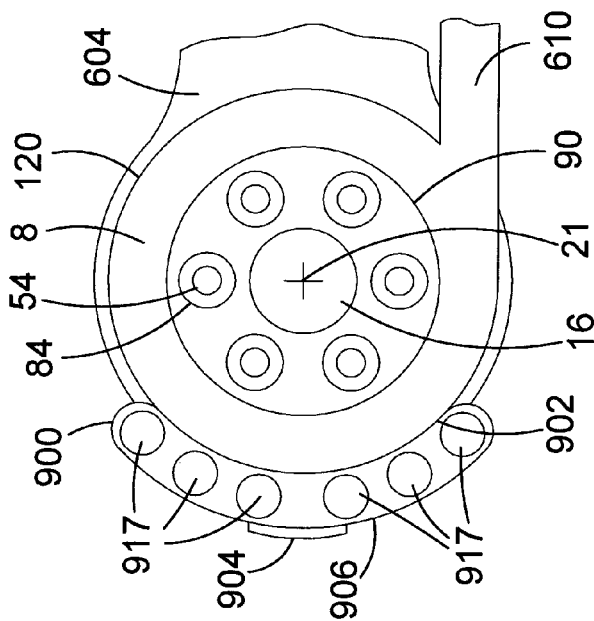
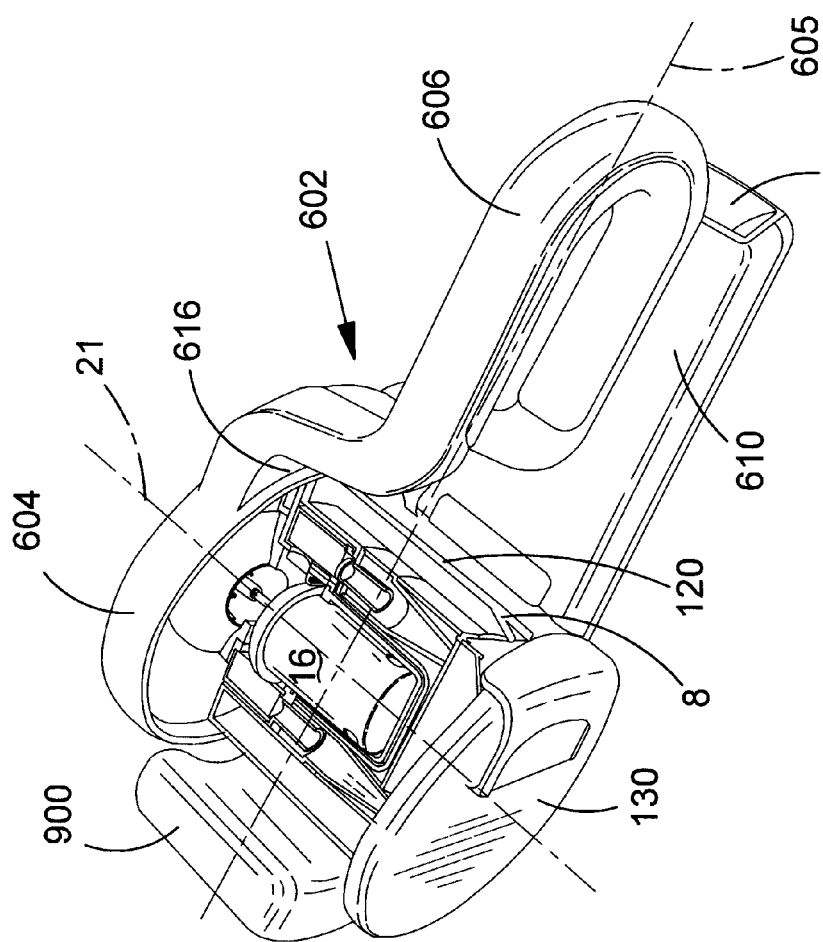

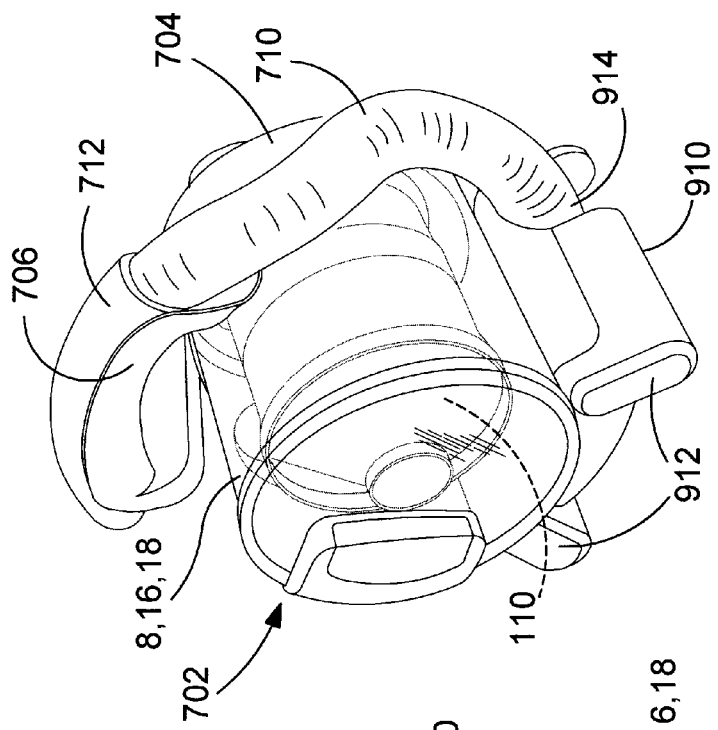
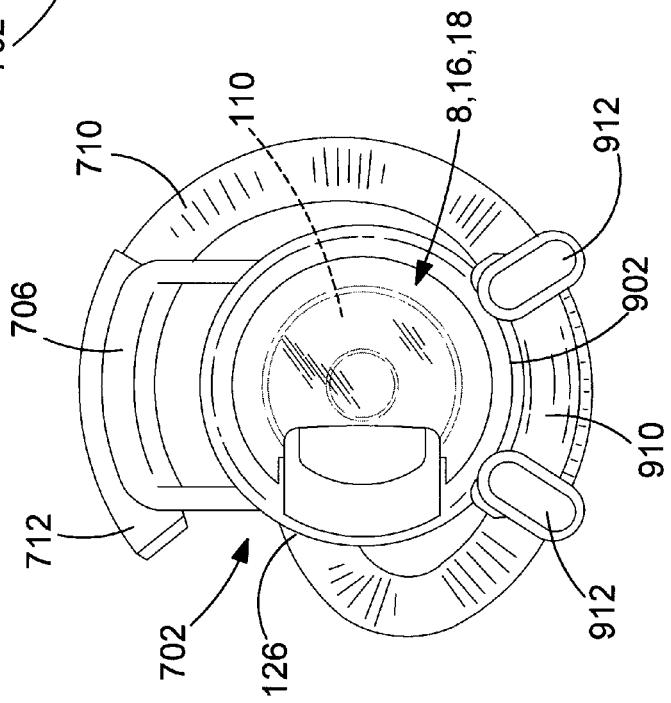

| Air Inlet Ports (31) | Operational Conditions of Cyclonic Separating Apparatus (8) | Motor °C | Motor °C | Ambient °C |
|---|---|---|---|---|
| 4 | Free Air Flow | 84 | 84 | 23 |
| 4 | Max Power Output | 71 | 74 | 23 |
| 4 | Sealed Suction | 69 | 72 | 25 |
| 3 | Free Air Flow | 95 | 100 | 24 |
| 3 | Max Power Output | 82 | 86 | 24 |
| 3 | Sealed Suction | 84 | 88 | 25 |

MOTOR, FAN AND DIRT SEPARATION MEANS ARRANGEMENT

CROSS-REFERENCE TO RELATED APPLICATIONS

This application claims priority to EP Patent Application No. EP 11 184 828.9 filed Oct. 12, 2011, the contents thereof to be incorporated herein by reference in its entirety.

FIELD OF THE INVENTION

The present invention relates to a motor, fan and dirt separating means arrangement. In particular, but not exclusively, the present invention relates to a motor, fan and dirt separating means arrangement for use in vacuum cleaners.

BACKGROUND OF THE INVENTION

Vacuum cleaners are well known for collecting dust and dirt, although wet-and-dry variants which can also collect liquids are known as well. Typically, vacuum cleaners are intended for use in a domestic environment, although they also find uses in other environments, such as worksites or in the garden. Generally, they are electrically powered and therefore comprise an electric motor and a fan connected to an output shaft of the motor, an inlet for dirty air, an outlet for clean air and a collection chamber for dust, dirt and possibly also liquids. Electrical power for the motor may be provided by a source of mains electricity, in which case the vacuum cleaner will further comprise an electrical power cable, by a removable and replaceable battery pack, or by one or more in-built rechargeable cells, in which case the vacuum cleaner will further comprise some means, such as a jack plug or electrical contacts, for connecting the vacuum cleaner to a recharging unit. When the vacuum cleaner is provided with electrical power from one of these sources, the electric motor drives the fan to draw dirty air along an air flow pathway in through the dirty air inlet, via the collection chamber to the clean air outlet. The fan is often a centrifugal fan, although it can be an impeller or a propeller.

Interposed at some point along the air flow pathway, there is also provided some means for separating out dust and dirt (and possibly also liquids) entrained with the dirty air and depositing these in the collection chamber. This dirt separation means may comprise a bag filter, one or more filters and/or a cyclonic separation apparatus.

In the event that the dirt separation means comprises a bag filter, dirty air, which has entered the vacuum cleaner via the dirty air inlet, passes through the bag filter. This filters out, and collects within the bag filter, dust and dirt entrained with the dirty air. The filtered material remains in the bag filter which lines the collection chamber. The clean air then passes to the other side of bag filter and through a grille in the collection chamber under the influence of the fan. The fan draws air in and expels it out, from where the air then passes to the clean air outlet of the vacuum cleaner.

There is always a small risk of dust and dirt passing through the bag filter and it is undesirable that it be allowed to pass through the fan and cause damage. To reduce this potential problem, there is often a fine filter located across the grille of the collection chamber to remove any fine dust and dirt particles remaining in the air flow after passage through the bag filter. This is commonly known as a pre-fan filter.

Occasionally, and in addition to any pre-fan filter, there is a high efficiency filter located downstream of the fan before the air flow leaves the vacuum cleaner. This is to remove any remaining extremely fine particulate matter which will not harm the fan or motor, but which may be harmful to the household environment. The term "filtering efficiency" is intended to relate to the relative size of particulate matter removed by a filter. For example, a high efficiency filter is able to remove smaller particulate matter from air flow than a low efficiency filter. A HEPA filter is a high efficiency filter which should be able to remove extremely fine particulate matter having a diameter of 0.3 micrometers (μm) and lower.

The purpose of the bag filter is to filter dust and dirt entrained in dirty air flow and to collect the filtered material within the bag filter. This progressively clogs the bag filter. The volumetric flow rate of air through the vacuum cleaner is progressively reduced and its ability to pick up dust and dirt diminishes correspondingly. Hence, the bag filter needs replacement before it becomes too full and before vacuum cleaner performance becomes unacceptable. The volume of the collection chamber must be sufficiently large to merit the cost of regular bag filter replacement.

An upright vacuum cleaner commonly has an upright main body with a dirt separating means, a motor and fan unit, a handle at the top and a pair of support wheels at the bottom. A cleaner head with a dirty air inlet facing the floor is pivotally mounted to the main body. A cylinder vacuum cleaner commonly has a cylindrical main body with a separating dirt means, a motor and fan unit and maneuverable support wheels underneath. A flexible hose with a cleaner head communicates with the main body. Bag filters are commonly used in upright and cylinder vacuum cleaners as separation means because their main body has sufficient internal space for the large collection chamber required to accommodate the bag filter.

In the event that the dirt separation means comprises a filter, dirty air, which has entered the vacuum cleaner via the dirty air inlet, passes through the filter. This filters out dust and dirt entrained with the dirty air and the filtered material remains in the collection chamber on the upstream side of the filter. Sometimes the filter is supplemented by a sponge to absorb any liquids entrained in the dirty air flow. The clean air then passes to the other side of filter under the influence of the fan, and from the fan the air then passes to the clean air outlet of the vacuum cleaner.

Filtered material accumulates around, and progressively clogs, the filter. The volumetric flow rate of air through the vacuum cleaner is progressively reduced and its ability to pick up dust and dirt diminishes correspondingly. Hence, the collection chamber needs regular emptying and the filter needs frequent cleaning to mitigate against this effect. Sometimes, the vacuum cleaner has a filter cleaning mechanism. Alternatively, the filter needs to be removable for cleaning with a brush, or in a dish washer, for example.

Hand-holdable vacuum cleaners, as their name would suggest, are compact and lightweight and are intended to perform light, or quick, cleaning duties around a household. Typically, hand-holdable vacuum cleaners are battery-powered to be easily portable.

An example of a hand-holdable vacuum cleaner having the conventional motor, fan and filter arrangement is described in European patent publication no. EP 1 752 076 A, also in the name of the present applicant. This vacuum cleaner has dirty air inlet at one end of a dirty air duct leading to a collection chamber with a filter. The collection chamber is generally cylindrical and is arranged transverse the body of the vacuum cleaner. The dirty air duct is rotatable, with the collection chamber, in relation to the body. The dirty air duct may be adjusted to access awkward spaces while the vacuum cleaner is held comfortably by a user.

In the event that the dirt separation means comprises cyclonic separation apparatus, dirty air, which has entered the vacuum cleaner via the dirty air inlet, passes through the cyclonic separation apparatus having one or more cyclones. A cyclone is a hollow cylindrical chamber, conical chamber, frustro-conical chamber or combination of two or more such types of chamber. The cyclone may have a vortex finder part way, or all way, along its internal length. The vortex finder is commonly a hollow cylinder and it has a smaller external diameter than the internal diameter of the cyclone.

Dirty air enters via a tangentially arranged air inlet port and swirls around the cyclone in an outer vortex. Centrifugal forces move the dust and dirt outwards to strike the side of the cyclone unit and separate it from the air flow. The dust and dirt is deposited at the bottom of the cyclone and into a collection chamber below. An inner vortex of cleaned air then rises back up the cyclone. The role of a vortex finder is to gather and direct the cleaned air through an air outlet port at the top of the cyclone. As an alternative to a vortex finder, the cyclone may have an inner cylindrical air permeable wall providing the cleaned air with a path from the cyclone. From the cyclone the cleaned air passes, under the influence of the fan, to the clean air outlet of the vacuum cleaner.

As with a bag filter, a vacuum cleaner with a cyclonic separation apparatus may have a pre-fan filter to protect the fan and motor, especially if the air flow is used to cool the motor. Nevertheless, volumetric flow rate of air through the vacuum cleaner remains virtually constant as separated material accumulates in the collection chamber. Thus, an attraction of cyclonic separation apparatus in a vacuum cleaner is a consistent ability to pick up dust and dirt. Another attraction is that the cost of regular bag filter replacement is avoided.

An example of an upright vacuum cleaner having a motor, fan and cyclonic separation apparatus is described in European patent publication no. EP 0 042 723 A. This cyclonic separation apparatus is divided into a first cyclonic separating unit with a cyclone formed by an annular chamber and a second cyclonic separating unit with a generally frustro-conical cyclone. The first cyclonic separating unit is ducted in series with the second cyclonic separating unit. Air flows sequentially through the first, and then the second, cyclonic separating units. The frustro-conical cyclone has a smaller diameter than the annular chamber within which the frustro-conical cyclone is partially nested. Separated material from both cyclonic separating units collects in the cylindrical collection chamber formed at the bottom of the annular chamber.

The term "separation efficiency" is used in the same way as filtering efficiency and it relates to the relative ability of a cyclonic separation apparatus to remove small particulate matter. For example, a high efficiency cyclonic unit can remove smaller particulate matter from air flow than a low efficiency cyclonic separating unit. Factors that influence separation efficiency can include the size and inclination of the dirty air inlet of a cyclone, size of the clean air outlet of a cyclone, the angle of taper of any frustro-conical portion of a cyclone, and the diameter and the length of a cyclone. Small diameter cyclones commonly have a higher separation efficiency than large diameter cyclones, although other factors listed above can have an equally important influence.

The first cyclonic separating unit of EP 0 042 723 A has a lower separating efficiency than the second cyclonic separating unit. The first cyclonic separating unit separates larger dust and dirt from the air flow. This leaves the second cyclonic separating unit to function in its optimum conditions with comparatively clean air flow and separate out smaller dust and dirt.

A hand-holdable vacuum cleaner having a motor, fan and cyclonic separation apparatus is described in United Kingdom patent publication no. GB 2 440 110 A. This cyclonic separation apparatus is smaller than that of EP 0 042 723 A in order to be used in a hand-holdable vacuum. It is divided into a first cyclonic separating unit and a second cyclonic separating unit located downstream of the first cyclonic separating unit. The separating efficiency of the first cyclonic separating unit is lower than that of the second cyclonic separating unit.

It is desirable to make vacuum cleaners as reliable as possible. This has resulted in using air flow generated by the fan to cool the motor and other electrical components located inside the vacuum cleaner to help avoid overheating and maintain reliable operation. An example of a vacuum cleaner having a motor cooled by air flow generated by the fan is described by European patent publication no EP 1 955 630 A, also in the name of the present applicant. A drawback of this arrangement is that resistance in the path of air flow through the dirt separating means reduces the cooling effect and the temperature of the motor and other electrical components may rise. This may occur when the vacuum cleaner is operational and the dirty air inlet contacts carpet, hard floor, curtains or other surface to restrict air flow.

BRIEF SUMMARY OF THE INVENTION

It is an object of the present invention to provide a motor, fan and dirt separating means arrangement with improved internal cooling. This is particularly desirable in a vacuum cleaner, where the efficient use of space is of great importance. Internal components are tightly assembled to keep size to a minimum and yet internal components, like, for example, motors, switches and other electrical components need to dissipate any heat they generate. A further object of the invention is to provide a vacuum cleaner comprising such a motor, fan and dirt separating means arrangement with improved internal cooling.

Accordingly, in a first aspect, the present invention provides a motor, fan and dirt separating means arrangement for a vacuum cleaner, the arrangement comprising: a motor with a drive shaft; a fan coupled to the motor for generating air flow; and a dirt separating means located in a cleaning path of the air flow generated by the fan, the cleaning path being between a dirty air inlet and the fan, wherein the motor is located in a cooling path of the air flow generated by the fan, the cooling path being between a clean air inlet and the fan, wherein the air flow through the cleaning path is substantially greater than through the cooling path in normal operating conditions and wherein the cleaning path and the motor path of the air flow combine where the cleaning path is downstream of the dirt separating means and upstream of the fan and the cooling path is downstream of the motor and upstream of the fan. The cooling path is separate to the cleaning path on the upstream side of the fan. In the event that there is resistance or blockage in the cleaning path, the cooling path continues to cool internal components as it is unhindered by changes in the cleaning path so long as the fan continues to rotate. An increase in resistance in the cleaning path provokes an increase in pressure across the fan. Typically, motor rotational speed increases as the fan encounters resistance to volumetric air flow as would be the case with resistance or blockage in the cleaning path. Air pressure around the fan inlet drops to a lower pressure than it would normally be the case. As a result, the fan sucks more air through the cooling path to compensate for the loss of air flow through the cleaning path. This has the benefit of increased cooling just when internal components, like, for example, the motor, are working hardest and cooling is needed most.

Preferably, the cleaning path and the cooling path and the cooling path combine substantially at an input of the fan. The cooling path is independent of the cleaning path for as long as possible and right up to the fan input.

Preferably, the motor has vents for ventilating the interior of the motor. This helps the cooling of the motor by allowing deeper penetration of cooling air flow inside the motor.

Preferably, the motor is nested within an inner wall of the dirt separating means. The cooling air flow can be ducted between the motor and the inner wall to where cooling is needed.

Preferably, the arrangement comprises supplementary means for augmenting air flow in the cooling path about an opposite end of the motor to the fan. This helps to circulate cooling air flow about the motor and spread the cooling effect more evenly.

Preferably, the supplementary means for augmenting air flow in the cooling path comprises a second fan coupled to an opposite end the drive shaft to the fan. The second fan may be any impeller, propeller, centrifugal fan, paddle wheel, or the like, which is capable of moving air flow about the bottom of the motor. The motor drive shaft provides a convenient source of rotational motion for the second fan in a compact part of the arrangement.

Preferably, the arrangement comprises a pre-fan filter located in the cleaning path of the air flow downstream of the dirt separating means and upstream of the fan and wherein the pre-fan filter communicates with an air outlet from the dirt separating means. This provides a filter to keep dirt away from the motor.

Preferably, the motor is housed in a motor housing, wherein a motor housing interposes the motor and the inner wall of the dirt separating means and wherein the cleaning path and the cooling path each permeate the motor housing. The motor housing, and the motor within it, may be removed as a single unit for repair to the motor or access to internal components of the dirt separating means. This motor housing does not interrupt the cleaning path and the cooling path.

Preferably, the pre-fan filter has an annular cross-sectional profile normal to a central axis of the motor drive shaft, wherein the pre-fan filter is nested within the inner wall of the dirt separating means and wherein the annular body surrounds the motor housing. This provides a compact location the pre-fan filter within the dirt separating means. Removal of the motor housing provides access to the pre-fan filter for cleaning or renewal.

Preferably, and the cooling path crosses an interface of communication between the pre-fan filter and the air outlet from the dirt separating means. This allows the cooling path to obtain clean air from outside the confines of the motor and the pre-fan filter. This permits great flexibility with the internal layout of the motor, fan and dirt separating means arrangement.

Preferably, the cooling path crosses at four gaps in the interface of communication between the pre-fan filter and the air outlet, wherein the clean air inlet comprises four clean air inlet ports through an external wall of the dirt separating means, and wherein the four clean air inlet ports and the four gaps are axially aligned at equiangular intervals about the central axis, wherein the cooling path permeates the motor housing at four slots arranged about said opposite end of the motor and wherein the four slots in the motor housing are axially aligned with the four clean air inlet ports and the four gaps. This helps to spread cooling air flow evenly about the circumference of the motor and may improve the overall cooling effect.

The dirt separation means may be a filter, a bag filter or a cyclonic separation apparatus. Preferably, the dirt separating means is a cyclonic separation apparatus comprising: a first cyclonic separating unit comprising a hollow substantially cylindrical dirt container with a dirty air inlet arranged tangentially through a side of the dirt container; and a second cyclonic separating unit comprising a plurality of cyclones arranged in a circular array about the inner wall wherein the dirt container is arranged about the circular array of cyclones and concentric with the central axis, wherein the second cyclonic separating unit is located in the cleaning path of the air flow downstream of the first cyclonic separating unit and wherein the second cyclonic separating unit has a higher separation efficiency than the first cyclonic separating unit. This provides a two-stage cyclonic separation apparatus of differing separation efficiency which may provide an improved air cleaning by removing large and small dirt particles at different stages of the process.

Preferably, the cyclonic separation apparatus comprises: a substantially cylindrical intermediate wall arranged within the dirt container, wherein the intermediate wall has an air permeable wall arranged as an air outlet from the first cyclonic separating unit. The intermediate wall helps maintain an air flow vortex in the first cyclonic separating unit.

Preferably, the intermediate wall is arranged about the air inlet ports of the circular array of cyclones and wherein the air outlet from the first cyclonic separating unit is ducted to the air inlet ports of the cyclones. The intermediate wall shields the air inlet ports from the dirty air flow within the cylindrical dirt container. This helps to avoid re-entrainment of dirt in the partially cleaned air destined for the cyclones.

Preferably, the pre-fan filter interposes the fan and the motor. This helps to ensure that cooling path and the cleaning path are independent of each other upstream of the fan. Preferably, each cyclone comprises: a hollow cylindrical and/or frustro-conical body with a longitudinal axis; a vortex finder arranged concentrically inside the cyclone body; a discharge nozzle arranged at a longitudinal end of the cyclone body; an air inlet port through a side of the body, wherein the air inlet port is arranged tangentially to the cyclone body; and an air outlet port through the vortex finder protruding through the opposite end of the cyclone body to provide an air outlet from the first cyclonic separating unit. Preferably, each cyclone body is divided into a cylindrical portion and a frustro-conical portion depending from the cylindrical portion, wherein the cylindrical portion is proximal the vortex finder and wherein the frustro-conical portion terminates at the discharge nozzle. The vortex of air flowing towards the discharge nozzle accelerates as the body's diameter decreases to separate ever smaller dust particles and increase separation efficiency. Preferably, the plane of the discharge nozzle is inclined with respect to the longitudinal axis of the cyclone body. This helps to avoid separated material from re-entering the discharge nozzle. Preferably, the cyclones are arranged at equi-angular intervals about the central axis so that they are arranged evenly and occupy less space. Preferably, the longitudinal axis of each cyclone is in line with the central axis. Preferably, the longitudinal axis of each cyclone is parallel with the central axis. Even arrangement of the circular array of cyclones economises on space occupied. Preferably, the first and second cyclonic separating units are arranged to deposit material separated from air flow in the dirt container so that all the separated dirt is contained together and can be emptied together, thus making the cyclonic separation apparatus more user-friendly. Preferably, the fan is a centrifugal fan having a tangential output.

In a second aspect, the present invention provides a vacuum cleaner comprising the motor, fan and dirt separating means arrangement according to the first aspect. The vacuum cleaner benefits from the enhanced motor cooling properties of the cooling path.

Preferably, the vacuum cleaner is a hand-holdable vacuum cleaner so that it may be readily portable and convenient to use. Preferably, the vacuum cleaner comprises a dirty air duct located in the cleaning path of the air flow upstream of the dirt separating means. Alternatively, the vacuum cleaner comprises a flexible hose located in the cleaning path of the air flow upstream of the dirt separating means. Alternatively, the vacuum cleaner comprises an elongate body with a handle at one end and a cleaner head at the other end, wherein the cleaner head is located in the cleaning path of the air flow upstream of the dirt separating means. Preferably, the vacuum cleaner comprises at least one support wheel, wherein the at least one support wheel rotates about the central axis of the dirt container. The cyclonic separation apparatus is located very close to the floor so that communication with the cleaner head is shortened. This reduces energy loss by reducing the overall length of the cleaning air flow path. Preferably, the elongate body is telescopically extendible so that it can be extended in use and retracted for storage in a much smaller location than would be possible if the body were not telescopic.

Preferably, the vacuum cleaner is a blower-vac, which is an outdoor garden tool which can perform the role of blowing garden debris for collection and the role of vacuum cleaner for sucking garden debris into a container.

BRIEF DESCRIPTION OF THE DRAWINGS

Further features and advantages of the present invention will be better understood by reference to the following description, which is given by way of example and in association with the accompanying drawings, in which:

FIGS. 9A to 9H show the longitudinal cross-section of FIG. 2 including the air flow pathways through the motor, fan, cyclonic separation apparatus and a motor cooling passage, in use;

FIG. 30 shows a perspective view of the vacuum cleaner of FIG. 29;

FIG. 31 shows a cross-sectional view, of a portion of the vacuum cleaner of FIG. 29 showing a battery pack;

FIG. 33 shows a side elevation view of a battery-powered vacuum cleaner with a flexible hose and the motor, fan and cyclonic separation apparatus arrangement of FIGS. 2 to 9;

FIG. 34 shows a perspective view of the vacuum cleaner of FIG. 33;

DETAILED DESCRIPTION OF THE INVENTION

Figure 1:
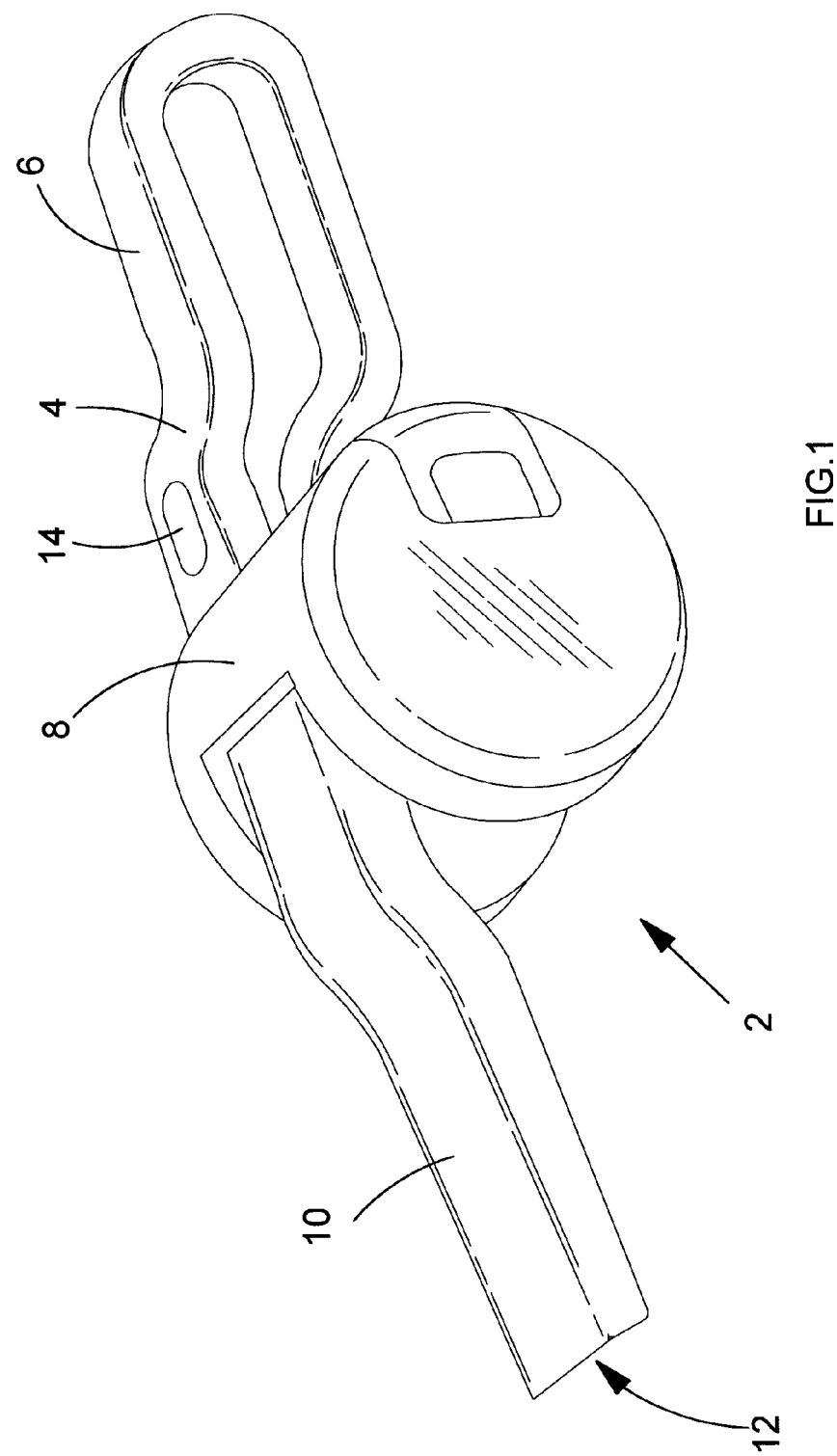
FIG. 1 shows perspective view of a first embodiment of a hand-held vacuum cleaner with a motor, fan and cyclonic separation apparatus arrangement.
Figure 2:
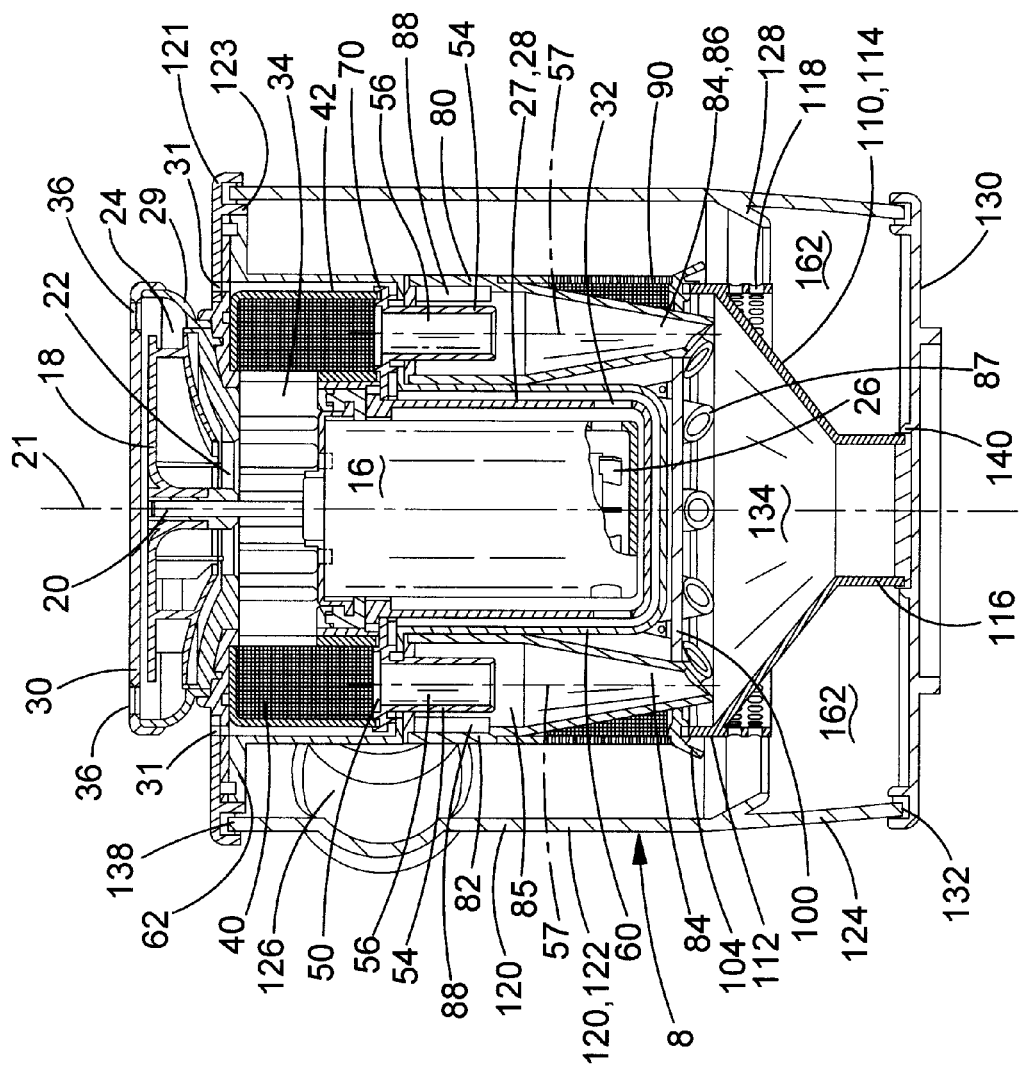
FIG. 2 shows a longitudinal cross-section of the motor, fan and cyclonic separation apparatus arrangement of FIG. 1.
Figure 3:
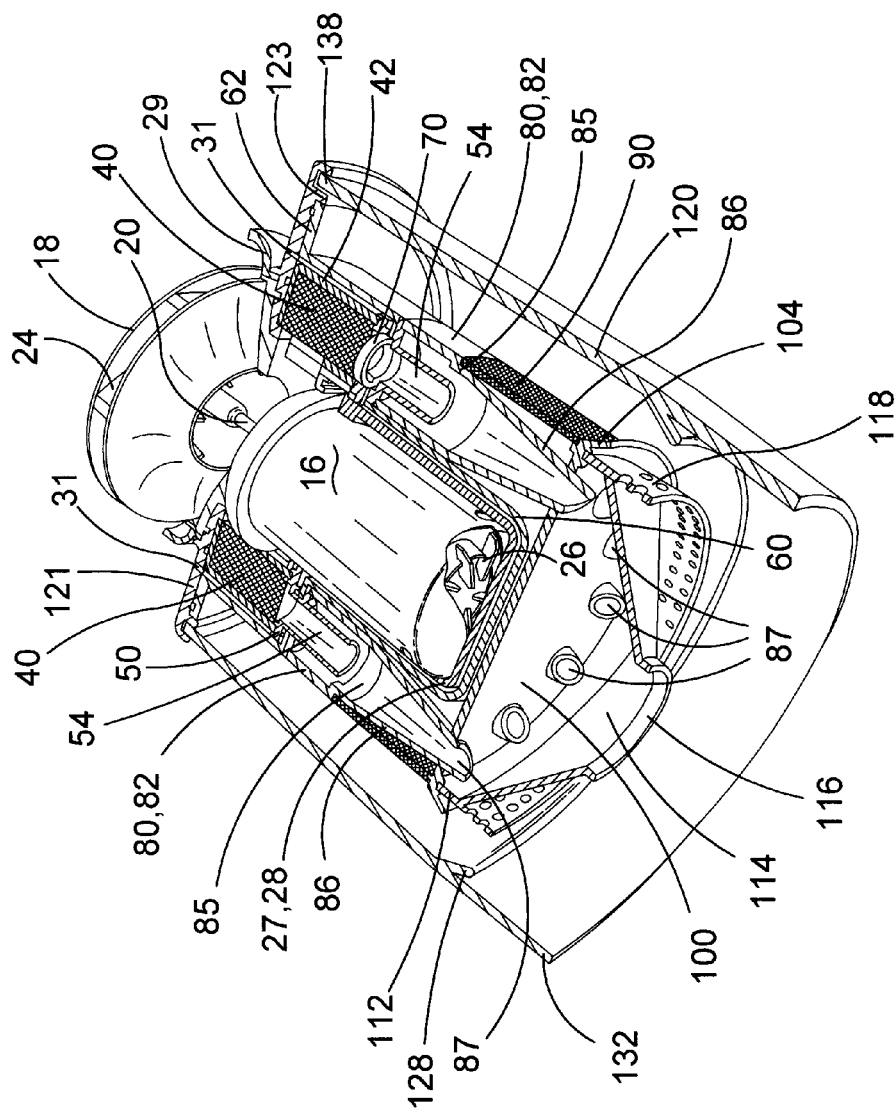
FIG. 3 shows a perspective view of the longitudinal cross-section of FIG. 2.
Figure 4:
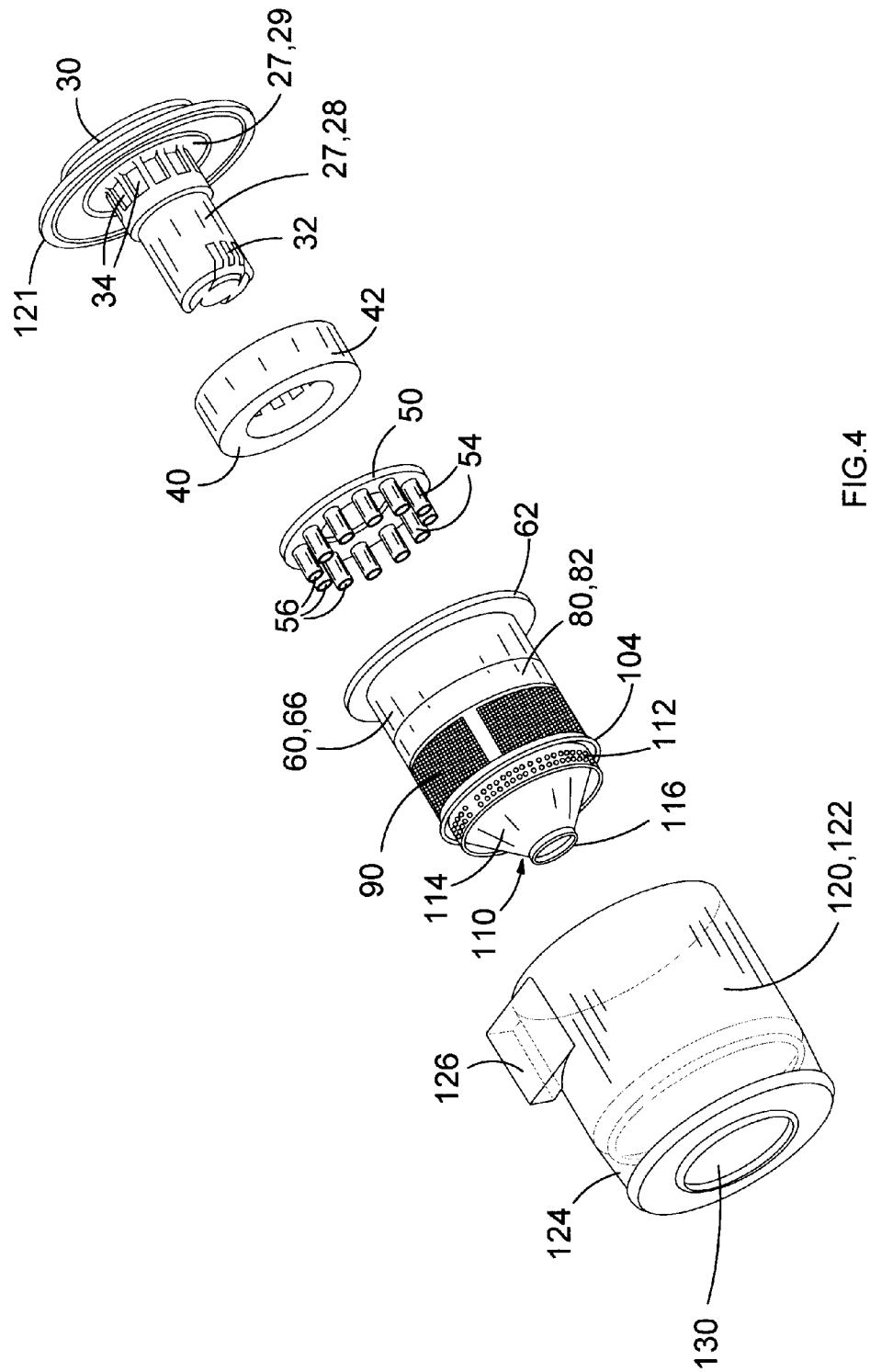
FIG. 4 shows an exploded perspective view of the motor, fan and cyclonic separation apparatus arrangement of FIG. 1.

Referring to FIG. 1, there is shown first embodiment of a hand-held vacuum cleaner 2 comprising a main body 4, a handle 6 connected to the main body, a cyclonic separation apparatus 8 mounted transverse across the main body, and a dirty air duct 10 with a dirty air inlet 12 at one end. The vacuum cleaner comprises a motor coupled to a fan for generating air flow through the vacuum cleaner and rechargeable cells (not shown) to energise the motor when electrically coupled by an on/off switch 14.

Referring to FIGS. 2 to 8, there is shown an arrangement comprising the motor 16, the fan 18 and the cyclonic separation apparatus 8. The motor has a drive shaft 20 with a central axis 21. The fan is a centrifugal fan 18 with an axial input 22 facing the motor and a tangential output 24. The fan has a diameter of 68 mm. The fan is mounted upon the drive shaft 20 at the top of the motor. In use, the motor drives the fan to generate air flow through the cyclonic separation apparatus, as will be described in more detail below. A small portion of the drive shaft 20 protrudes from the bottom of the motor 16. A second fan, comprising a paddle wheel 26, is mounted upon the drive shaft 20 at the bottom of the motor. The motor and the paddle wheel are clad in a cylindrical outer body of the motor, which is often referred to as a "motor can". In use, the motor turns the paddle wheel to circulate and augment air flow inside the motor can and about the bottom of the motor.

The motor 16 and the fan 18 are housed in a motor fan housing 27 comprising a generally cylindrical body portion 28 enclosing the motor and a generally circular head-portion 29 enclosing the fan. The head portion 29 has a larger diameter than the body portion 28. The motor fan housing 27 comprises a perforated end cap 30 mounted upon the head portion on the opposite side to the body portion. The end cap 30 protects the fan. The end cap has a circular array of perforations 36 near where air flow is expelled from the fan. The head portion acts as a baffle to direct air flow from the fan and out the perforations. The body portion has an array of bottom slots 32 around the bottom of the motor and an array of top slots 34 about where the drive shaft 20 protrudes from the top of the motor.

The cyclonic separation apparatus 8 comprises a pre-fan filter 40, a vortex finder assembly 50, a generally cylindrical inner wall 60, a cyclone seal 70, a cyclone assembly 80, a cylindrical perforated intermediate wall 90, a circular bulkhead 100, a tapered funnel 110, a transparent generally cylindrical dirt container 120, and a circular bowl door 130 all arranged about the central axis 21 of the motor drive shaft 20.

The pre-fan filter 40 is an annular shape surrounding the top air flow slots 34 of the body portion 28 of the motor fan housing 27. The pre-fan filter is enclosed in an annular shell 42 except where the pre-fan filter communicates with the vortex finder assembly 50 and with the top air flow slots 34 of the body portion 28. This permits air flow from the cyclonic separating apparatus, through the pre-fan filter and on to the fan.

The vortex finder assembly 50 comprises planar ring 52 moulded with twelve hollow cylindrical vortex finders 54 protruding from one side of the planar ring. Holes 56 through the vortex finders penetrate the opposite side of the planar ring whereupon the pre-fan filter 40 is seated. The pre-fan filter 40 helps to muffle high frequency sounds caused by Helmholtz resonance as air flows through the vortex finder holes 56. The vortex finders are arranged in a circular array about the central axis 21 of the motor drive shaft 20. Each vortex finder has its own longitudinal central axis 57 arranged parallel to the central axis 21. The vortex finders may have longitudinal internal ribs (not shown) along the vortex finder holes to further reduce high frequency noise caused by Helmholtz resonance. The longitudinal ribs also tend to straighten air flow in the vortex finder to help reduce energy losses as the air flows into the pre-fan filter 40.

The inner wall 60 is a generally cylindrical shape in two portions of different diameter. The inner wall comprises an annular flange 62 at an open end of the inner wall, a hollow cylindrical cup 64 at an opposite closed end of the inner wall, a hollow cylindrical wall 66 and an annular shoulder 68. The flange extends radially outwardly from the open end of the cylindrical wall. The cylindrical wall is located between the flange and the cylindrical cup. The cylindrical wall has a larger diameter than the cylindrical cup. The annular shoulder joins the cylindrical wall to the cylindrical cup. The shoulder is perforated with a circular array of twelve holes 69 spaced at equi-angular intervals about the central axis 21. The annular flange 62 is connected to an annular roof wall 121 of the dirt container 120.

The vortex finder assembly 50 is seated in the cylindrical wall 66 with the planar ring 52 facing the shoulder 68 and the vortex finders 54 protruding through the shoulder's holes 68. The pre-fan filer 40 is nested within the cylindrical wall 66. The bottom of the motor fan housing's body portion 28 is nested within the cylindrical cup 64.

The cyclone seal 70 is perforated with a circular array of twelve holes 72 spaced at equi-angular intervals about the central axis 21. The shoulder 68 of the inner wall 60 is seated upon the cyclone seal. The vortex finders 54 protrude through the seal holes 72.

The cyclone assembly 80 comprises a cylindrical collar 82 and a circular array of twelve cyclones 84 surrounded by the collar. The cyclones are spaced at equi-angular intervals about the central axis 21. Each cyclone has a hollow cylindrical top part 85 and a hollow frustro-conical bottom part 86 depending from the cylindrical top part and terminating with a discharge nozzle 87 at the bottom of the cyclone.

The shoulder 68 of the inner wall 60 is arranged upon the cyclone assembly 80 with the cyclone seal 70 interposed therebetween. The collar 82 has the same outer diameter as, and abuts with, the cylindrical wall 66 of the inner wall 60. The vortex finders 54 protrude through the holes 72 in the cyclone seal and into the cylindrical top part 85 of a respective cyclone 84. The only passage through the top of the cyclone 84 is via its vortex finder 54 which acts as an air flow outlet port to the pre-fan filter 40. Each vortex finder is concentric with its respective cyclone. The plane of each nozzle 87 is inclined with respect to the central axis 57. This helps to prevent dust and dirt particles from re-entry after discharge from the nozzle.

The cylindrical top part 85 of each cyclone 84 has an air inlet port 88 arranged tangentially through the side of the cyclone and proximal the vortex finder 54. The twelve air inlet ports are in communication with a distribution chamber 170 below the collar 82 around the cyclones 84, as is described in more detail below.

The intermediate wall 90 is arranged upon the cyclone assembly 80. The intermediate wall 90 has the same outer diameter as, and abuts with, the cylindrical collar 82.

The bulkhead 100 is arranged upon, and has approximately the same outer diameter as, the intermediate wall 90. The bulkhead 100 is perforated by a circular array of twelve holes 102 spaced at equi-angular intervals about the central axis 21. The discharge nozzles 87 of the cyclones 84 protrude through respective bulkhead holes 102. The bulkhead 100 has a circumferential lip 104 inclined radially outwardly from the central axis 21 towards the bowl door 130. The lip 104 protrudes a small way from the intermediate wall 90.

The tapered funnel 110 comprises a hollow circumferential skirt 112, a frustro-conical cone 114 depending from the skirt, and a hollow cylindrical nose 116 depending from the cone. The skirt is arranged upon, and has approximately the same outer diameter as, the bulkhead. The cone tapers radially inwardly from the bulkhead 100 towards the bowl door 130. A perforated portion 118 of the skirt protrudes axially rearward from the cone towards the bowl door 130.

The generally cylindrical dirt container 120 comprises the annular roof wall 121 and a hollow cylindrical exterior wall 122 with a frustro-conical dirt collection bowl 124 depending from the exterior wall. The dirt container has a dirty air inlet port 126 arranged tangentially through the exterior wall 122. The dirt container 120 has a circumferential lip 128 inclined radially inwardly towards the central axis 21 and towards the bowl door 130. The lip 128 protrudes a small way in from the transition between the exterior wall and the dirt collection bowl. The motor fan housing's head portion 29 is nested within the centre of the annular roof wall 121. The annular roof wall is detachably connected to an outer circumferential edge 138 of the exterior wall 122. The annular roof wall 121 may be connected to the exterior wall 122 and the inner wall 60 by snap-fit, bayonet fit, interlocking detents, interference fit or by a hinge. A resilient seal or seals made of polyethylene, rubber or a similar elastomeric material is provided around the annular roof wall to ensure airtight connection with the exterior wall.

The bowl door 130 is detachably connected to an outer circumferential edge 132 of the dirt collection bowl 124. The bowl door abuts the cylindrical nose 116 thereby dividing the dirt collection bowl into two separate chambers: a generally circular chamber 134 inside the tapered funnel 110 and a generally annular chamber 162 outside the tapered funnel. The bowl door 130 may be connected to the dirt collection bowl 124 by snap-fit, bayonet fit, interlocking detents, interference fit or by a hinge. A resilient seal made of polyethylene, rubber or a similar elastomeric material is provided around bowl door 130 to ensure airtight connection with the dirt collection bowl.

The annular flange 62 of the inner wall 60 is in complementary mating relationship with a circular ring 123 protruding from inside the annular roof wall 121. The nose 116 is in complementary mating relationship with a circular ring 140 protruding from inside the bowl door 130. This ensures that components of the cyclonic separation apparatus 8 remain concentric with the central axis 21 when the bowl door is closed.

Between the annular roof wall 121 and the bowl door 130, the various components of the cyclonic separation apparatus 8 (i.e. pre-fan filter 40, vortex finder assembly 50, inner wall 60, cyclone seal 70, cyclone assembly 80, intermediate wall 90, bulkhead 100, tapered funnel 110) are arranged upon each other by detachable connection, typically a snap-fit, bayonet fit, interlocking detents, or interference fit. The permits disassembly and reassembly, without tools, of the cyclonic separation apparatus 8 in order to clean, or replace, its individual components. Resilient seals made of polyethylene, rubber or a similar elastomeric material, or other suitable seal material, are provided around connections of the annular flange 62 and pre-fan filter shell 42 with the annular roof wall 121. The seals are to ensure airtight connection. The internal diameter of the dirt container 120 and the bowl door 130 is large enough to permit removal of the components of the cyclonic separation apparatus 8 (i.e. pre-fan filter 40, vortex finder assembly 50, inner wall 60, cyclone seal 70, cyclone assembly 80, intermediate wall 90, bulkhead 100, tapered funnel 110) through either end of the dirt container.

In use, dirty air flows, under the influence of the fan 18, in the dirty air inlet 12, up the dirty air duct 10 and into the cyclonic separation apparatus 8 where dust and dirt entrained in the air flow is separated therefrom. The dust and dirt is collected within the cyclonic separation apparatus. The air flows out the cyclonic separation apparatus 8, through the pre-fan filter 40, into the motor fan housing 27 via the top slots 34, though the fan 18 and out the perforations 36 in the end cap 30.

Referring to FIG. 9A, the cyclonic separation apparatus 8 is divided into a first cyclonic separating unit 160, a second cyclonic separating unit 150 and a distribution chamber 170. The first cyclonic separating unit is located in the air flow pathway upstream of the distribution chamber. The distribution chamber is located in the air flow pathway upstream of the second cyclonic separating unit.

The first cyclonic separating unit 160 comprises the cylindrical dirt container 120. The second cyclonic separating unit 150 comprises the circular array of twelve cyclones 84. The dirt container is concentric with the central axis 21 of the motor drive shaft 20. The distribution chamber 170 is bounded by the hollow cylindrical cup 64 of the inner wall, cyclone assembly 80, intermediate wall 90 and bulkhead 100. The second cyclone unit 150 received air flow from the first cyclone unit 160 via the distribution chamber 170.

The exterior wall 122 of the dirt container 120 has a diameter of approximately 130 mm. The cyclones 84 have a much smaller diameter than the dirt container. Helical air flow in the cyclones experiences greater centrifugal forces than in the annular chamber. Thus, the cyclones of the second cyclonic separating unit 150, when combined, have higher separation efficiency than the dirt container of the first cyclonic separating unit 160.

The air flow pathway though the cyclonic separation apparatus 8 is described in more detail with reference to FIGS. 9B to 9E.

Figure 9B:
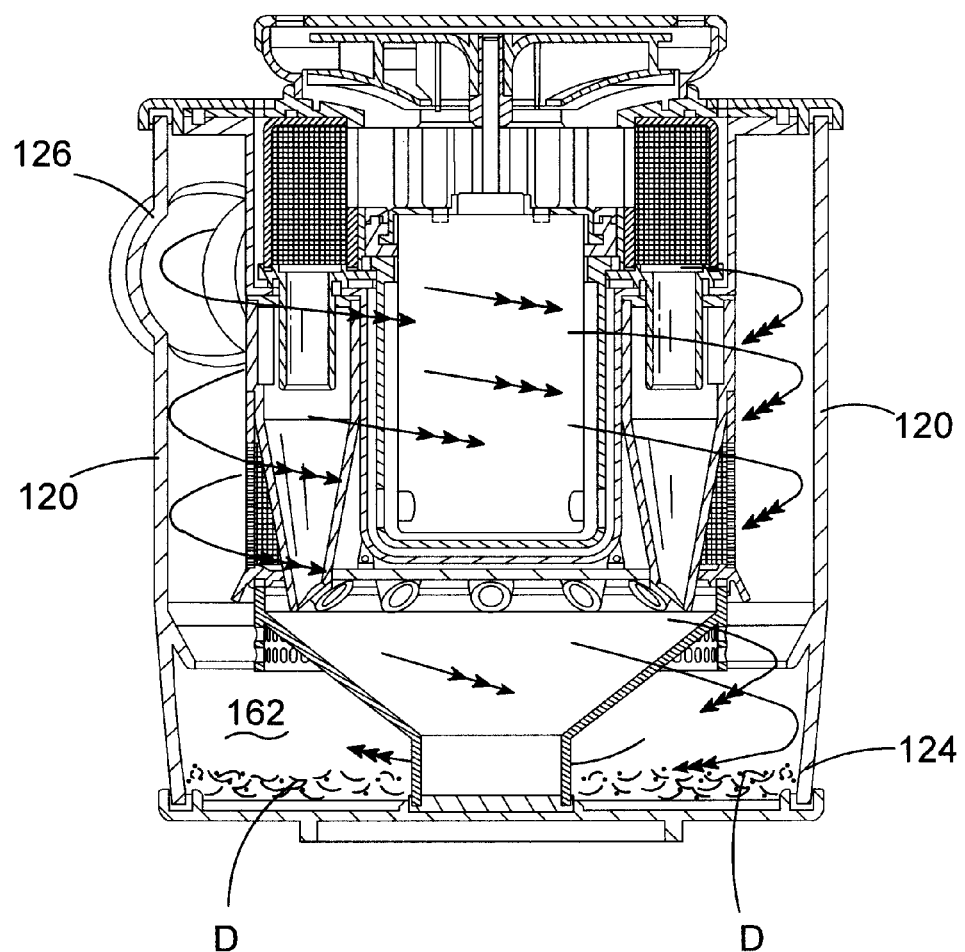

Referring to FIG. 9B, dirty air (triple-headed arrows) flows into the first cyclonic separating unit 160 via the dirty air inlet port 126. The tangential arrangement of the dirty air inlet port 126 causes the dirty air to flow in a helical path around the cylindrical dirt container 120. This creates an outer vortex in the dirt container. Centrifugal forces move the comparatively large dust and dirt particles outwards to strike the side of the dirt container and separate them from the air flow. The dust separated and dirt (D) swirls towards the dirt collection bowl 124 where it is deposited.

Figure 9C:
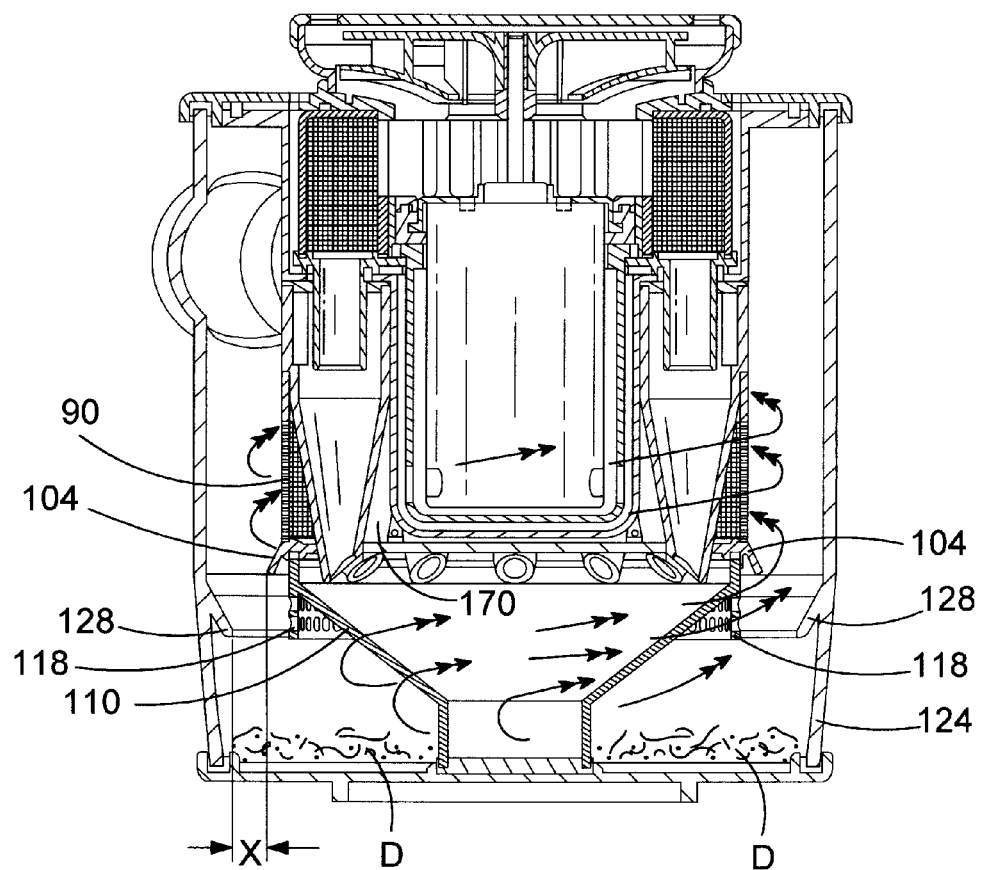

Referring to FIG. 9C, partially-cleaned air (double-headed arrows) flows back on itself to follow an inner helical path closely about the tapered funnel 110 and towards the cylindrical intermediate wall 90. The partially-cleaned air flows through the perforated portion 118 of the tapered funnel's skirt 112 largely unimpeded. The circumferential lip 104 of the bulkhead 100 and the lip 128 of the dirt container 120 converge at a width restriction X in the first cyclonic separating unit 160. The width restriction reduces a radial width between the dirt container and the intermediate wall by at least 15 percent The width restriction tapers towards the bowl door 130 so that air, and entrained dirt, can flow more easily towards the bowl door than in the opposite direction. Thus, the circumferential lips 104, 128 and perforated portion 118 of the tapered funnel's skirt 112 catch separated dirt in the bowl 124 before it can be re-entrained in the partially-cleaned air flow. The partially-cleaned air flows through perforations in the intermediate wall, which filters any remaining large dirt particles, and into the distribution chamber 170.

Figure 5:
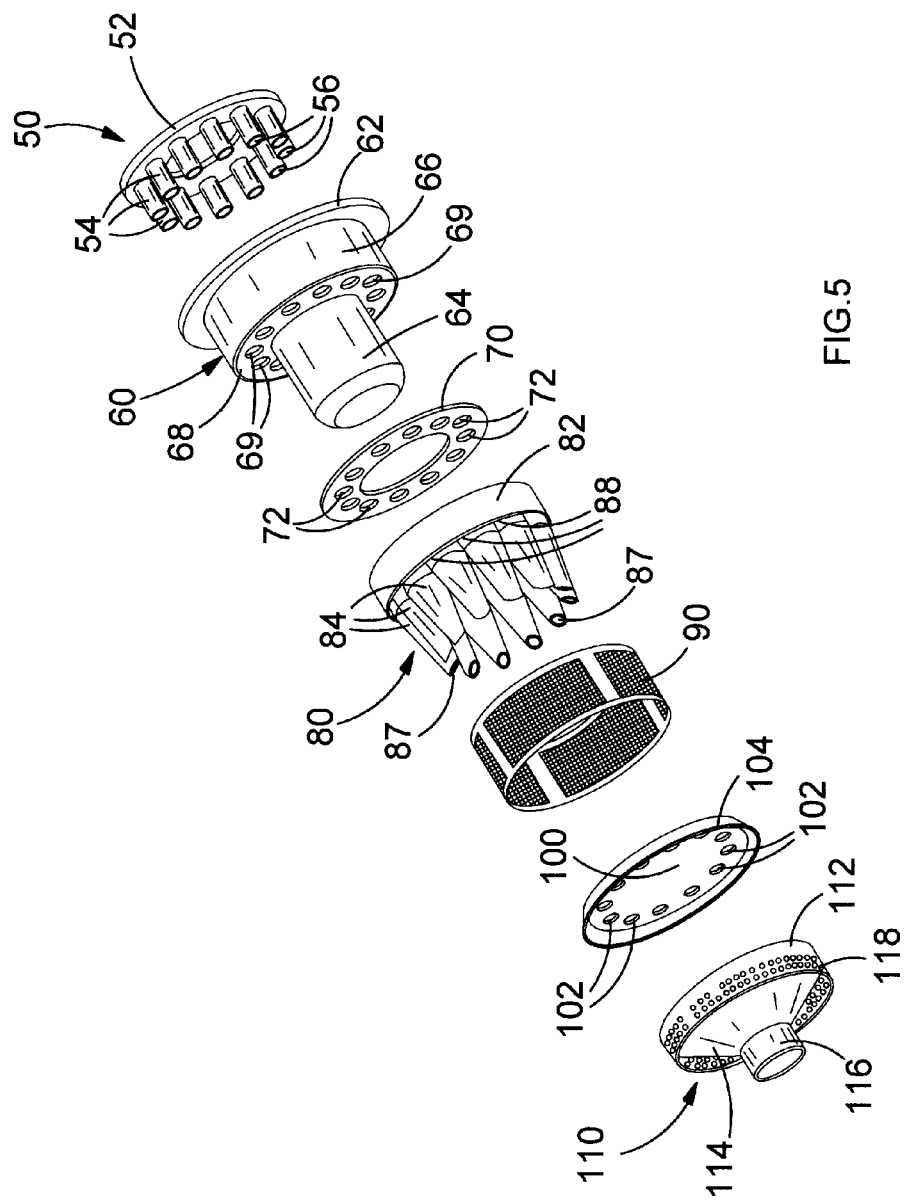
FIG. 5 shows an exploded perspective view of internal components of the cyclonic separation apparatus of FIG. 1.
Figure 6:
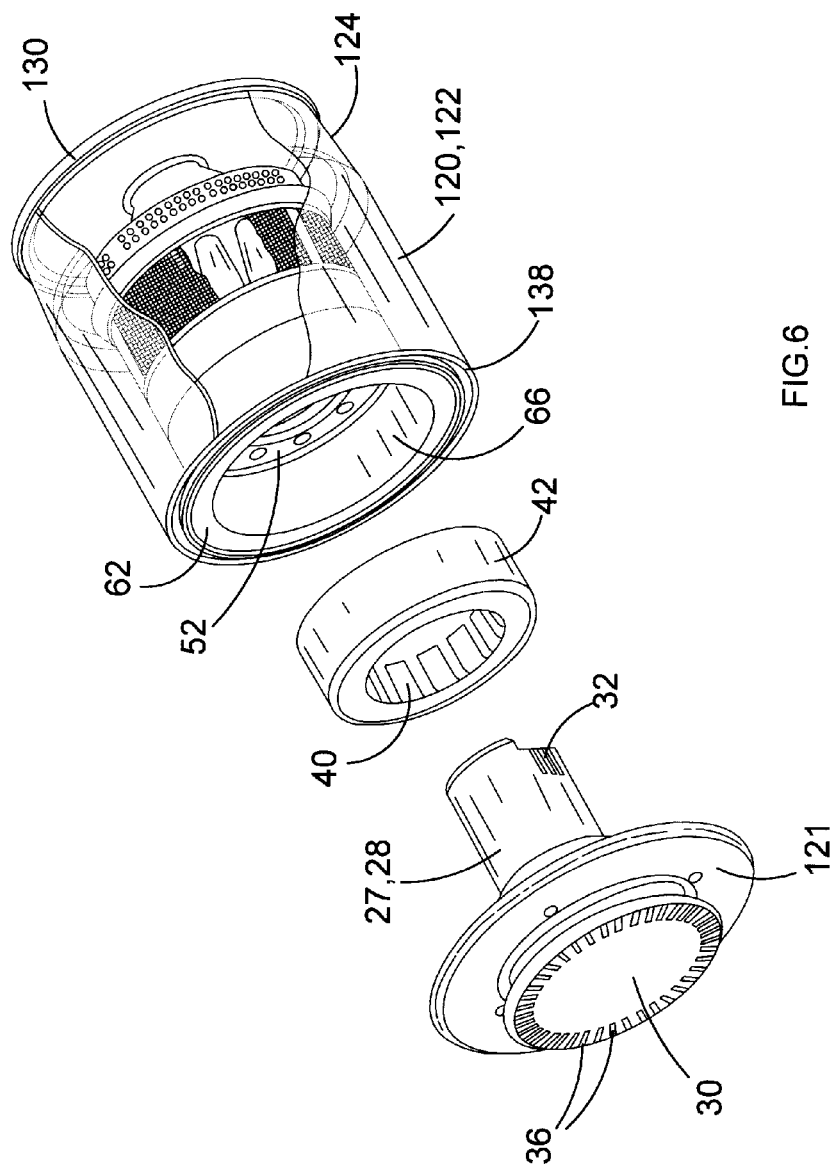
FIG. 6 shows a partially exploded perspective view of the motor, fan and cyclonic separation apparatus arrangement of FIG. 1.
Figure 8:
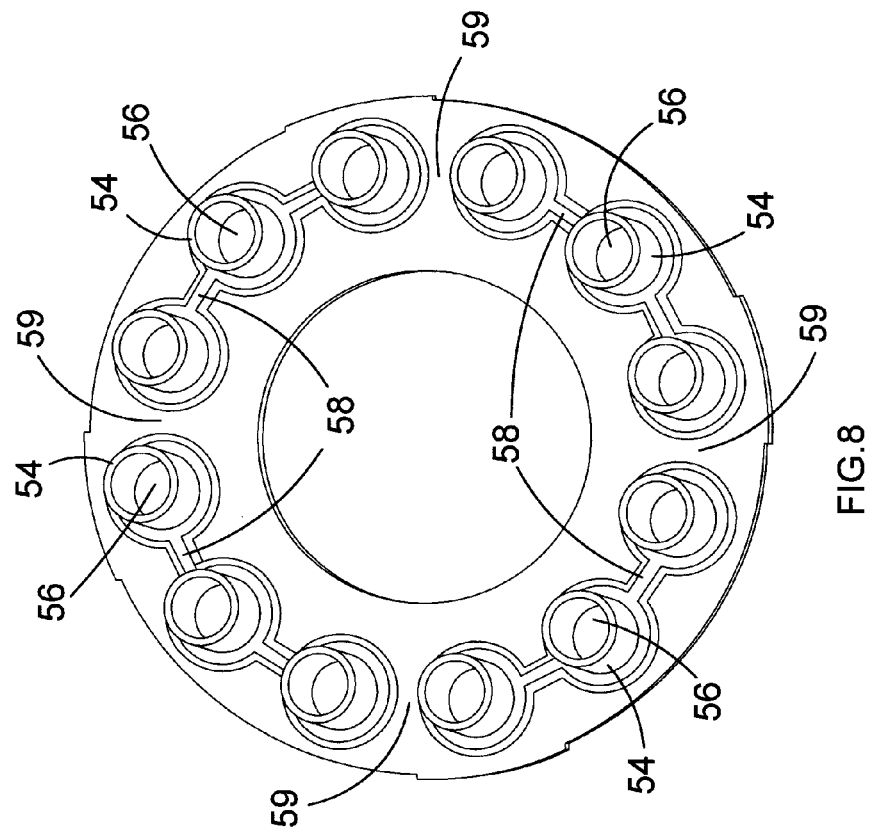
FIG. 8 shows a perspective view of a vortex finder assembly of the cyclonic separation apparatus of FIG. 1.
Figure 7:
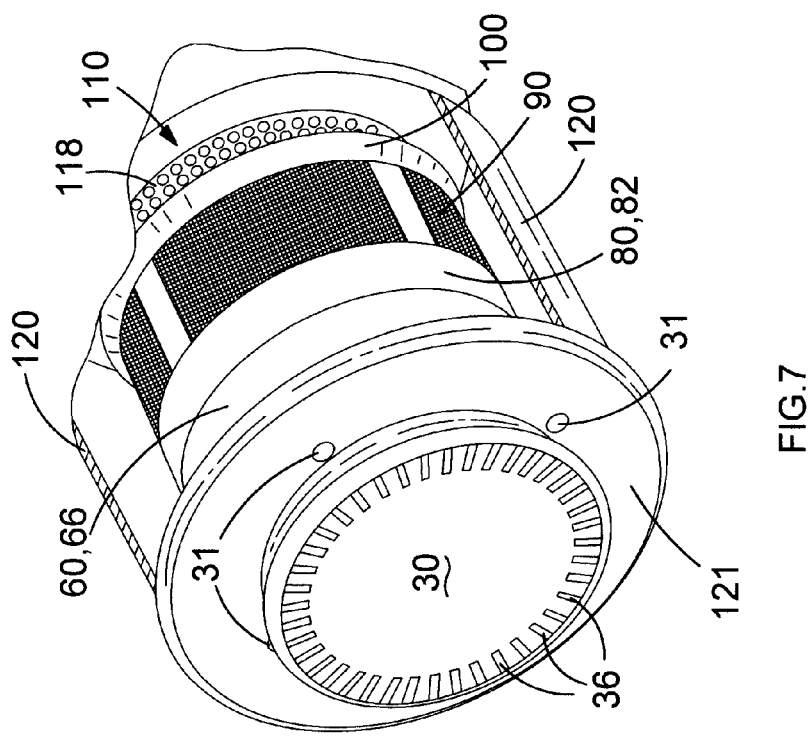
FIG. 7 shows a perspective view of an end cap of the cyclonic separation apparatus arrangement of FIG. 1.
Figure 9D:
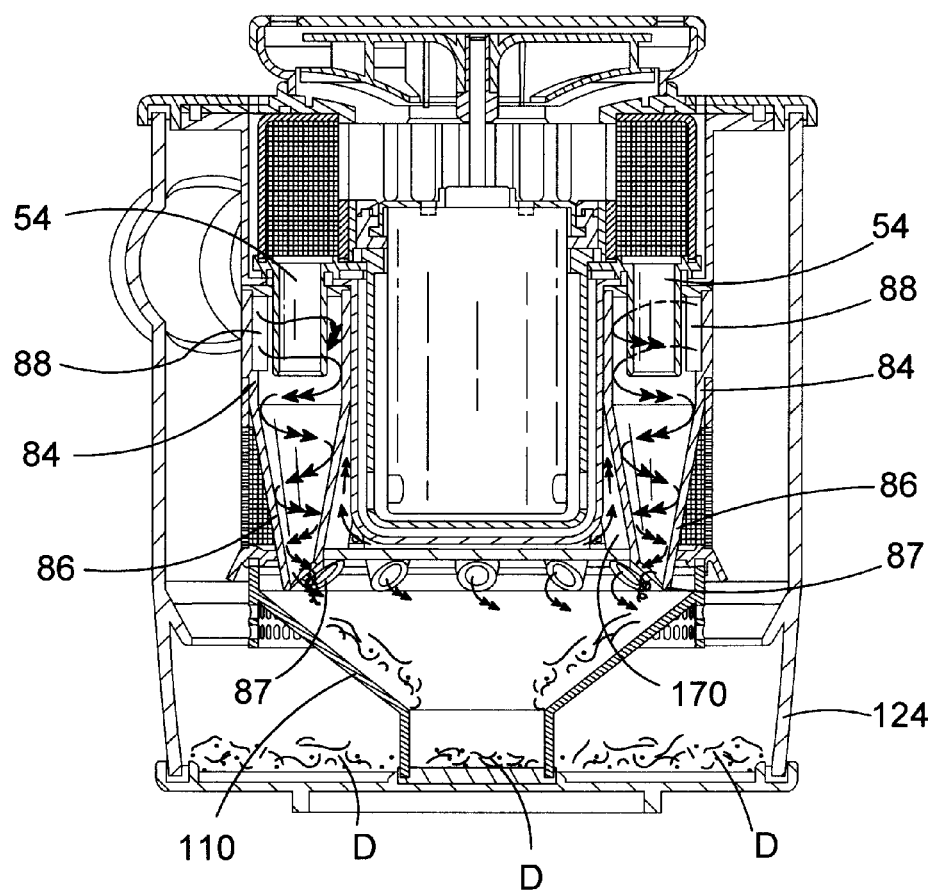

As can be seen in FIG. 5, the air inlet ports 88 of the twelve cyclones are moulded into the collar 82 of the cyclone assembly 80. The distribution chamber 170 is in communication with the air inlet ports 88 of the twelve cyclones 84. Referring to FIG. 9D, the partially-cleaned air flow (double-headed arrows) divides itself, in the distribution chamber, evenly between the twelve air inlet ports 88 from where it flows into the twelve cyclones 84 of the second cyclonic separating unit 150. The air inlet ports 88 direct the partially-cleaned air flow in a helical path around the vortex finders 54. This creates an outer vortex inside each cyclone 84. Centrifugal forces move the dust and dirt outwards to strike the side of the cyclone and separate it from the air flow. The separated dust and dirt swirls towards the discharge nozzle 87. The internal diameter of the frustro-conical part 86 of cyclone diminishes as the air flow approaches the nozzle. This accelerates the outer helical air flow thereby increasing centrifugal forces and separating ever smaller dust and dirt particles. The dust and dirt particles exit the nozzle to be deposited inside the part of the bowl 124 bounded by the tapered funnel 110.

Figure 9E:
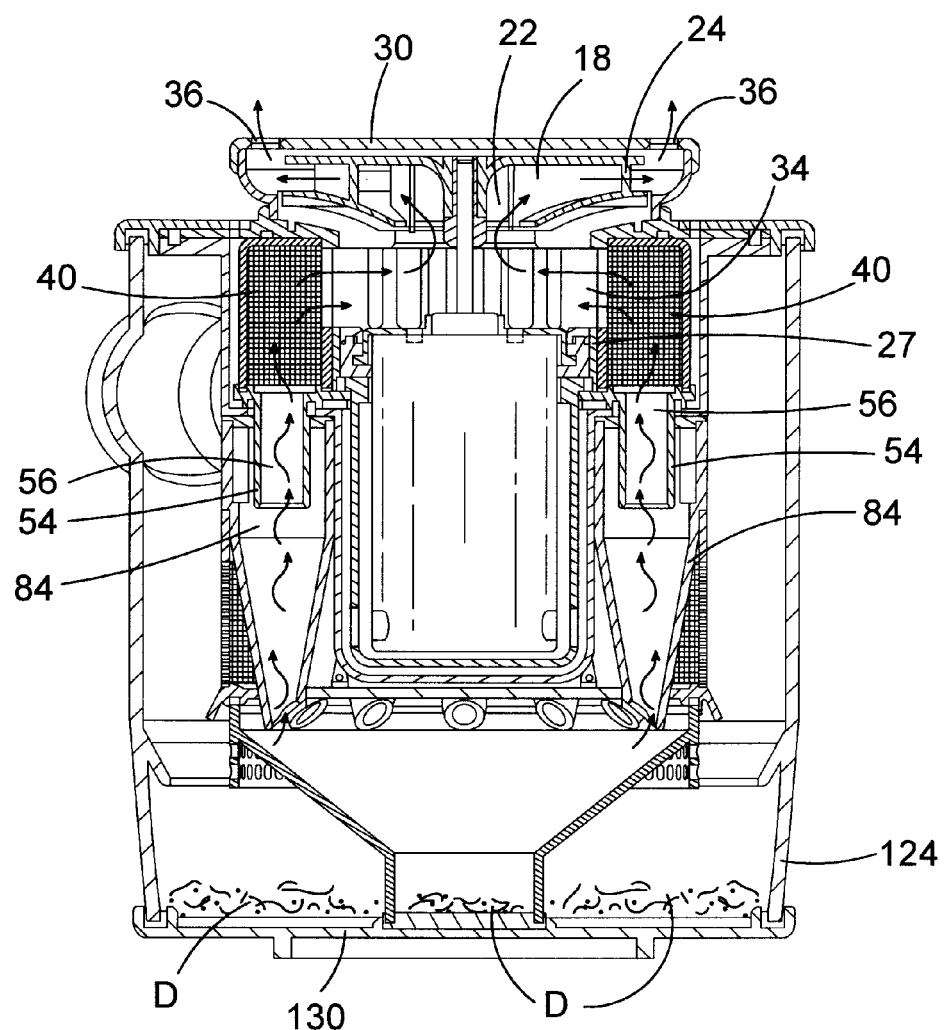

Referring to FIG. 9E, cleaned air (single-headed arrows) flows back on itself to follow a narrow inner helical path through the middle of the cyclone 84. The cleaned air flows out the internal hole 56 of the vortex finder 54, under the influence of the fan, into the pre-fan filter 40. The pre-fan filter 40 is to remove any fine dust and dirt particles remaining in the air flow after the cyclonic separation apparatus 8.

The pre-fan filter is in communication with the motor fan housing 27. Cleaned air flows, via the top slots 34 in the motor fan housing, to the axial input 22 of the fan 18, out the tangential output 24 of the fan and through the perforations 36 of the end cap 30 where it is exhausted from the vacuum cleaner 2. Dust and dirt separated by the first and second cyclonic separating units and deposited in the dirt collection bowl 124 which can be emptied by opening the bowl door 130.

Returning to FIG. 7, there are shown three of a total of four motor cooling inlet ports 31 in the annular roof wall 121 of the dirt container 120. One other motor cooling inlet port is obscured by the end cap 30 in FIG. 7.

Returning to FIG. 8, there are shown four vortex finder seals 58. Each vortex finder seal forms a webbed collar around three consecutive vortex finders 54. Four equiangular spaced small gaps 59 exist between the four vortex finder seals. The vortex finder seals 58 seal the connection between the vortex finder assembly 50 and the inner wall 60 except where the gaps 59 are located.

Referring to FIG. 9F, there is shown the pathway of clean motor cooling air (single-headed arrow) flow through the motor 16 and fan 18. The four motor cooling inlet ports are in communication with a first motor cooling passage 61a between the shell 42 of the pre-fan filter 40 and the cylindrical wall 66 of the inner wall 60.

Referring to FIG. 9G, there is shown a longitudinal cross-section of a vortex finder 54 in the region of Detail X of FIG. 9F. Here, the vortex finder seal 58 blocks communication between the first motor cooling passage 61a and a second motor cooling passage 61b between the motor fan housing 27 and the cylindrical cup 64 of the inner wall 60.

Referring to FIG. 9H, there is shown a longitudinal cross-section between two vortex finders 54 and two vortex finder seals 58 in the region of Detail X of FIG. 9F. Here, the gap 59 between the vortex finder seals 58 permits communication between the first and second motor cooling passages 61a, 61b.

Returning to FIG. 9F, in use, clean motor cooling air flows under the influence of the fan though the four motor cooling inlet ports 31 and along the first motor cooling passage 61a, through the gaps 59 and along the second motor cooling passage 61b from where it enters the motor fan housing 27 via the bottom air flow slots 32. The motor comprises motor vents 17a in the bottom, and motor vents 17b in the top, of the motor can to ventilate the interior of the motor. The paddle wheel 26 circulates and augments motor cooling air about the bottom of the motor. Motor cooling air is drawn, under the influence of the fan, into the bottom motor vents 17a, through the interior of the motor, and passes out of the top motor vents 17b. The motor is cooled by the motor cooling air flow. The motor cooling air flow pathway joins the cleaned air flow pathway from the cyclonic separation apparatus 8 around the axial input 22 of the fan 18. The motor cooling air flow is expelled from the tangential output 24 of the fan and out the perforations 36 of the end cap 30.

The motor cooling inlet ports 31 are spaced at equiangular intervals about the central axis 21. The motor cooling inlet ports are axially aligned with the gaps 59 between the vortex spaces seals 58 and with the bottom air flow slots 32 in the motor fan housing 27. This axial alignment is to help minimise any resistance encountered by the motor cooling air flow along the motor cooling passages 61a, 61b. The bottom motor vents 17a are also aligned with the bottom air flow slots 32 in the motor fan housing 27 to help minimise any resistance encountered by the motor cooling air flow.

The clean motor cooling air flow pathway is separate from the air flow pathway through the cyclonic separation apparatus 8 up to the axial input of the fan 18. This has particular benefits in vacuum cleaning. Typically, motor speed increases as the fan encounters resistance to volumetric air flow and the pressure across the fan increases accordingly. An example of how this may occur is when the vacuum cleaner is operational and the dirty air inlet contacts carpet, hard floor, curtains or other surface to restrict air flow. Should the air flow path through the cyclonic separation apparatus 8 become blocked, or impeded, for whatever reason, the motor cooling air flow path would not necessarily be blocked, or impeded. Instead, the increased pressure across the fan 18 would increase suction through the motor cooling air flow pathway. This has the benefit of increased motor cooling when the motor is working hardest and cooling is needed most.

Figures 43, 44:
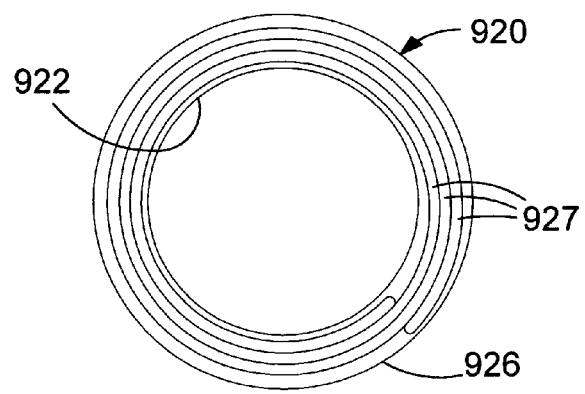
FIG. 44 shows a table of test data relating to the temperature of the motor of FIG. 2 in different operational conditions.

Referring to FIG. 44, there is shown a table of test data relating to the temperature of the motor 16. Two thermocouples were attached to the motor can while the motor was driving the fan 18 to generate air flow. The cyclonic separation apparatus 8 was subjected to three separate tests involving different operational conditions: (a) free air flow (dirty air inlet 12 fully open); (b) maximum power output (air watts) of cyclonic separation apparatus; and (c) sealed suction (dirty air inlet 12 closed). As the skilled person will appreciate, air watt is a measurement of vacuum power calculated from volumetric flow rate (volume/time) multiplied by suction (force/area) multiplied by a correction factor depending on humidity and atmospheric pressure. The ambient temperature was measured and compared to the motor temperature after ten minutes run time. The same three tests were carried out with four motor cooling inlet ports 31 and then repeated with one of the four motor cooling inlet ports 31 closed. The test data clearly reveal the benefits of the motor cooling air flow pathway and the importance of having four motor cooling inlet ports 31.

Figure 10:
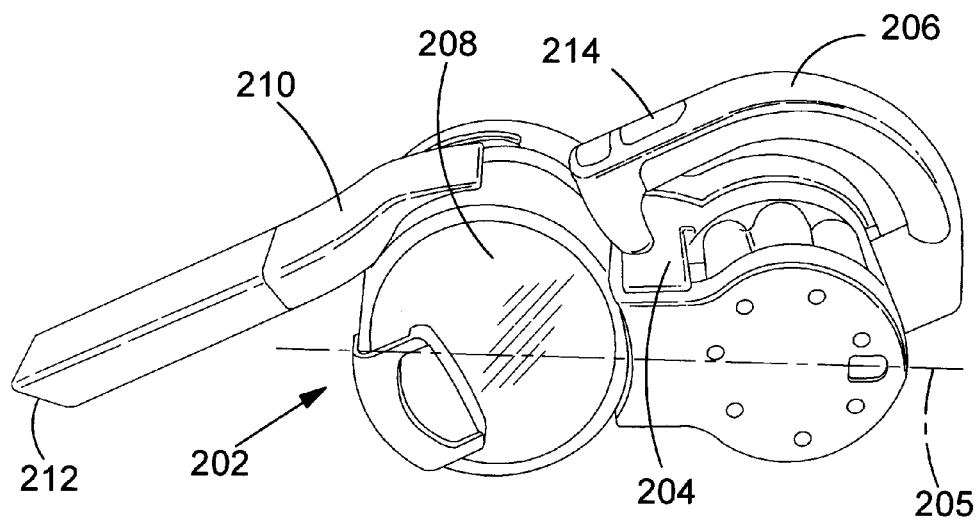
FIG. 10 shows a perspective view of a second embodiment of a hand-held vacuum cleaner with a motor, fan and cyclonic separation apparatus arrangement.
Figure 11:
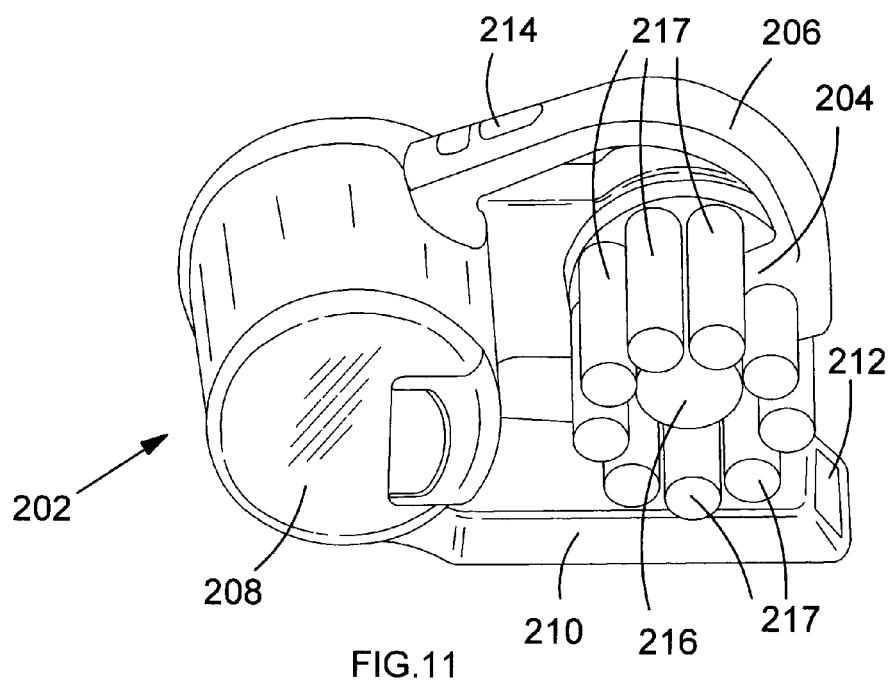
FIG. 11 shows the perspective view of FIG. 10 with a portion of the body removed.
Figure 12:
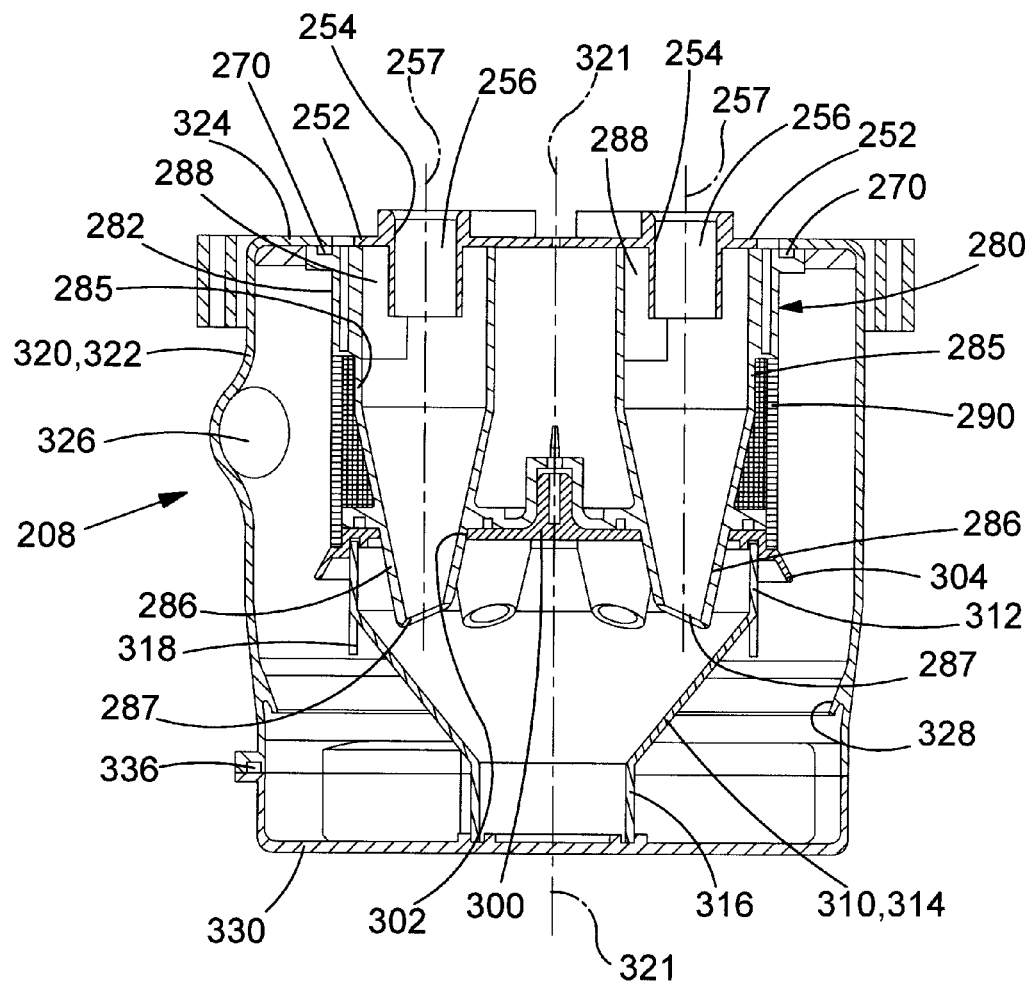
FIG. 12 shows a longitudinal cross-section of the cyclonic separation apparatus of FIG. 10.
Figure 13:
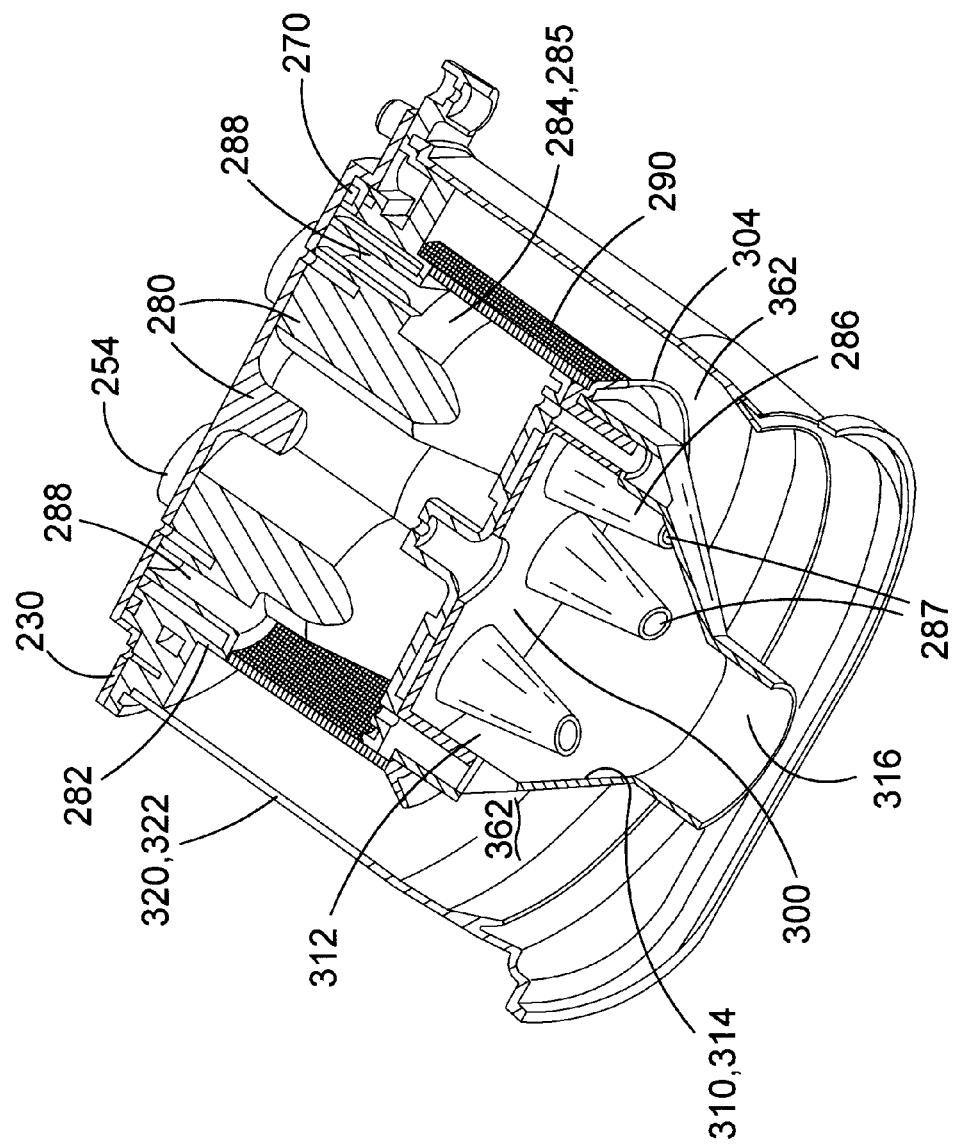
FIG. 13 shows a perspective view of the cross-section of FIG. 12.
Figure 14:
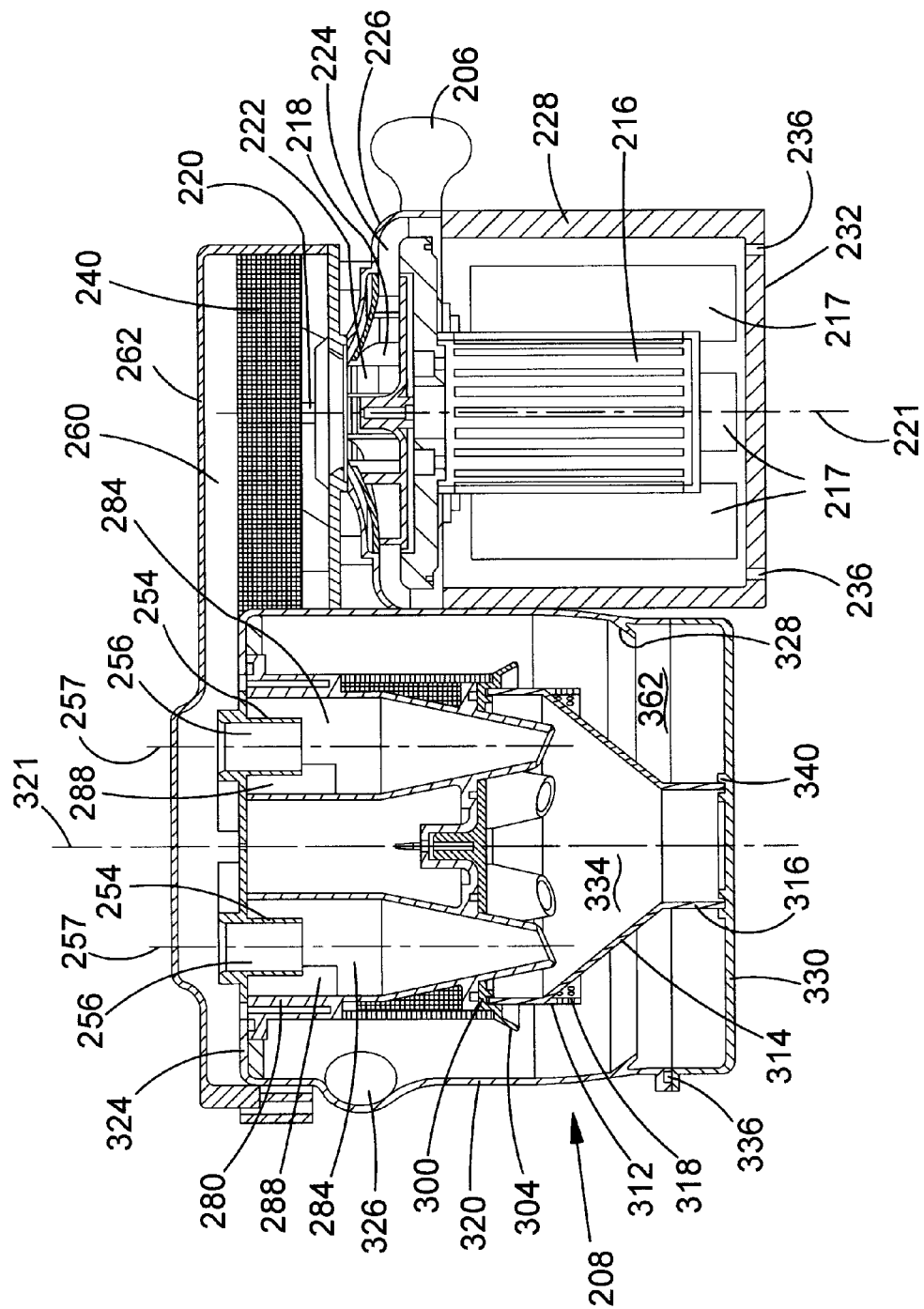
FIG. 14 shows a longitudinal cross-section of the motor, fan and cyclonic separation apparatus arrangement of FIG. 10.
Figure 15:
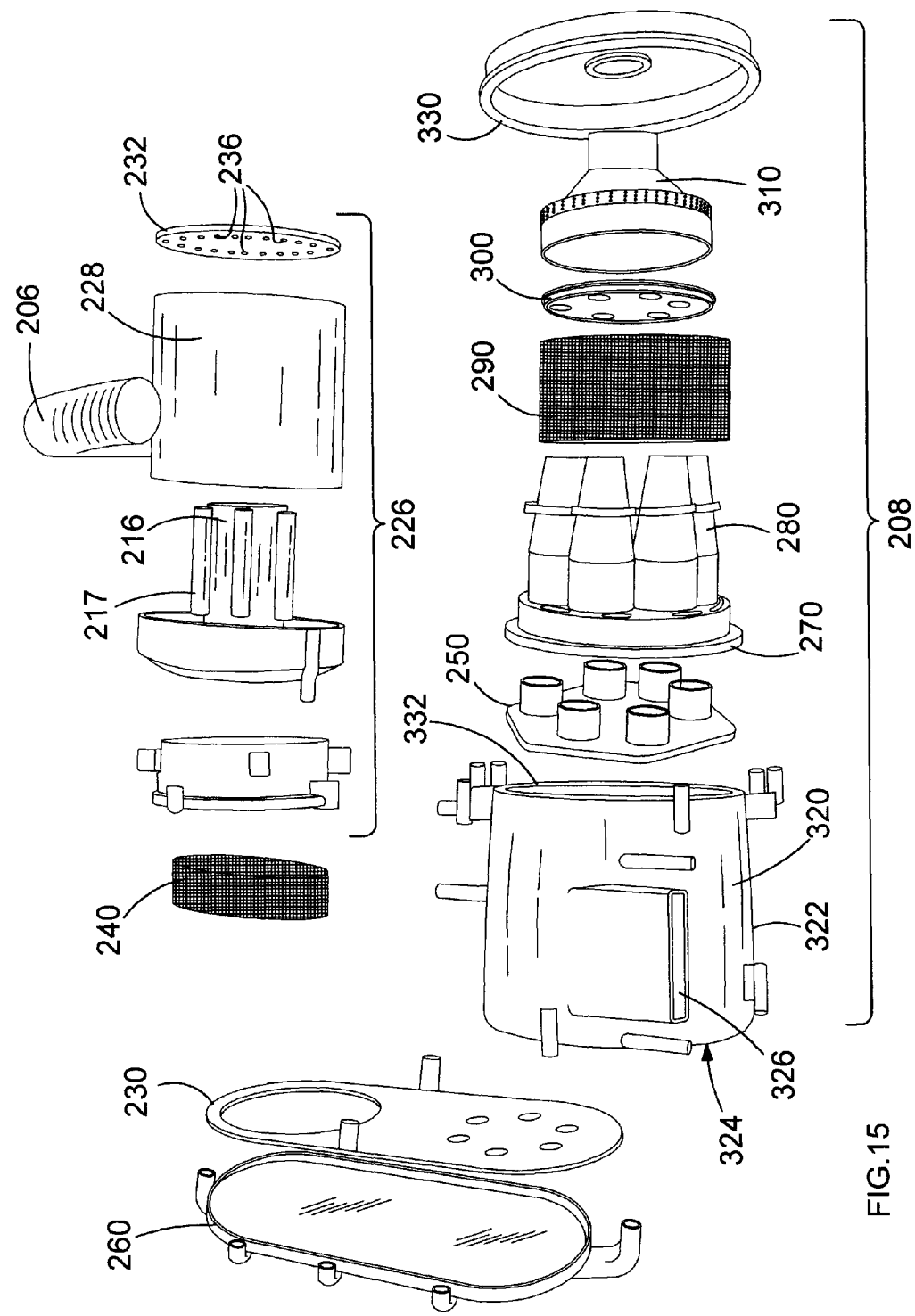
FIG. 15 shows an exploded perspective view of the motor, fan and cyclonic separation apparatus arrangement of FIG. 10.

Referring to FIGS. 10 and 11, there is shown a second embodiment of a hand-held vacuum cleaner 202 comprising a main body 204 with a main axis 205, a handle 206, a cyclonic separation apparatus 208 mounted transverse to the main axis of the main body, and a dirty air duct 210 with a dirty air inlet 212 at one end. The vacuum cleaner comprises a motor 216 coupled to a fan for generating air flow through the vacuum cleaner and rechargeable cells 217 to energise the motor when electrically coupled by an on/off switch 214.

Referring to FIGS. 12 to 16, there is shown an arrangement comprising the motor 216, the rechargeable cells 217, the fan 218, a pre-fan filter 240, a cyclonic separation apparatus outlet duct 260 and the cyclonic separation apparatus 208.

The motor has a drive shaft 220 with a longitudinal central axis 221. The fan is a centrifugal fan 218 with an axial input 222 facing away from the motor and a tangential output 224. The fan has a diameter of 68 mm. The fan is mounted upon the drive shaft at the top of the motor. The cells 217 are arranged in a circular array about the motor 216 with the longitudinal axis of the cells parallel to the central axis 221, as is shown most clearly in FIGS. 11 and 14. In use, the motor drives the fan to generate air flow through the cyclonic separation apparatus, as will be described in more detail below.

The main body 204 comprises a central housing 226, a motor housing 228, a frame 230 and an end cap 232. The fan 218 is housed in the central housing 226. The central housing is connected to the handle 206. The motor 216 and the cells 217 are housed in the motor housing 228. The motor housing is generally elongate to suit the profile of the cells. The end cap 230 is connected to an opposite end of the motor housing to the fan. The end cap has a circular array of perforations 236.

The frame 230 connects the central housing 226 to the cyclonic separation apparatus 208. One end of the frame supports a pre-fan filter 240 arranged in front of the axial input 222 of the fan 218. The other end of the frame supports the cyclonic separation apparatus.

The outlet duct 260 is defined by a generally oval-shaped duct wall 262 arranged upon the frame 230 to form the outlet duct between the duct wall and frame. The outlet duct 260 provides an air flow path between the cyclonic separation apparatus 208 and the pre-fan filter 240. The duct wall is detachable from the frame. The duct wall is transparent to permit visual inspection of the pre-fan filter. The duct wall is removed from the frame if the pre-fan filter needs cleaning or replacement.

The cyclonic separation apparatus 208 comprises, a vortex finder assembly 250, a vortex finder seal 270, a cyclone assembly 280, a cylindrical perforated intermediate wall 290, a circular bulkhead 300, a tapered funnel 310, a transparent generally cylindrical dirt container 320 with a longitudinal central axis 321, and a circular dirt collection bowl 330 all arranged about the central axis 321 of the dirt container 320.

The vortex finder assembly 250 comprises a planar generally circular base 252 with six hollow cylindrical vortex finders 254. Each vortex finder has a central through-hole 256 and its own longitudinal central axis 257. The vortex finders are arranged in a circular array about the central axis 321 of the dirt container 320. Each vortex finder is parallel to the central axis 321. The vortex finders protrude from one side of the base. A small portion of each vortex finder also protrudes from the opposite side of the base. The vortex finders may have longitudinal internal ribs (not shown) along the through-holes to help dampen high frequency sounds caused by Helmholtz resonance as air flows through the vortex finder though-holes 256.

The cyclone assembly 280 comprises a generally cylindrical collar 282 and a circular array of six cyclones 284 surrounded by the collar. The cyclones are spaced at equi-angular intervals about the central axis 321 of the dirt container 320. Each cyclone has a hollow cylindrical top part 285 and a hollow frustro-conical bottom part 286 depending from the cylindrical top part and terminating with a discharge nozzle 287 at the bottom of the cyclone.

The vortex finder assembly 250 is arranged upon the collar 282 of the cyclone assembly 280. The vortex finders 254 protrude into the cylindrical top part 285 of a respective cyclone 284. The only passage through of the top of the cyclone 284 is via its vortex finder 254 which acts as an air flow port to the outlet duct 260. Each vortex finder is concentric with its respective cyclone. The plane of each nozzle 287 is inclined with respect to the central axis 257. This helps to prevent dust and dirt particles from re-entry after discharge from the nozzle.

The cylindrical top part 285 of each cyclone 284 has an air inlet port 288 arranged tangentially through a side of the cyclone and proximal the vortex finder 254. The six air inlet ports are in communication with a distribution chamber 370 located below the collar 282 around the cyclones 284 as described in more detail below.

The intermediate wall 290 is arranged upon the cyclone assembly 280. The intermediate wall 290 has approximately the same outer diameter as, and abuts with, the cylindrical collar 282.

The bulkhead 300 is arranged upon, and has approximately the same outer diameter as, the intermediate wall 290. The bulkhead 300 is perforated by a circular array of six holes 302 spaced at equi-angular intervals about the central axis 321. The discharge nozzles 287 of the cyclones 284 protrude through respective bulkhead holes 302. The bulkhead 300 has a circumferential lip 304 inclined radially outwardly from the central axis 321 towards the collection bowl 330. The lip 304 protrudes a small way from the intermediate wall 290.

The tapered funnel 310 comprises a hollow circumferential skirt 312, a frustro-conical cone 314 depending from the skirt, and a hollow cylindrical nose 316 depending from the cone. The skirt is arranged upon, and has approximately the same outer diameter as, the bulkhead 300. The cone tapers radially inwardly from the bulkhead towards the collection bowl 330. A perforated portion 318 of the skirt protrudes axially rearward from the cone towards the collection bowl 330.

The generally cylindrical dirt container 320 comprises a hollow cylindrical exterior wall 322 with a circular shoulder 324 extending radially inwardly from the top of the exterior wall. The dirty container has a dirty air inlet port 326 arranged tangentially through the exterior wall 322. The dirty air inlet port communicates with the dirty air duct 210. The exterior wall 322 is rotatingly connected to the frame 230 to enable the cyclonic separation apparatus 208 to rotate about its central axis 321 in relation, to the main body 204. The dirty air duct 210 is rotatable with the cyclonic separation apparatus 208, as is shown in FIG. 11 where the dirty air duct is in a folded position.

The planar base 252 of the vortex finder assembly 250 nests within the aperture in the circular shoulder 324 of the dirt container 320. The collar 282 of the cyclone assembly 280 abuts the circular shoulder 324. The cyclones 284 are located within the dirt container 320.

The dirt collection bowl 330 is detachably connected to an outer circumferential edge 332 of the dirt container 320. The dirt collection bowl abuts the nose 316 thereby dividing the dirt container and dirt collection bowl into two separate chambers: a circular chamber 334 inside the tapered funnel 310 and a generally annular chamber 362 outside the tapered funnel. The dirt collection bowl 330 may be connected to the dirt container's outer circumferential edge by snap-fit, bayonet fit, interlocking detents, interference fit or by a hinge. A resilient seal 336 made of polyethylene, rubber or a similar elastomeric material is provided around the dirt collection bowl 330 to ensure airtight connection with the dirt container.

The dirt container 320 has an annular lip 328 inclined radially inwardly to the central axis 321 towards the collection bowl 330. The lip 328 protrudes a small way in from the exterior wall. The lip 328 is proximal to the bowl 330.

The nose 316 of the tapered funnel 310 is in complementary mating relationship with a circular ring 340 protruding from inside the dirt collection bowl 330. This ensures that components of the cyclonic separation apparatus 208 remain concentric with the central axis 321 of the dirt container 320.

In use, dirty air flows, under the influence of the fan 218, in the dirty air inlet 212, up the dirty air duct 210 and into the cyclonic separation apparatus 208 where dust and dirt entrained in the air flow is separated therefrom. The dust and dirt is collected within the cyclonic separation apparatus. The air flows out the cyclonic separation apparatus 208, via the through-holes 256 of the vortex finders, along the outlet duct 260, through the pre-fan filter 240, through the fan 218 and over the motor 216 and batteries cells 217 via the motor housing 228 and out the perforations 236 in the end cap 230.

Figure 17A:
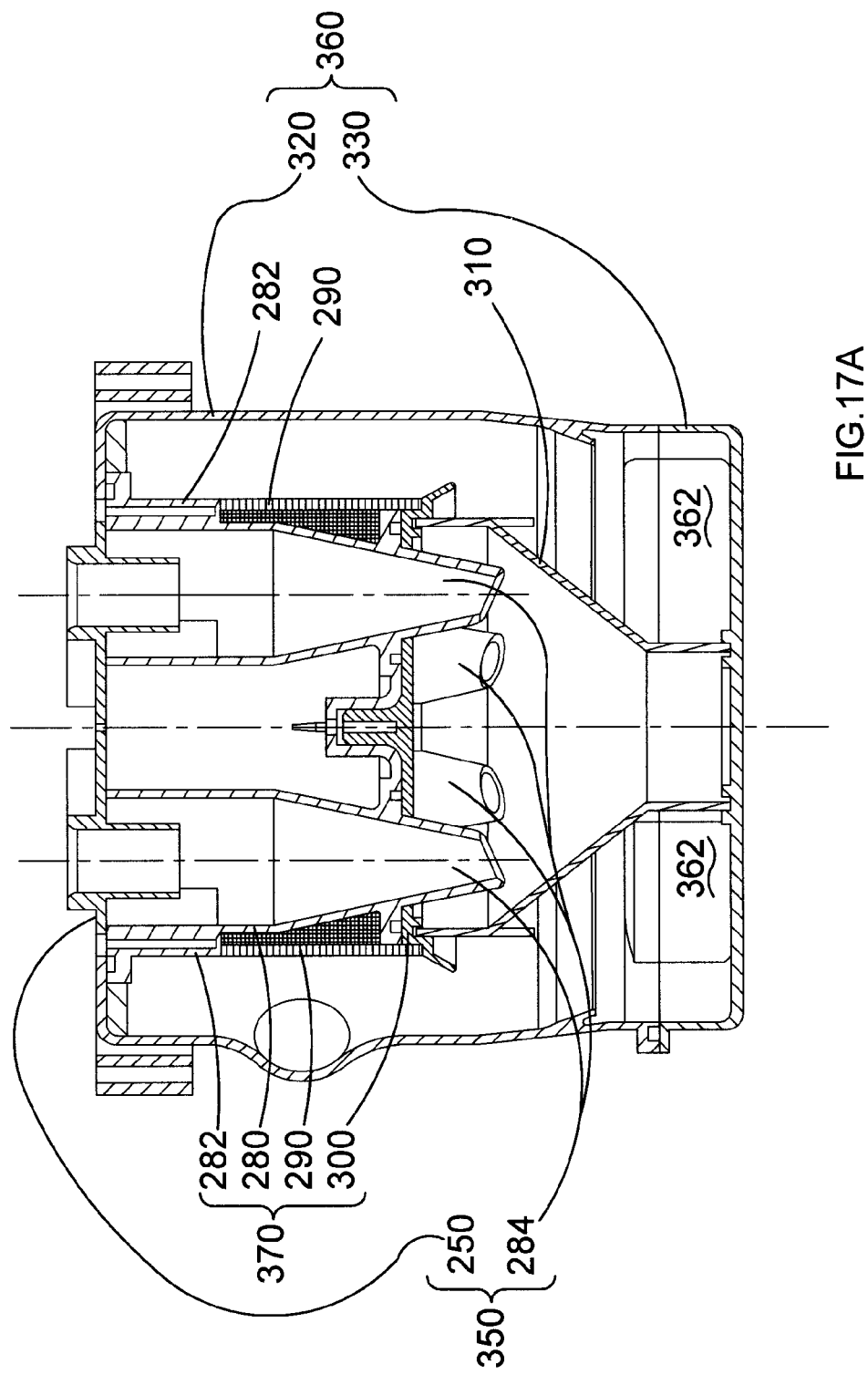
FIGS. 17A to 17F shows the longitudinal cross-section of FIG. 12 including the air flow through the cyclonic separation apparatus arrangement, in use.

Referring to FIG. 17A, the cyclonic separation apparatus 208 is divided into a first cyclonic separating unit 360, a second cyclonic separating unit 350 and the distribution chamber 370. The first cyclonic separating unit is located in the air flow pathway upstream of the distribution chamber. The distribution chamber is located in the air flow pathway upstream of the second cyclonic separating unit.

The first cyclonic separating unit 360 comprises the cylindrical dirt container 310. The second cyclonic separating unit 350 comprises the circular array of six cyclones 284. The dirt container is concentric with the central axis 321 of the dirt container. The distribution chamber 370 is bounded by the collar 282, cyclone assembly 280, intermediate wall 290 and bulkhead 300. The second cyclonic separating unit 350 receives air flow from the first cyclonic separating unit 360 via the distribution chamber 370.

The exterior wall 322 of the dirt container 320 has a diameter of approximately 120 mm. The cyclones 284 have a smaller diameter than the annular chamber 362. Helical air flow in the cyclones experiences greater centrifugal forces than in the dirt container. Thus, the cyclones of the second cyclonic separating unit 350, when combined, have higher separation efficiency than the dirt container of the first cyclonic separating unit 360.

The air flow pathway though the cyclonic separation apparatus 208 is described in more detail with reference to FIGS. 17B to 17F.

Figure 17B:
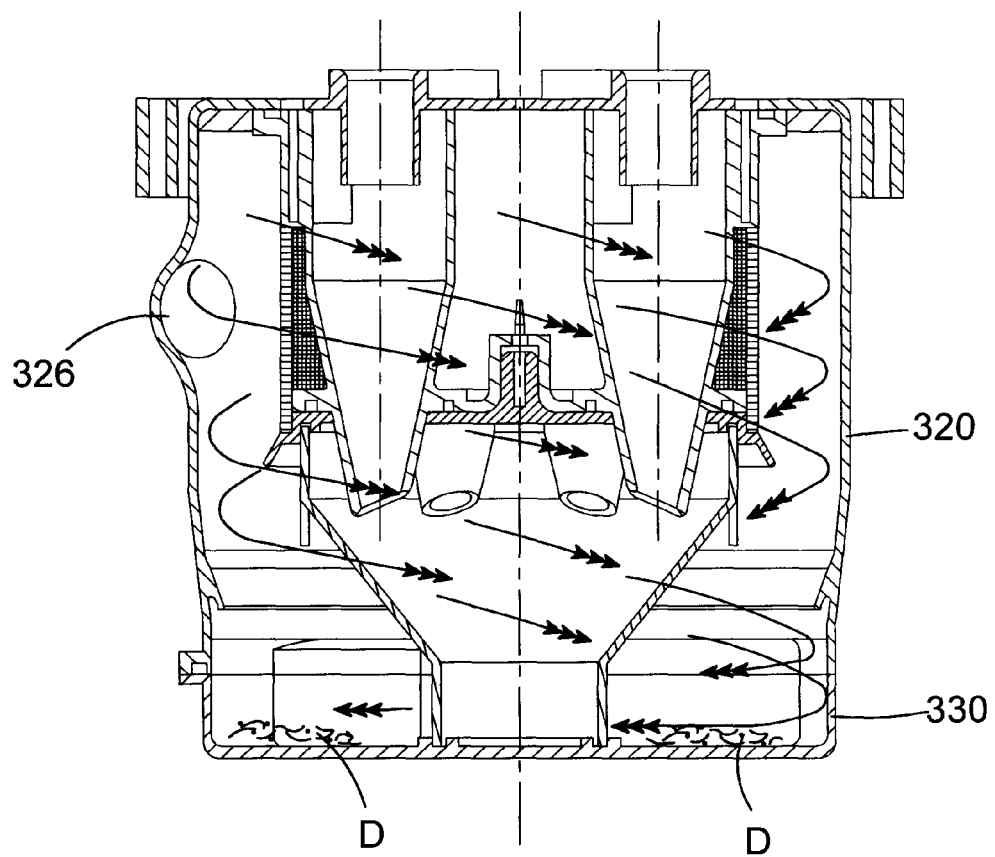

Referring to FIG. 17B, dirty air (triple-headed arrows) flows from the dirty air duct 210 and into the dirt container 320 via the dirty air inlet port 326. The tangential arrangement of the dirty air inlet port 326 causes the dirty air to flow in a helical path around the dirt container. This creates an outer vortex in the dirt container. Centrifugal forces move the comparatively large dust and dirt (D) particles outwards to strike the side of the dust container 320 and separate them from the air flow. The separated dust and dirt swirls towards the dirt collection bowl 330 where it is deposited.

Figure 17C:
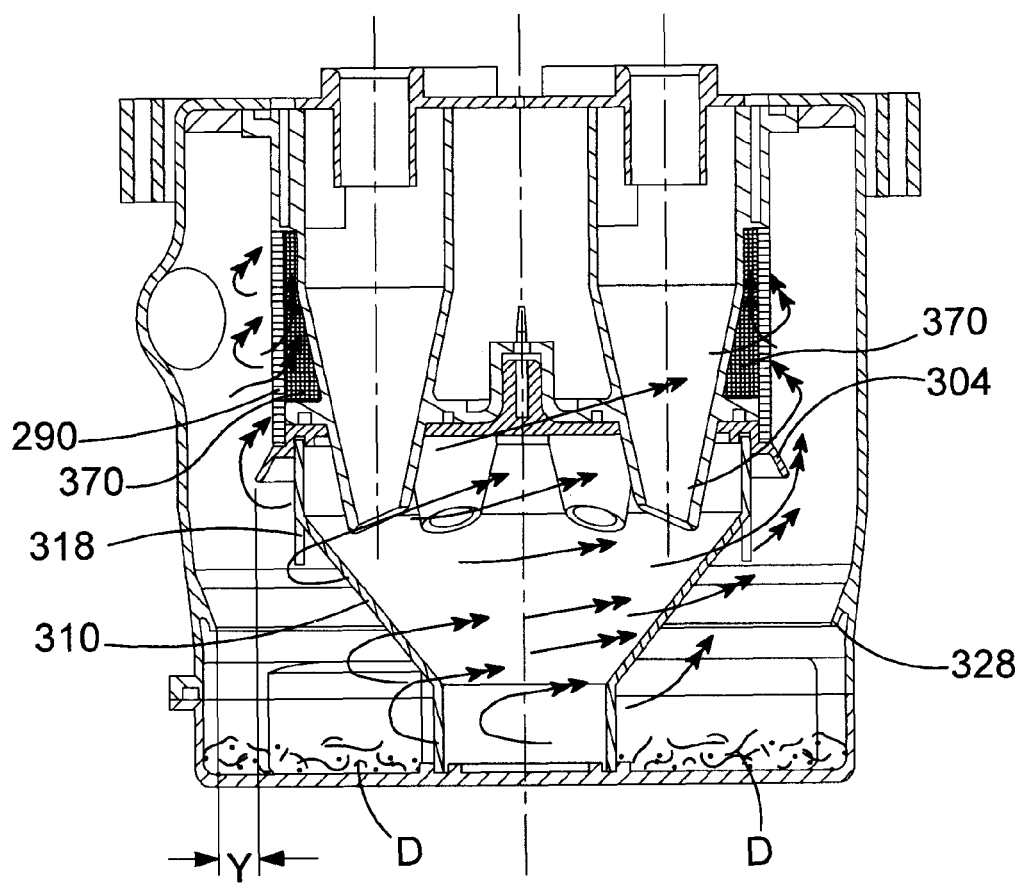

Referring to FIG. 17C, partially-cleaned air (double-headed arrows) flows back on itself to follow an inner helical path closely about the tapered funnel 310 and towards the cylindrical intermediate wall 290. The partially-cleaned air flows through the perforated portion 318 of the tapered funnel's skirt 312 largely unimpeded. The circumferential lip 304 of the bulkhead 300 and the lip 328 of the dirt container 320 converge at a width restriction Y in the first cyclonic separating unit 360. The width restriction reduces a radial width between the dirt container and the intermediate wall by at least 15 percent. The width restriction tapers towards the bowl 330 so that air, and entrained dirt, can flow more easily towards the bowl door than in the opposite direction. Thus, the circumferential lips 304, 328 and perforated portion 318 of the tapered funnel's skirt 312 catch separated dirt in the bowl 324 before it can be re-entrained in the partially-cleaned air flow. The partially-cleaned air flows through perforations in the intermediate wall, which filters any remaining large dirt particles, and into the distribution chamber 370.

Figure 16:
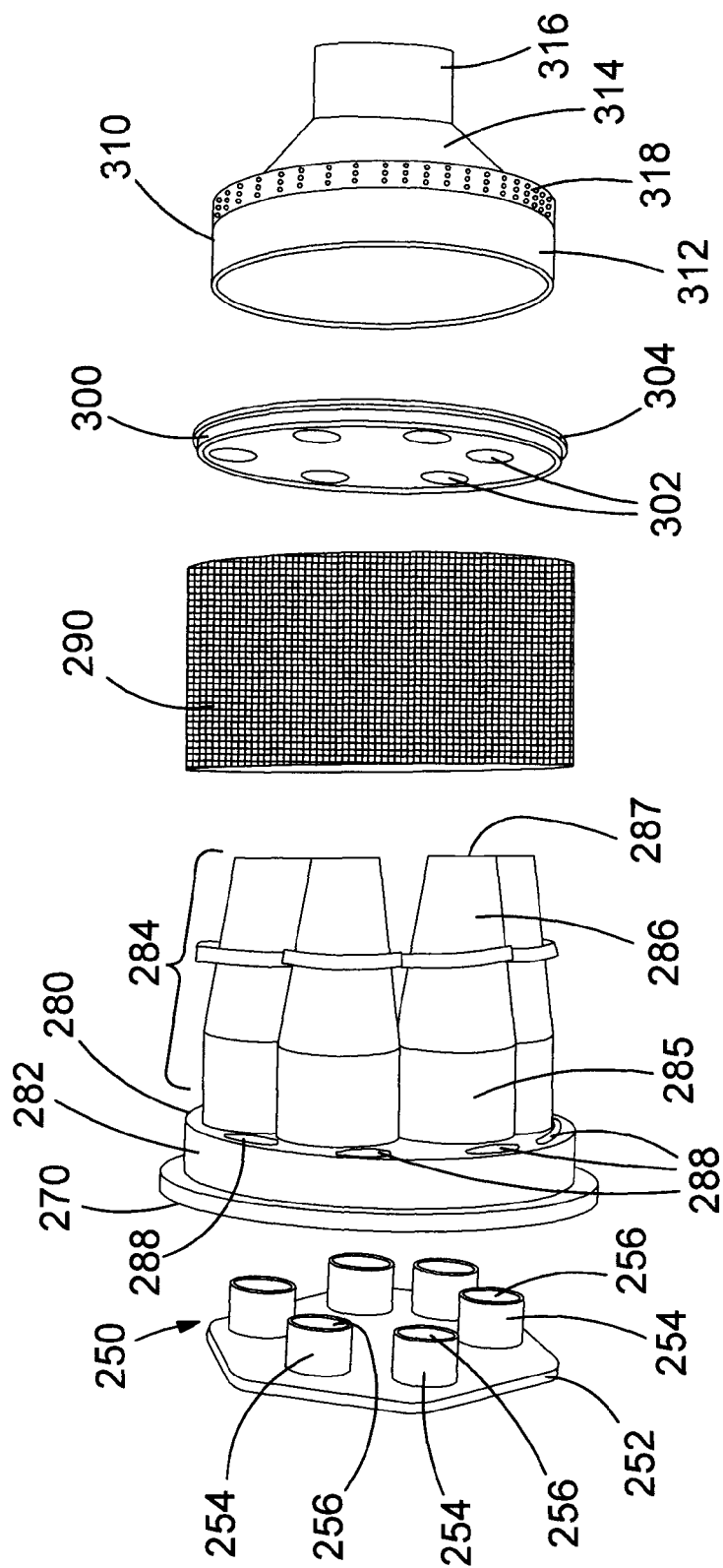
FIG. 16 shows an exploded perspective view of internal components of the cyclonic separation apparatus of FIG. 10.
Figure 17D:
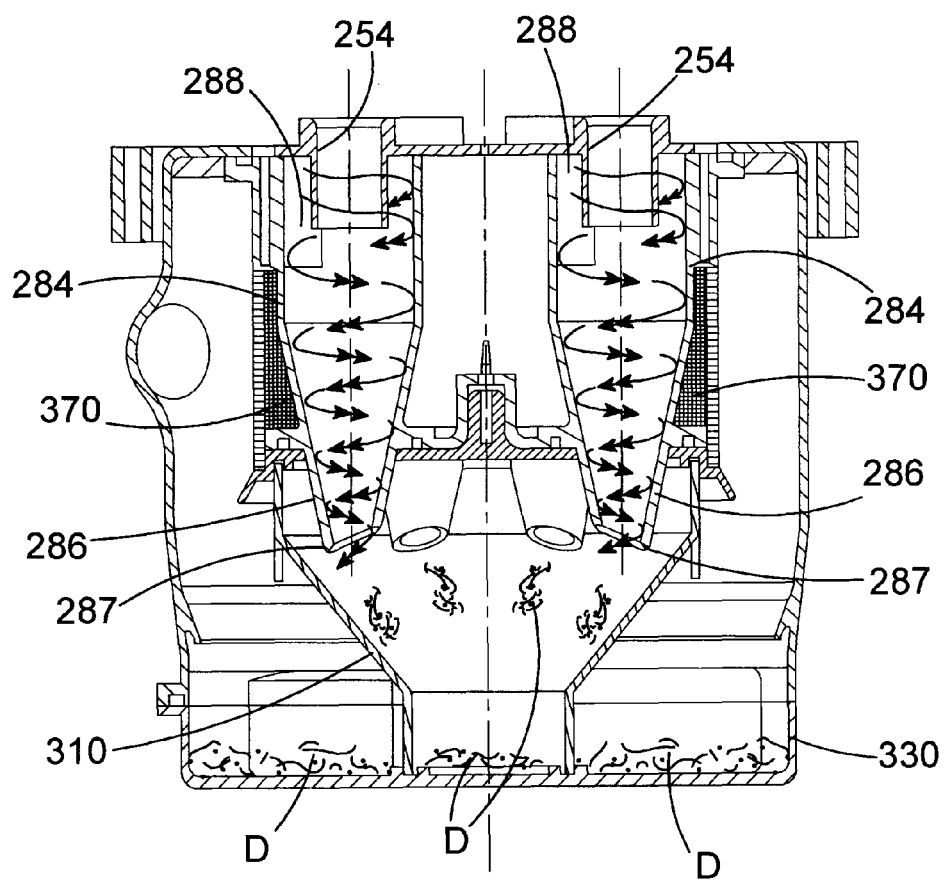

As can be seen in FIG. 16, the air inlet ports 288 of the six cyclones are moulded into the collar 282 of the cyclone assembly 280. The distribution chamber 370 is in communication with the air inlet ports 288 of the six cyclones 284. Referring to FIG. 17D, the partially-cleaned air flow (double-headed arrows) divides itself, in the distribution chamber, evenly between the six air inlet ports 288 from where it flows into the six cyclones 284 of the second cyclonic separating unit 350. The air inlet ports 288 direct the partially-cleaned air flow in a helical path around the vortex finders 254. This creates an outer vortex inside each cyclone 284. Centrifugal forces move the dust and dirt outwards to strike the side of the cyclone and separate it from the air flow. The separated dust and dirt swirls towards the discharge nozzle 287. The internal diameter of the frustro-conical body 286 of cyclone diminishes as the air flow approaches the nozzle. This accelerates the helical air flow thereby increasing centrifugal forces and separating ever smaller dust and dirt particles. The dust and dirt particles exit the nozzle to be deposited inside the part of the bowl 330 bounded by the tapered funnel 310.

Figure 17E:
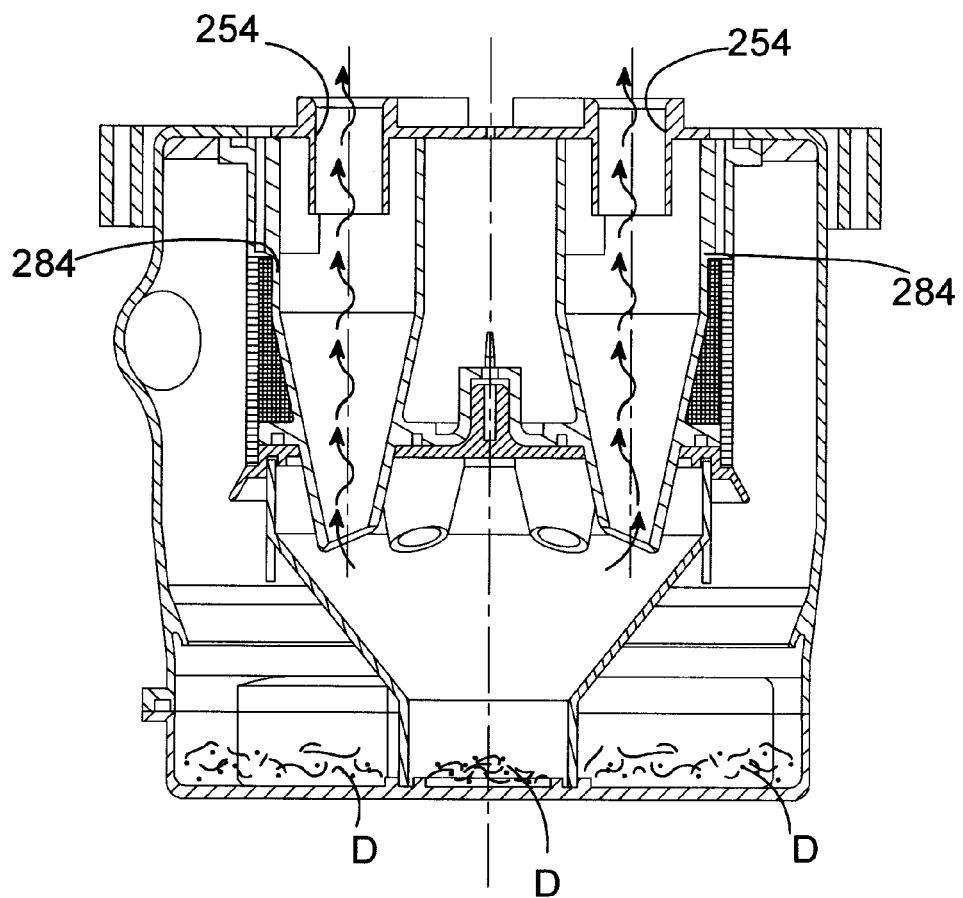
Figure 17F:
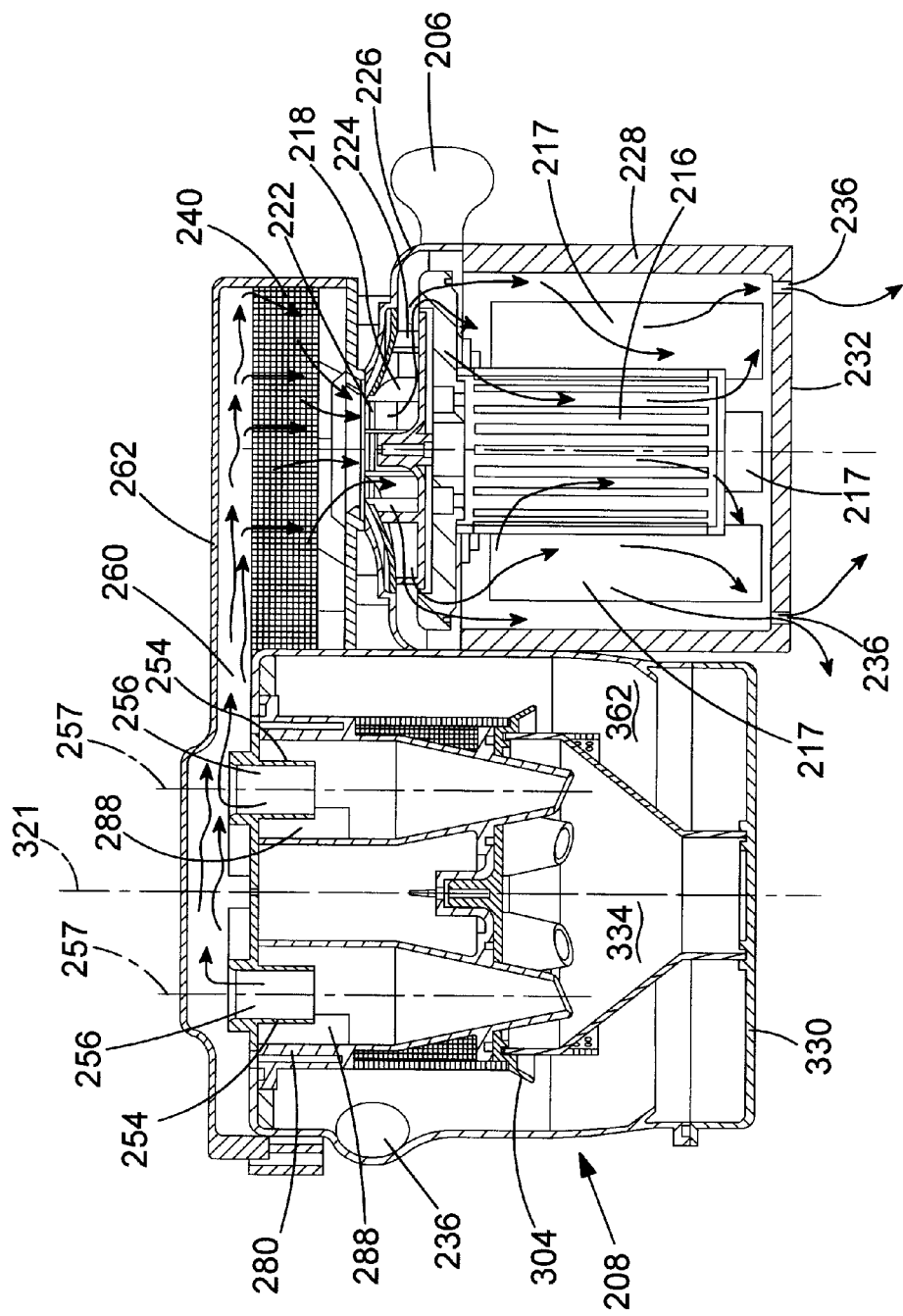

Referring to FIG. 17E, cleaned air (single-headed arrows) flows back on itself to follow a narrow inner helical path through the middle of the cyclone 284. The cleaned air flows out the internal through-hole 256 of the vortex finder 254, under the influence of the fan.

Returning to FIG. 17F, the cleaned air flows from the vortex finders 254 into the outlet duct 260 and to the pre-fan filter 240. The pre-fan filter 240 is to remove any fine dust and dirt particles remaining in the air flow after the cyclonic separation apparatus 208 and before the fan 218. The clean air flows into the axial input 222 of the fan 218 and is expelled from the tangential output 224 of the fan. Pathways in the central housing 226 direct the clean air flow from the fan over the motor 216 and cells 217, to cool the motor and cells, before the air flows out the perforations 236 in the end cap 232.

Dust and dirt separated by the first and second cyclonic separating units and deposited in the dirt collection bowl 330 which can be opened for emptying.

Figure 18:
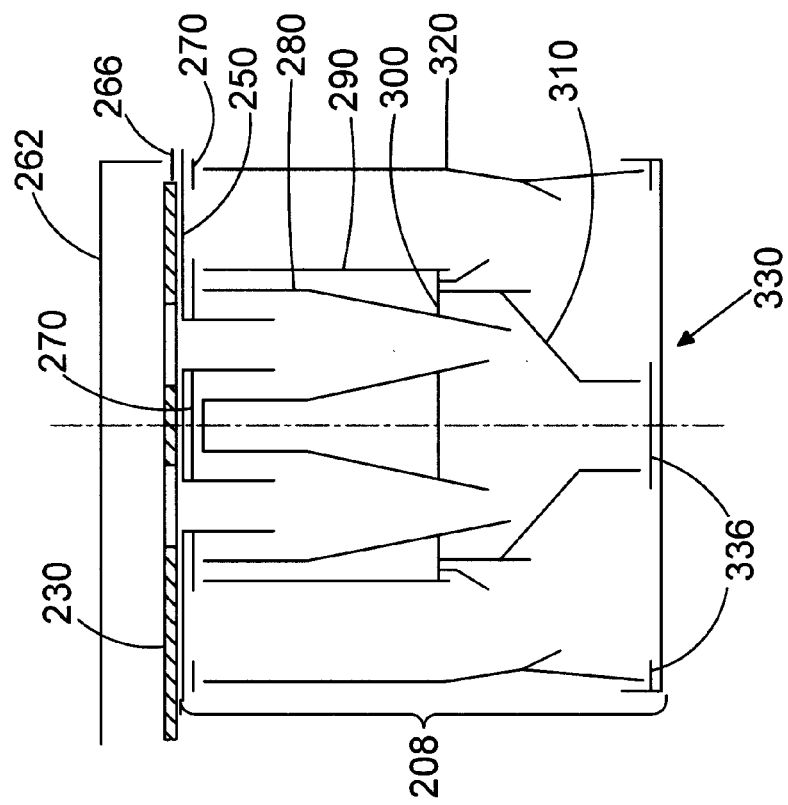

Referring to FIG. 18, there is shown a diagrammatical view of the various components of the cyclonic separation apparatus 208 (vortex finder assembly 250, vortex finder seal 270, cyclone assembly 280, intermediate wall 290, bulkhead 300, tapered funnel 310) located within confines of the outlet duct 260, frame 230, dirt container 320 and dirt collection bowl 330.

The vortex finder seal 270 seals the connections between the vortex finder assembly 250 and the dirt container 320 in an airtight manner. An outlet duct seal 266 seals the connection between the frame 230 and the outlet duct wall 262 in an airtight manner. The vortex finder seal 270 and the outlet duct seal 266 are made of polyethylene, rubber or a similar elastomeric material.

Certain components of the cyclonic separation apparatus 208 are detachably connected, typically by a snap-fit, bayonet fit, interference fit or by interlocking detents. This permits disassembly and reassembly, without tools, of the cyclonic separation apparatus in order to clean, or replace, its individual components, as is described with reference to FIGS. 19 to 22.

Figure 19:
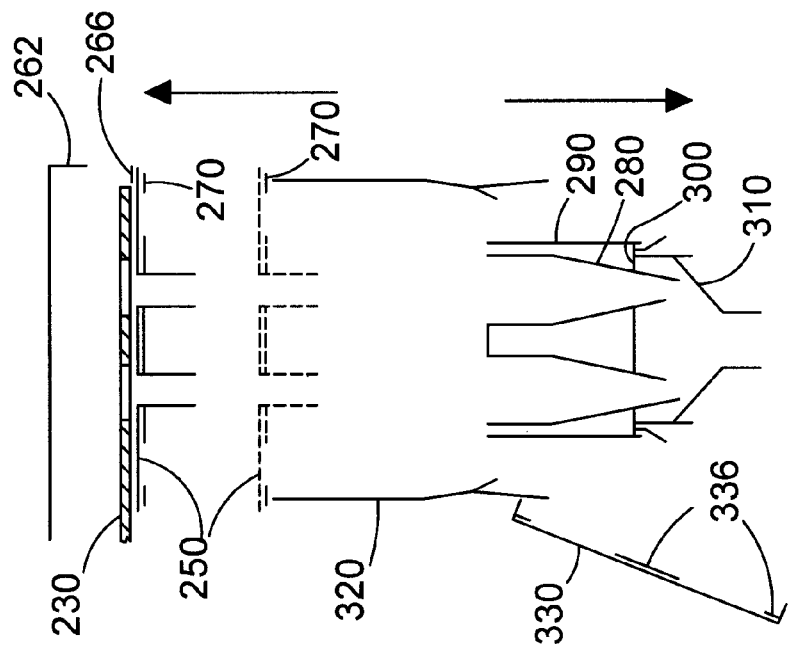
FIGS. 18 to 22 show diagrammatical representations of various constructions of the cyclonic separation apparatus of FIG. 10.

Referring to FIG. 19, there is shown a method of disassembling a first construction of the cyclonic separation apparatus 208 whereby the outlet duct wall 262 is detachable from the frame 230. The dirt container 320 is detachable from the frame. The vortex finder assembly is detachable from the frame with, or without, the dirt container. The cyclone assembly 280, intermediate wall 290, bulkhead 300, and tapered funnel 310 are also detachable, in unison, from the vortex finder assembly. The dirt collection bowl 330 has a large enough diameter to enable, when the dirt collection bowl is opened, removal of the cyclone assembly 280, intermediate wall 290, bulkhead 300, and tapered funnel 310 out the dirt container 320.

Figure 20:
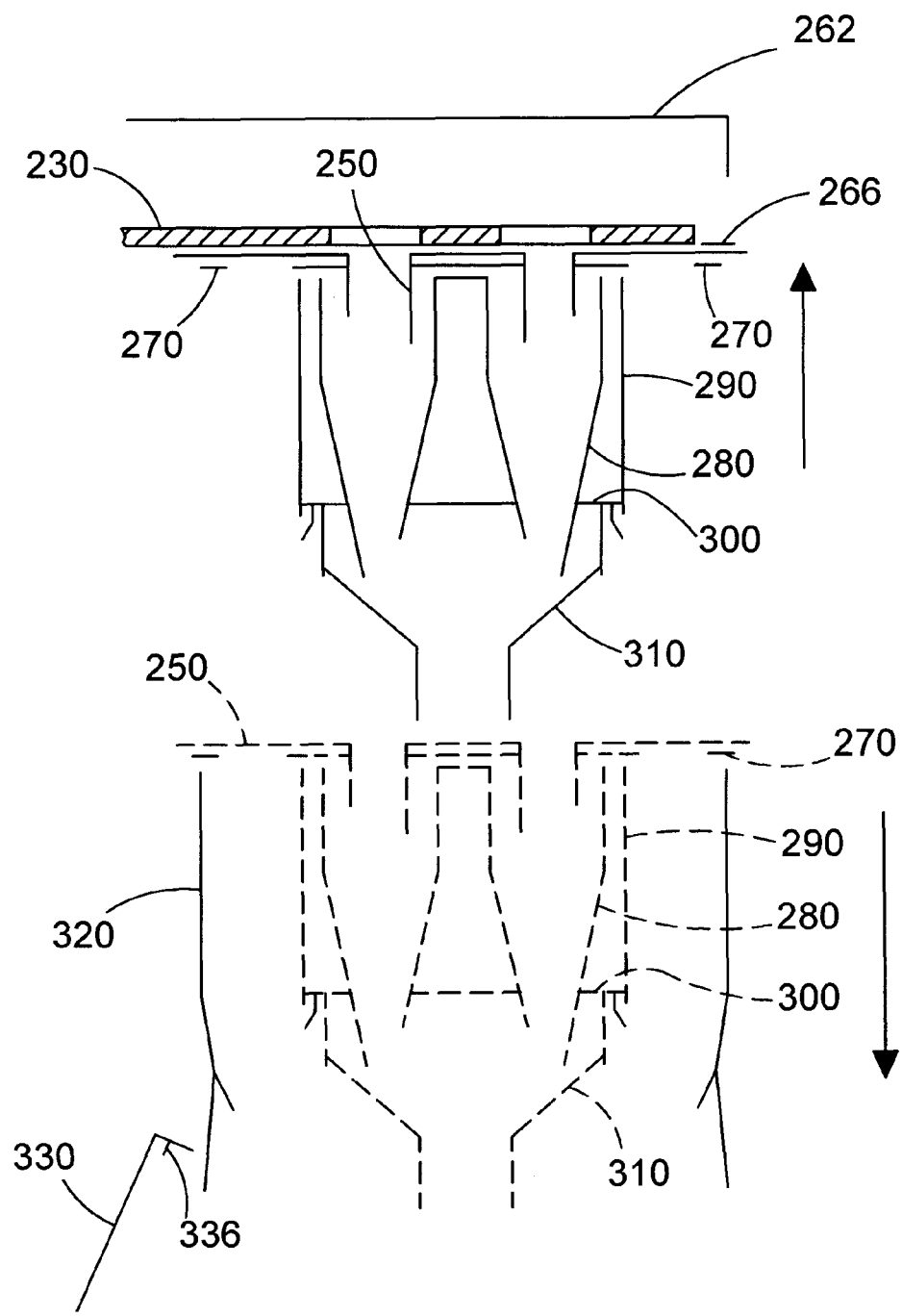

Referring to FIG. 20, there is shown a method of disassembling an alternative construction of the cyclonic separation apparatus 208 whereby the outlet duct wall 262 is detachable from the frame 230. The dirt container 320 is detachable from the frame. The vortex finder assembly 250, cyclone assembly 280, intermediate wall 290, bulkhead 300, and tapered funnel 310 are detachable, in unison, from the frame with, or without, the dirt container. The dirt collection bowl 330 is can be opened for emptying.

Figure 21:
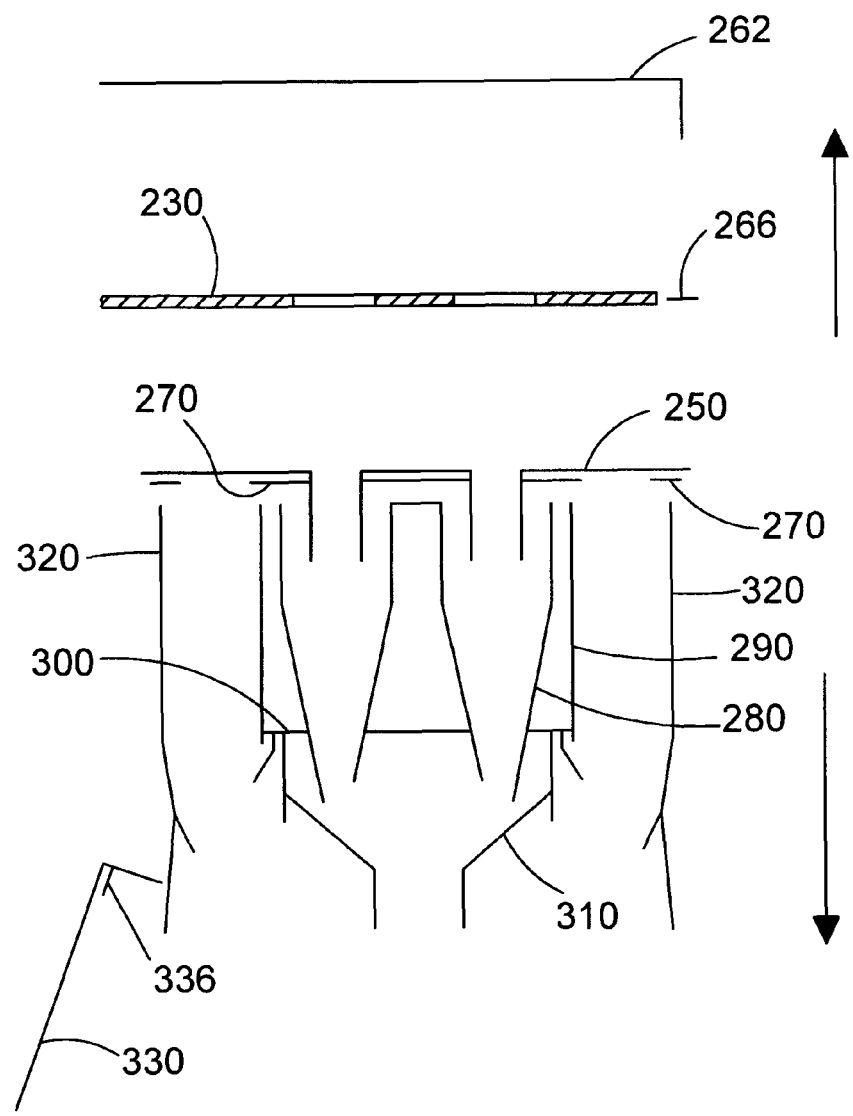

Referring to FIG. 21, there is shown a method of disassembling a second alternative construction of the cyclonic separation apparatus 208 whereby the outlet duct wall 262 is detachable from the frame 230. The dirt container 320, vortex finder assembly 250, cyclone assembly 280, intermediate wall 290, bulkhead 300, and tapered funnel 310 are detachable, in unison, from the frame. The dirt collection bowl 330 can be opened for emptying.

Figure 22:
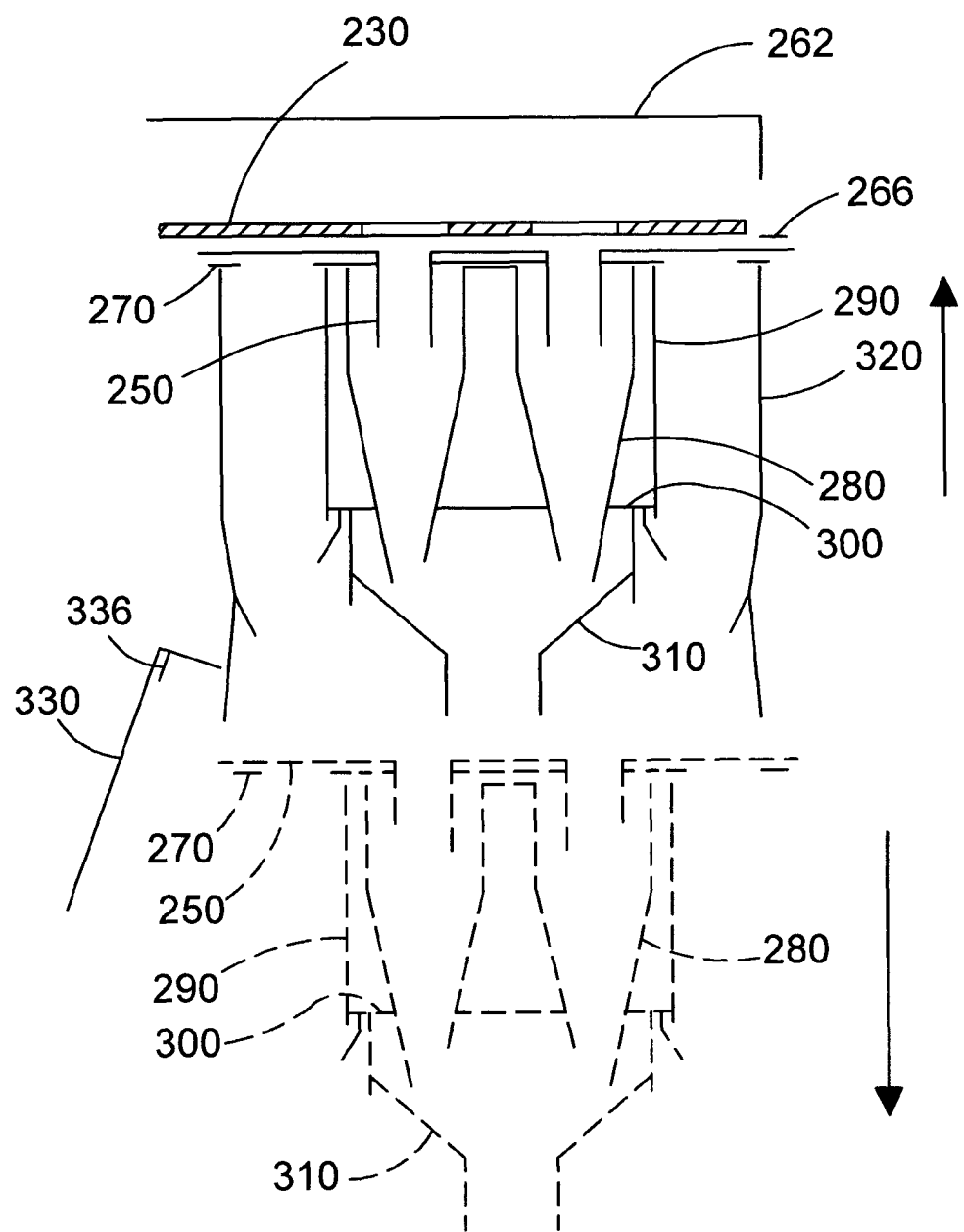

Referring to FIG. 22, there is shown a method of disassembling a third alternative construction of the cyclonic separation apparatus 208 whereby the outlet duct 260 (i.e. duct wall 262 and frame 230) is detachable from the frame. The dirt container 320 remains with the frame. The vortex finder assembly 250, cyclone assembly 280, intermediate wall 290, bulkhead 300, and tapered funnel 310 are removable, in unison, from the frame when the dirt bowl 330 is opened.

Figure 23:
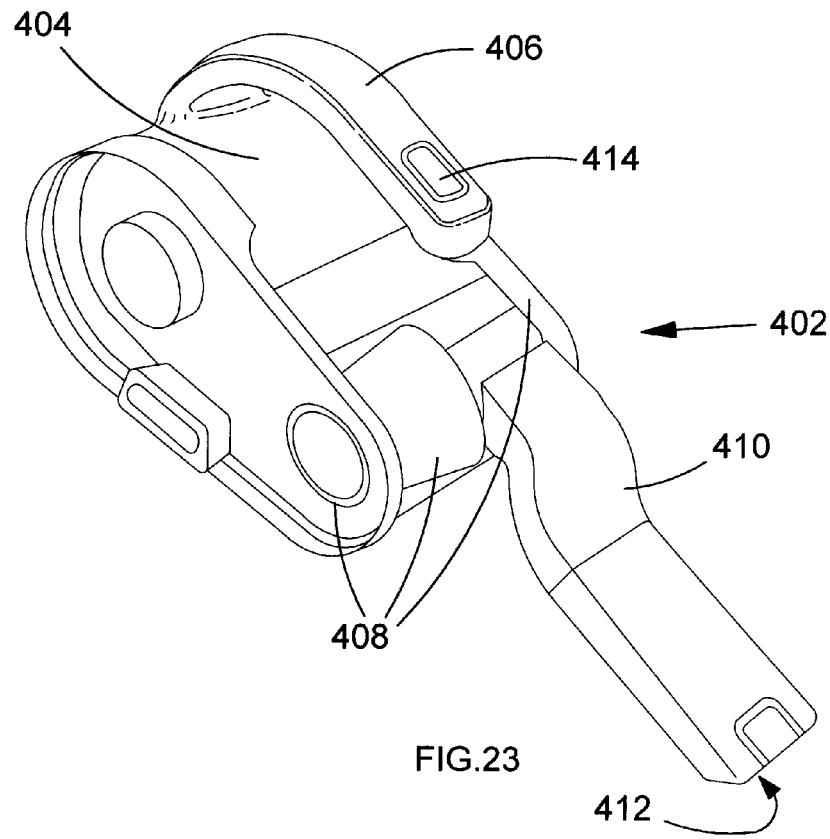
FIG. 23 shows a perspective view of a third embodiment of a hand-held vacuum cleaner with a motor, fan and cyclonic separation apparatus arrangement.
Figure 25:
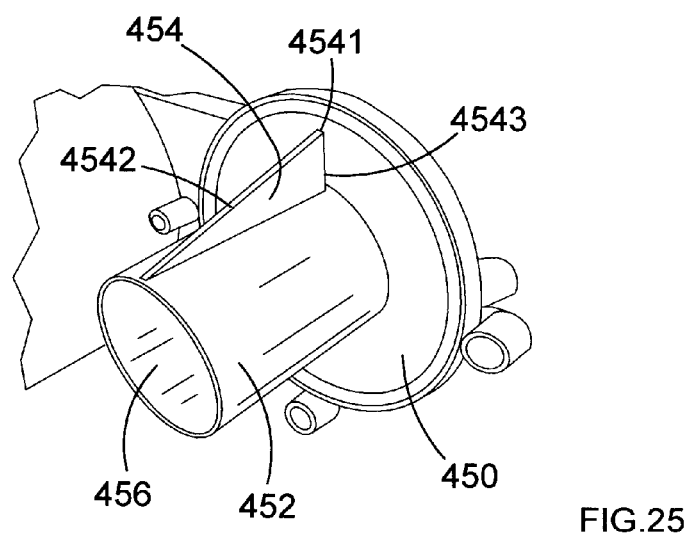
FIG. 25 shows a perspective view of a vortex finder.

Referring to FIG. 23, there is shown a third embodiment of hand-held vacuum cleaner 402 comprising a main body 404 with a handle 406, a cyclonic separation apparatus 408 mounted to the main body, and a dirty air duct 410 with a dirty air inlet 412 at one end. The vacuum cleaner comprises a motor coupled to a fan for generating air flow through the vacuum cleaner and rechargeable cells to energise the motor when electrically coupled by an on/off switch 414.

Referring to FIGS. 24 to 27, there is shown in more detail the motor 416, the rechargeable cells 417, the fan 418, a pre-fan filter 440, a cyclonic separation apparatus outlet duct 460 and the cyclonic separation apparatus 408.

The motor has a drive shaft 420. The fan 418 is mounted upon the drive shaft at the top of the motor. The fan has a diameter of approximately 68 mm. The cells 417 are arranged about the motor 416. In use, the motor drives the fan to generate air flow through the cyclonic separation apparatus, as will be described in more detail below.

The main body 404 comprises a central housing 426 and a frame 430. The motor 416, fan 418 and cells 417 are housed in the central housing 426. The central housing is connected to the handle 406. The central housing has an array of perforations 436 near the bottom of the motor. The perforations 436 are for air flow expelled from the central housing.

The frame 430 connects the central housing 426 to the cyclonic separation apparatus 408. One end of the frame supports a pre-fan filter 440 arranged in front of the fan's input. The other end of the frame supports the cyclonic separation apparatus. The cyclonic separation apparatus is rotatingly connected to the frame.

Outlet duct 460 comprises a duct wall 462 arranged upon the frame to form a passage between the duct wall and frame approximately 10 mm deep. The outlet duct 460 provides an air flow path between the cyclonic separation apparatus 408 and the pre-fan filter 440. The duct wall is detachable from the frame. The duct wall is transparent to permit visual inspection of the pre-fan filter. A resilient seal made of polyethylene, rubber or similar elastomeric material is provided around the duct wall to ensure air tight connection with the frame. The duct wall is removed from the frame if the pre-fan filter needs cleaning or replacement.

The cyclonic separation apparatus 408 comprises a vortex finder assembly 450, a cyclone assembly 480, and an elongate generally oval-shaped dirt container 520 with a transparent door 530.

The vortex finder assembly 450 has a hollow cylindrical vortex finder 452 with a tapered deflector fin 454. The vortex finder has a central through-hole 456 with a longitudinal central axis 457. The deflector fin protrudes radially from the outer surface of the vortex finder. In the present embodiment the tapered deflector fin is triangular although it could have another tapered profile. The triangular profile of the deflector fin 454 is a right angled triangle.

The cyclone assembly 480 comprises a cyclone 484 and a dirty air inlet port 488. The cyclone has a hollow cylindrical body 485 with the dirty air inlet port and a hollow frusto-conical bottom body 486 extending from the cylindrical body and terminating with a discharge nozzle 487 at the narrower end. The air inlet port is arranged tangentially through a side of the cylindrical body. The vortex finder 454 is arranged inside the cyclone 484. The vortex finder is concentric with the cyclone. The deflector fin 454 is arranged transverse to the path of air flow from the air inlet port. The radially extending short side of the deflector fin abuts the frame 430. An apex 4541 of the deflector fin is proximal to the air inlet port. The hypotenuse side of the deflector fin tapers radially inwardly from the apex to the end of the vortex finder proximal to the discharge nozzle 487. There is a small gap of Z approximately 5 mm between the apex and the cylindrical body 485 of the cyclone 484.

The dirt container 520 is connected to the central housing 426 at one end and the discharge nozzle 487 of the cyclone 484 at the other end. The dirt container comprises a perimeter wall 522 following the outer perimeter of the elongate generally oval-shaped dirt container and base wall 524 with a cylindrical pocket 526 protruding from the base wall into the confines of the dirt container. The cyclone 484 is in communication with the dirt container where the nozzle 487 protrudes through the base wall 524. The bottom of the motor 416 is seated inside the pocket 526 on the opposite side to the dirt container thereby reducing the overall width of the vacuum cleaner by about 20 to 25 mm.

The cyclone 484 has a curved fin 490 protruding axially from the discharge nozzle 487 into the dirt container 520. The curved fin circumscribes an arc of about half the circumference of the nozzle facing the pocket 526. The ends of the curved fin taper towards the nozzle. The dirt container has a flat fin 492 protruding from the base wall 524. The flat fin extends tangentially from the top of the pocket 526 to about the middle of the dirt container. The flat fin is generally parallel to an adjacent initial flat portion 522a of the perimeter wall 522 uppermost on the dirt container in normal use.

The door 530 is detachably connected to the perimeter wall 522 of the container 520. The door 530 may be connected to the dirt container by snap-fit, interlocking detents, a hinge 528 or by interference fit with the dirt container's exterior wall. In the example shown, the door is held firmly closed by a spring-loaded latch 529. A resilient seal (not shown) made of polyethylene, rubber or a similar elastomeric material is provided around the door 530 to ensure connection to the dirt container 320 in an airtight manner. Dust and dirt separated by the cyclonic separation apparatus and deposited in the dirt container 520 can be emptied by opening the door 530. The door is transparent to enable visual inspection of when the dirt container 520 is full and is in need of emptying.

In use, dirty air flows, under the influence of the fan 418, in the dirty air inlet 412, up the dirty air inlet duct 410 and into the cyclonic separation apparatus 408 where dust and dirt entrained in the air flow is separated therefrom. The dust and dirt is collected within the cyclonic separation apparatus. Air flows out the cyclonic separation apparatus 408, via the through-hole 456 of the vortex finder, along the outlet duct 460, through the pre-fan filter 440, through the fan 418 and over the motor 416 and cells 417 via the central housing 426 and out the perforations 436 in the central housing.

Figure 24:
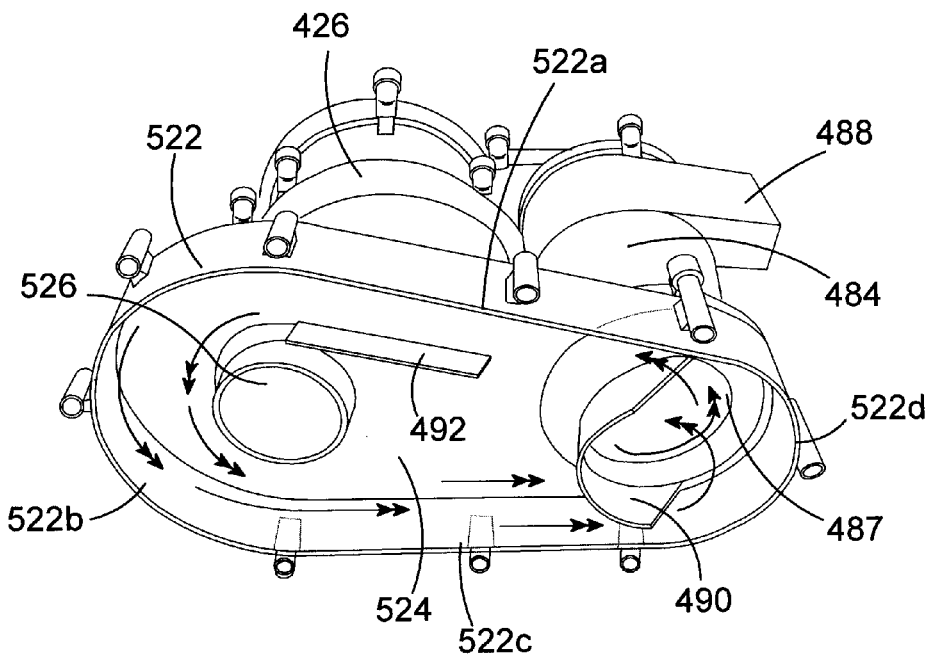
FIG. 24 shows a perspective view of the vacuum cleaner of FIG. 23 without a dirt container wall.
Figure 26:
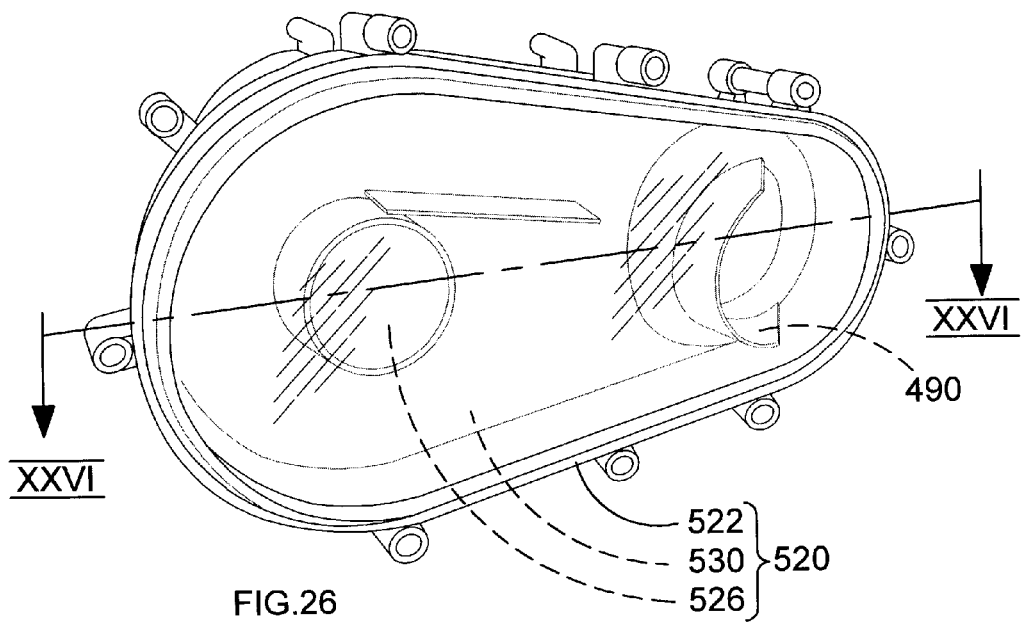
FIG. 26 shows a perspective view of the vacuum cleaner of FIG. 23 with a transparent dirt container wall.
Figure 27:
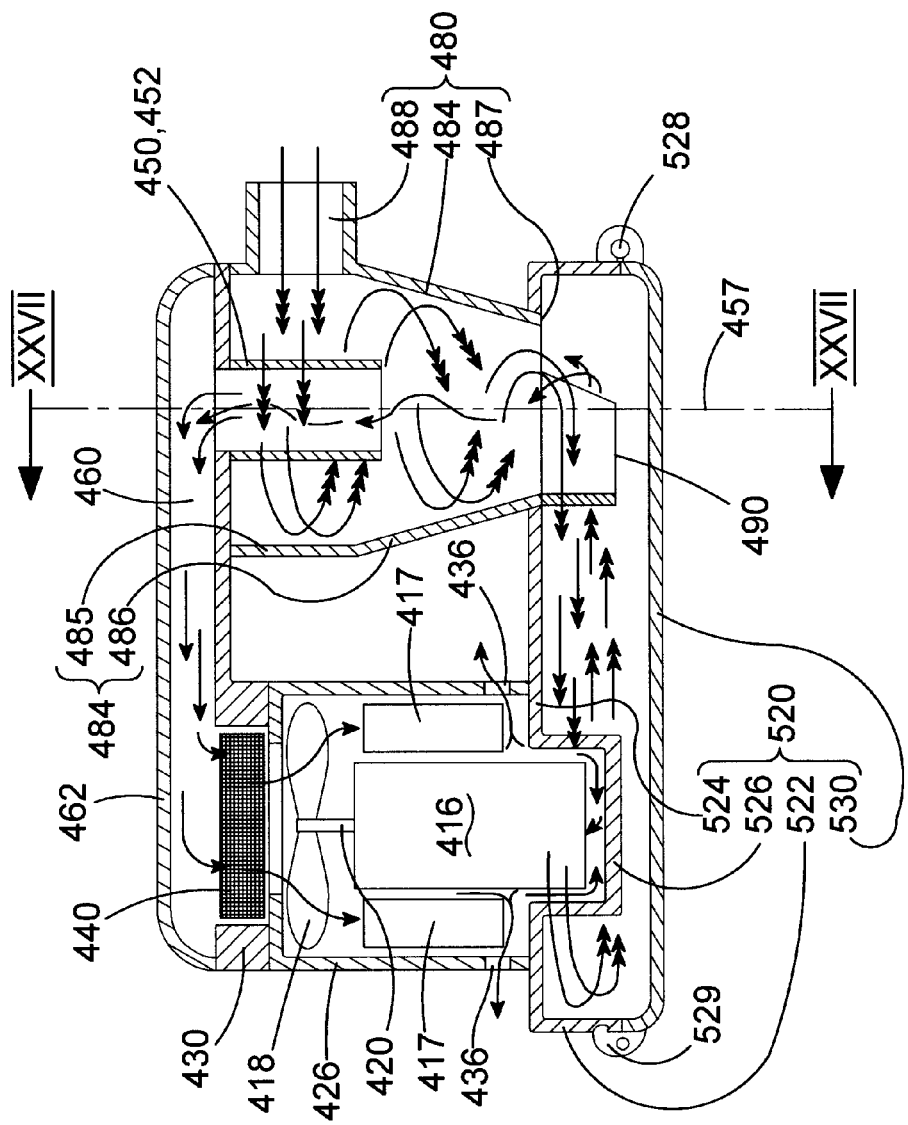
FIG. 27 shows a diagrammatical cross-section XXVI-XXVI of the vacuum cleaner of FIG. 23 including air flow pathways.
Figure 28:
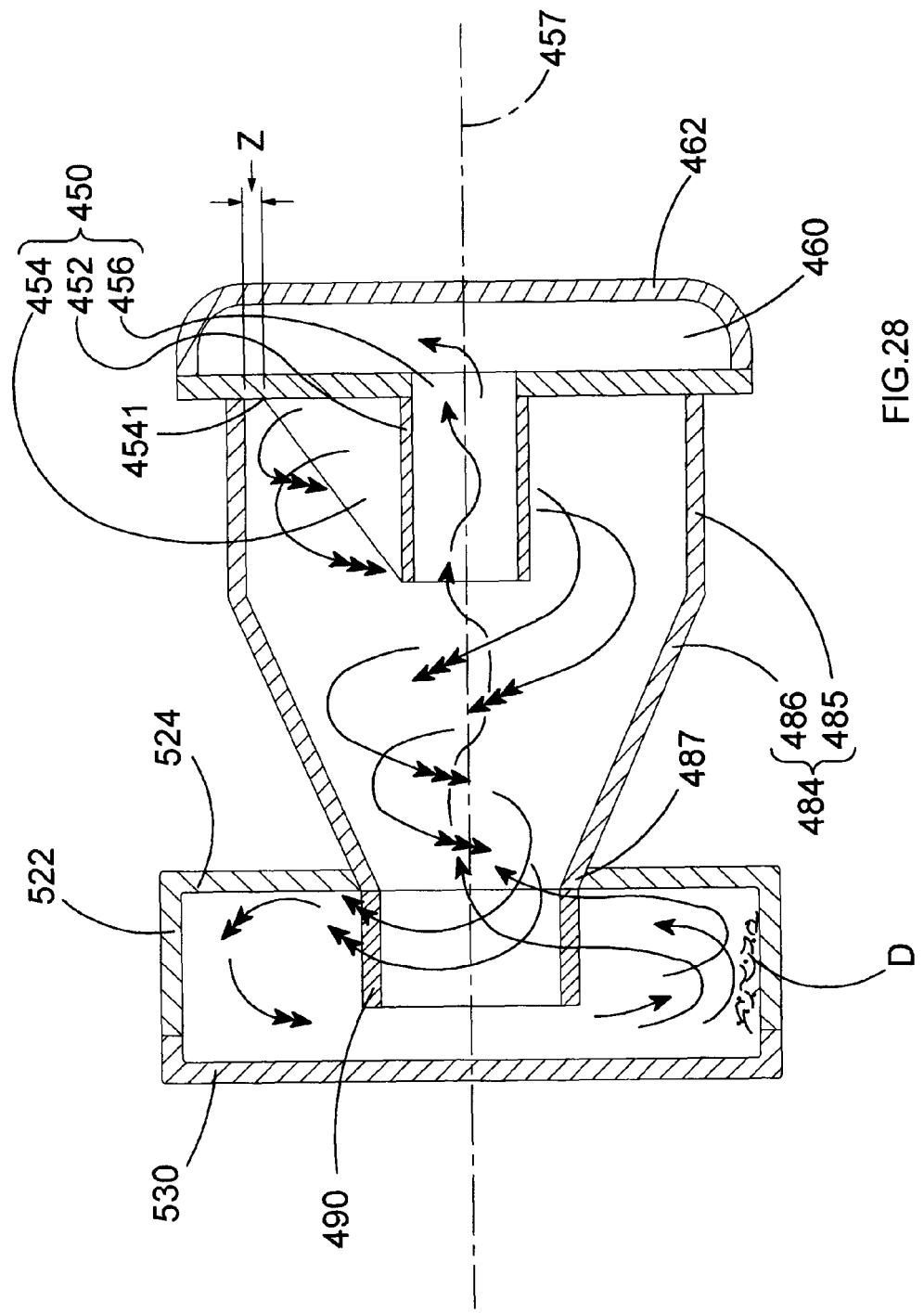
FIG. 28 shows a diagrammatical cross-section XXVII-XXVII of the vacuum cleaner of FIG. 23 including air flow pathways.

Referring to FIGS. 24, 27 and 28, air flow though the cyclonic separation apparatus 408 is described in more detail. Dirty air (triple headed arrows) from the dirty air duct 410 enters the cylindrical body 485 of the cyclone 484 via the air inlet port 488. The tangential arrangement of the air inlet port 488 and presence of the triangular deflector fin 454 protruding from the vortex finder 452 direct the dirty air to flow in a helical path around the cyclone and towards the frustro-conical body 486 and then the discharge nozzle. This creates an outer vortex in the cyclone. Centrifugal forces move the comparatively large dust and dirt particles outwards to strike the side of the cyclone and separate them from the air flow. The separated dust and dirt swirls towards the discharge nozzle 487 and into the dirt container 520.

The partially-cleaned air flow (double-headed arrows) is directed by the curved fin 490 and a proximal curved portion 522d of the perimeter wall 522 to leave the cyclone 484 in an anti-clockwise upward direction, as viewed in FIG. 24. This helps maintains air flow speed. The flat fin 492 and the pocket 526 help to direct the partially cleaned air flow to follow an elongate circuit about the perimeter wall 522 of dirt container 520, similar in shape to a two-pulley belt drive wherein the discharge nozzle 487 simulates a pulley at one end and the pocket 526 simulates a pulley at the opposite end. For example, the elongate circuit of air flow begins outbound away from the discharge nozzle in proximity to the initial flat portion 522b of the perimeter wall 522 and is redirected inside a distal curved portion 522c of the perimeter wall 522 to turn around the pocket 526 and continue inbound towards the discharge nozzle adjacent to a further flat portion 522d of the perimeter wall lower most on the dirt container in normal use. An axis of elongation of the elongate circuit runs approximately through the centres of the discharge nozzle and the pocket. The flat fin and the pocket prevent the bulk of the dust and dirt particles (D) from dropping out of the circulating air flow before being deposited upon the further flat portion 522d of the perimeter wall at the bottom of the dirt container. The perimeter wall 522 has a generally lozenge shape in cross-section parallel to the base wall 524. The initial flat portion 522a and the further flat portion 522c of the perimeter wall taper inwardly and away from the distal curved portion 522b of the perimeter wall. This encourages deposit of dust and dirt around the pocket end of the dirt container where there is more space than at the opposite discharge nozzle end of the dirt container. Also, the curved fin 490 acts as an obstacle to laminar air flow inbound to the discharge nozzle. The air flow is forced to deviate around the curved fin. This disruption of laminar air flow provokes deposit of any remaining entrained dirt and dust (D) in the dirt container. As such, the shape of the perimeter wall 522, the flat fin 492, the pocket 526 and the curved fin 490 combine to help to separate any remaining dust and dirt from air flow path destined for the pre-fan filter 440. This increases sustained performance of the vacuum cleaner 502.

Having deviated past the curved fin 490, clean air flow (single-headed arrows) turns back on itself and, under the influence of the fan, flows in a narrow inner helical path into the vortex finder's through-hole 456 from where it leaves the cyclonic separation apparatus 408 and enters the outlet duct 460.

Referring to FIGS. 29 to 38, there is shown a variety of battery-powered vacuum cleaners with the motor 16, fan 18 and cyclonic separation apparatus 8 arrangement of the first embodiment. The arrangement is, in all examples, arranged with the central axis 21 of the drive shaft 20 orientated transverse a main axis of the main body of the vacuum cleaner. In particular, there is shown a hand-holdable vacuum cleaner 602 with pivotable dirty air duct 610; a hand-holdable vacuum cleaner 702 connected to a cleaning nozzle 712 by a flexible hose 710 to resemble a small cylinder vacuum cleaner; and a vacuum cleaner 802 with an elongate body 806, a support wheel 807 and a cleaner head 812 to resemble an upright vacuum cleaner, also commonly referred to as a "stick-vac".

Referring to FIGS. 29 to 32, the hand-holdable vacuum cleaner 602 comprises a main body 604 with a main axis 605 and a handle 606. The motor 16, fan 18 and cyclonic separation apparatus 8 of the first embodiment are rotatingly connected to the main body 604 at the annular roof wall 121 of the dirt container 120. The central axis 21 of the cyclonic separation apparatus is orientated at a right angle (i.e. transverse) to the main axis of the main body. The vacuum cleaner 602 comprises a battery pack 900 of rechargeable cells 917 to energise the motor 16 when electrically coupled by an on/off switch. The dirty air duct 610 is connected to the air inlet port 126.

Referring in particular to FIG. 31, the battery pack 900 has a curvilinear cross-sectional profile with a curvilinear inner wall 902 shaped to fit around the cylindrical dirt container 120. The battery pack 900 has a pair of electrical contacts 904 on a curvilinear outer wall 906 so that the cells may be recharged in situ. The battery pack is detachably connected to the dust container 120. The battery pack may be detached from the duct container to enable replacement, or external recharging of the cells, if necessary. The cells have a generally cylindrical shape. Longitudinal axes of cells are arranged parallel to the central axis 21 of the motor 16.

The dirty air duct 610 and the battery pack 900 are rotatable, with the cyclonic separation apparatus 8, about the central axis 21 through an arc subtending 210 degrees from a folded position. This allows the vacuum cleaner 602 to be pointed in different directions, whilst a user is able to hold the vacuum cleaner in the same orientation. The vacuum cleaner may be used to access awkward spaces and can be held more comfortably by orientating the main axis 605 of the main body 604 to suit the user and adjusting the position of the dirty air inlet 612 to point at a surface to be cleaned, rather than orientating the main axis to best suit the surface to be cleaned and requiring the user to hold the vacuum cleaner in whichever orientation this demands.

Figure 29:
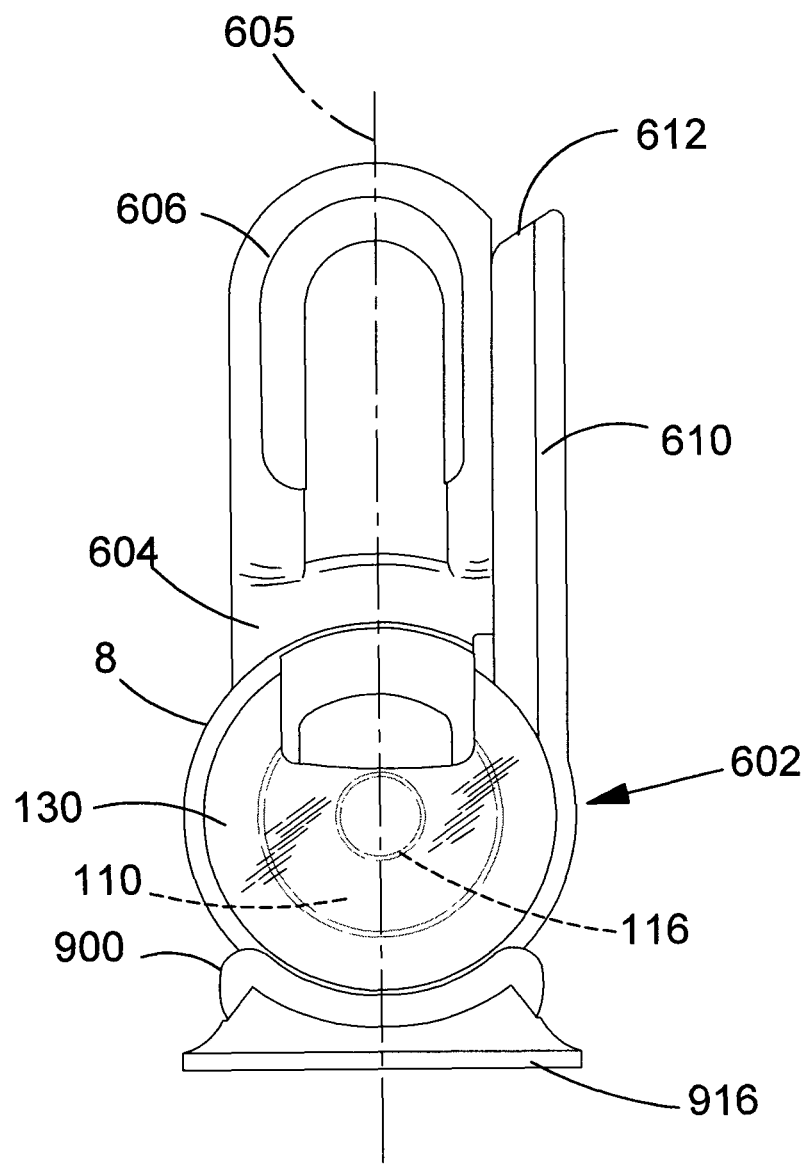
FIG. 29 shows side elevation view of a battery-powered vacuum cleaner with an extendible dirty air duct and the motor, fan and cyclonic separation apparatus arrangement of FIGS. 2 to 9.

FIGS. 29 and 30 show the vacuum cleaner 602 in the folded position where the dirty air duct is folded at zero degrees under the handle 606 for compact storage. The battery pack 900 is rotated to the diametrically opposite side of the dirt container 120. The vacuum cleaner may be cradled by a battery charger 916 in the upright position shown in FIG. 29. This allows the vacuum cleaner to be stood in a small surface area and without excessive height because the dirty air duct is folded under the handle. Arranged like this, the vacuum cleaner is easier to grab. The vacuum cleaner's centre of gravity is lowered by the battery pack thus making the upright position more stable. Moreover, the cells 917 are electrically coupled by the electrical contacts 904 to the battery charger 916 for recharging in the upright position.

Figure 32:
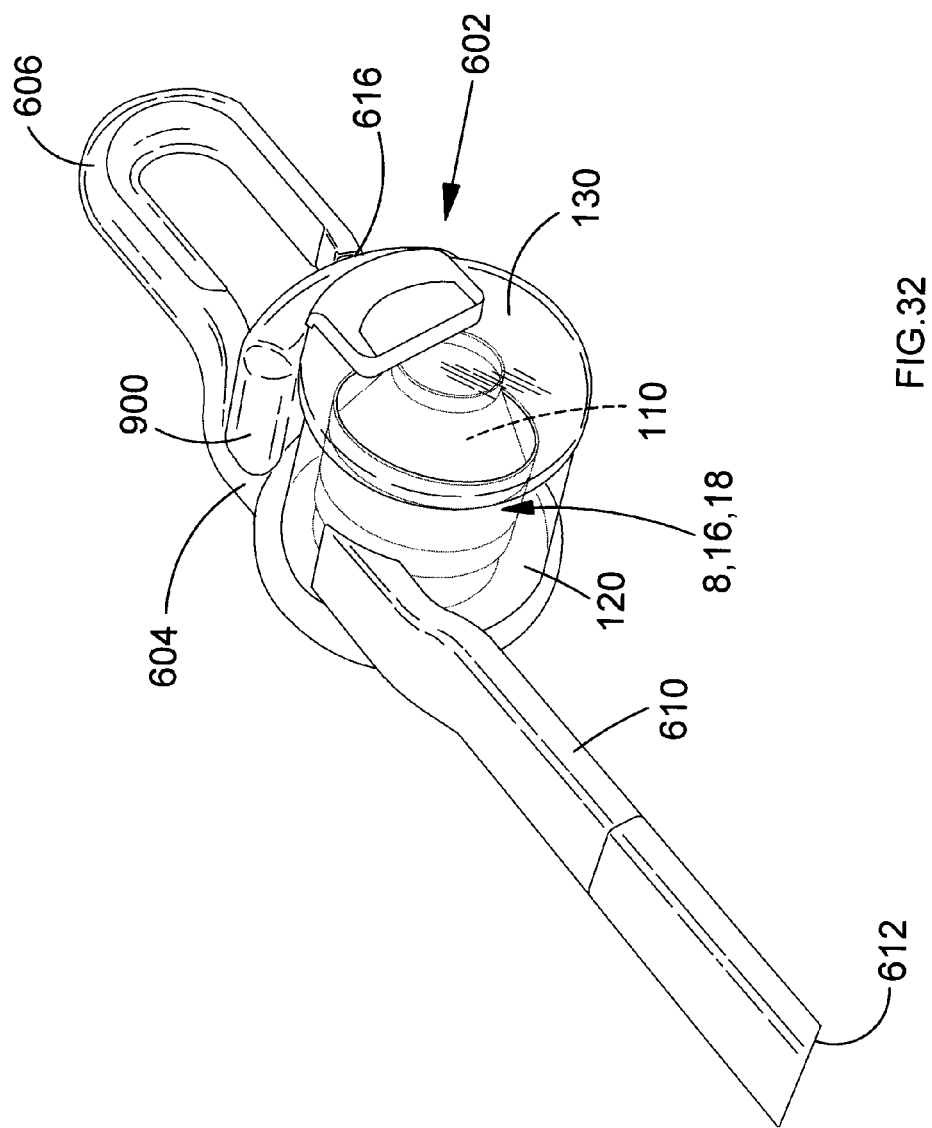
FIG. 32 shows a perspective view of the vacuum cleaner of FIG. 29 with the dirty air duct extended.

FIG. 32 shows the vacuum cleaner 602 in an extended position. The dirty air duct 610 is rotated through 180 degrees from the folded position and is ready for use. The dirty air duct 610 has been telescopically extended to double its length. The battery pack 900 occupies a gap 616 between the handle 606 and the dirt container 120. The battery pack is relatively heavy and its location in the gap 616 moves the vacuum cleaner's centre of gravity closer to the handle. This improves the ergonomics of the vacuum cleaner.

Referring to FIGS. 33 and 34, the hand-holdable vacuum cleaner 702 comprises a body 704 with a handle 706. The motor 16, fan 18 and cyclonic separation apparatus 8 is connected to the body 704 at the annular roof wall 121 of the dirt container 120. The vacuum cleaner 702 comprises a pack 910 of rechargeable cells. The cells are to energise the motor 16 when electrically coupled by an on/off switch. The air inlet port 126 is connected to one end of the flexible hose 710. The cleaning nozzle 712 is connected to the other end of the flexible hose.

The battery pack 910 has a curvilinear inner wall 902 which is shaped to cradle the cylindrical dust container 120. The battery pack is detachably connected to the dust container 120. The cells may be recharged in situ. The battery pack may be detached from the dirt container to enable replacement, or external recharging of the cells, if necessary. The battery pack has a pair of feet 912 arranged to support the vacuum cleaner 702 in a stable manner when placed upon a flat surface. The cells have a generally cylindrical shape. Longitudinal axes of the cells are arranged parallel to the central axis 21 of the motor 16.

FIGS. 32 and 34 show a compact configuration of the vacuum cleaner 702. The flexible hose 710 is wrapped around the dirt container 120 and under the battery pack 910 via rebates 914 in the battery pack feet 912. The cleaning nozzle 712 is cradled by the handle 706. The handle is moulded in plastics material with natural resilience. The cleaning nozzle is gripped by the handle. The cleaning nozzle can be readily detached from the handle for use in vacuum cleaning.

Figure 37:
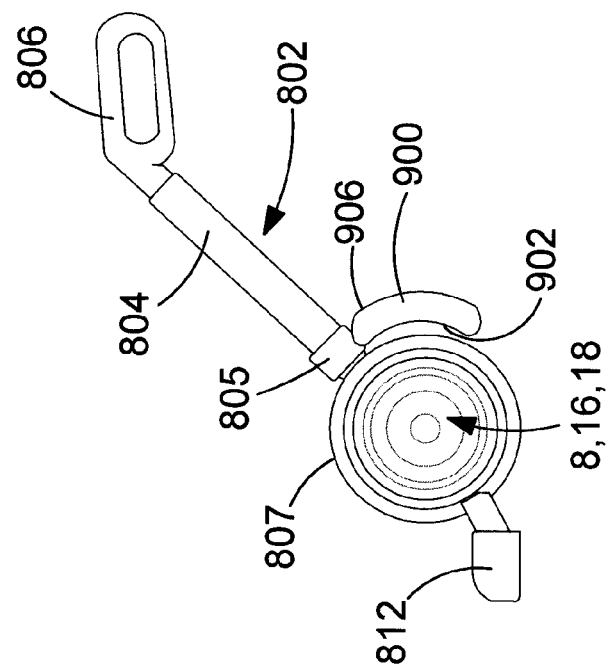
FIG. 37 shows a side elevation view of the vacuum cleaner of FIG. 35 with the telescopic body retracted.
Figure 35:
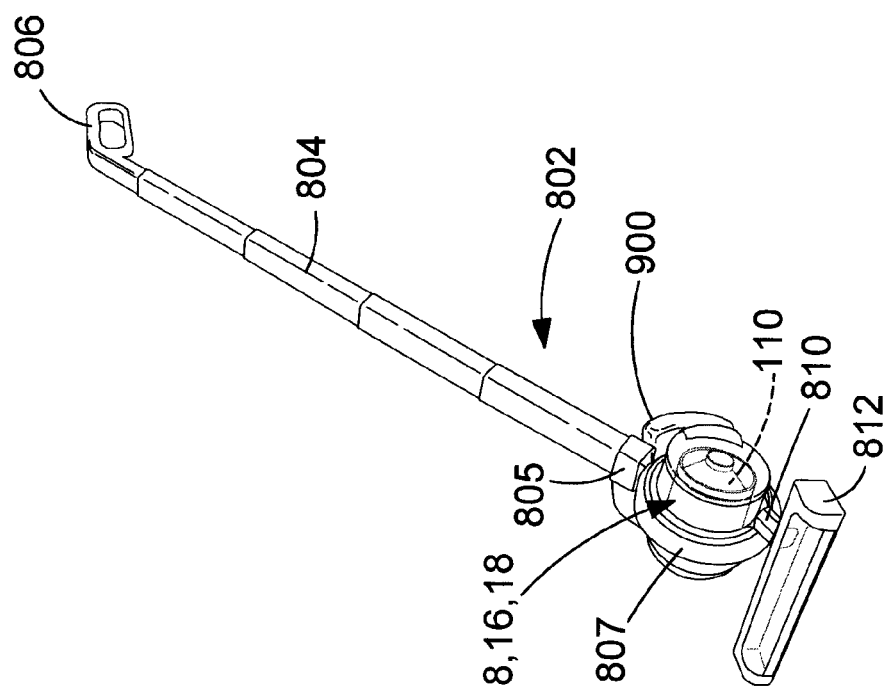
FIG. 35 shows a perspective view of a battery-powered vacuum cleaner with a telescopic body and a cleaner head with the motor, fan and cyclonic separation apparatus arrangement of FIGS. 2 to 9.
Figure 36:
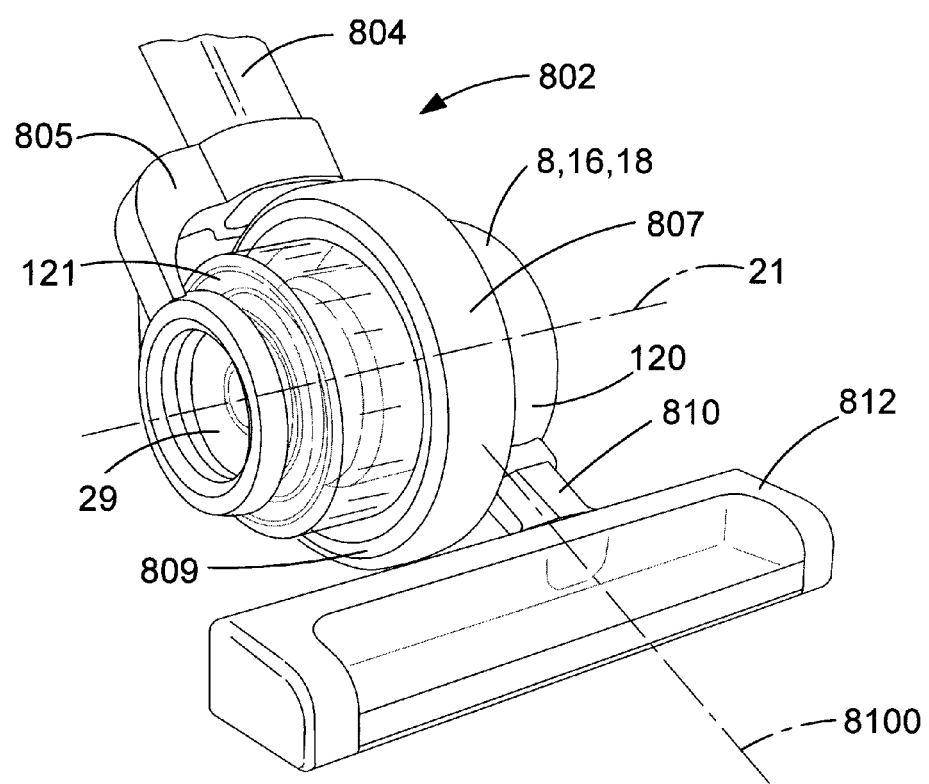
FIG. 36 shows a close-up perspective view of the vacuum cleaner of FIG. 35.

Referring to FIGS. 35 and 37, the vacuum cleaner 802 comprises the elongate body 804. The elongate body is telescopic. The elongate body has a handle 806 at one end and a bracket 805 at the other end. The motor 16, fan 18 and cyclonic separation apparatus 8 of the first embodiment are rotatingly connected to the bracket 805 at the annular roof wall 121 of the dirt container 120. The bracket arches around one side of the dirt container so that the latter may be connected transverse to the elongate body. The support wheel 807 surrounds the dirt container 120. The support wheel is supported for rotation about the dirt container by a bearing 809. The air inlet port 126 is connected to one end of the dirty air duct 810. The cleaner head 812 is connected to the other end of the dirty air duct 810. The cleaner head is pivotable in relation to the dirt container about a longitudinal axis 8100 of the dirty air duct. The dirty air duct is arranged tangentially to the dirt container.

The vacuum cleaner comprises a battery pack 900 of rechargeable cells 917 to energise the motor 16 when electrically coupled by an on/off switch. Referring to FIG. 37, the battery pack 900 has a curvilinear inner wall 902 which is shaped to embrace the support wheel 807 and part of the cylindrical dirt container 120. The battery pack is detachably connected to the bracket 805. The cells 917 may be recharged in situ. The battery pack may be detached from the bracket to enable replacement, or external recharging of the cells, if necessary. The cells have a generally cylindrical shape. Longitudinal axes of the cells are arranged parallel to the central axis 21 of the motor 16.

Returning to FIG. 35, there is shown the vacuum cleaner 802, prepared for use, with the support wheel 807 and the cleaning head 812 upon a floor and the elongate body 804 fully extended. The support wheel 807 is arranged about the midpoint of the axial length of the dirt container. The diameter of support wheel 807 is approximately the same as the axial length of the dirt container 120 so that the elongate body can be rocked from side to side by about 45 degrees each way and the vacuum cleaner 802 can be steered with ease.

Returning to FIG. 37, there is shown the vacuum cleaner with the elongate body 804 fully retracted to approximately a quarter of the elongate body's extended length. The vacuum cleaner's overall length when the elongate body is extended is at least double the vacuum cleaner's overall length when the elongate body is retracted. The vacuum cleaner 802 is prepared for storage in a kitchen cupboard when the elongate body is retracted. The elongate body may be locked in its retracted and extended positions. The skilled person will appreciate that any suitable locking system will suffice, like, for example, a spring-loaded detent interlockable with holes along the elongate body corresponding to the retracted position, the extended position and any intermediate position therebetween.

Figure 38:
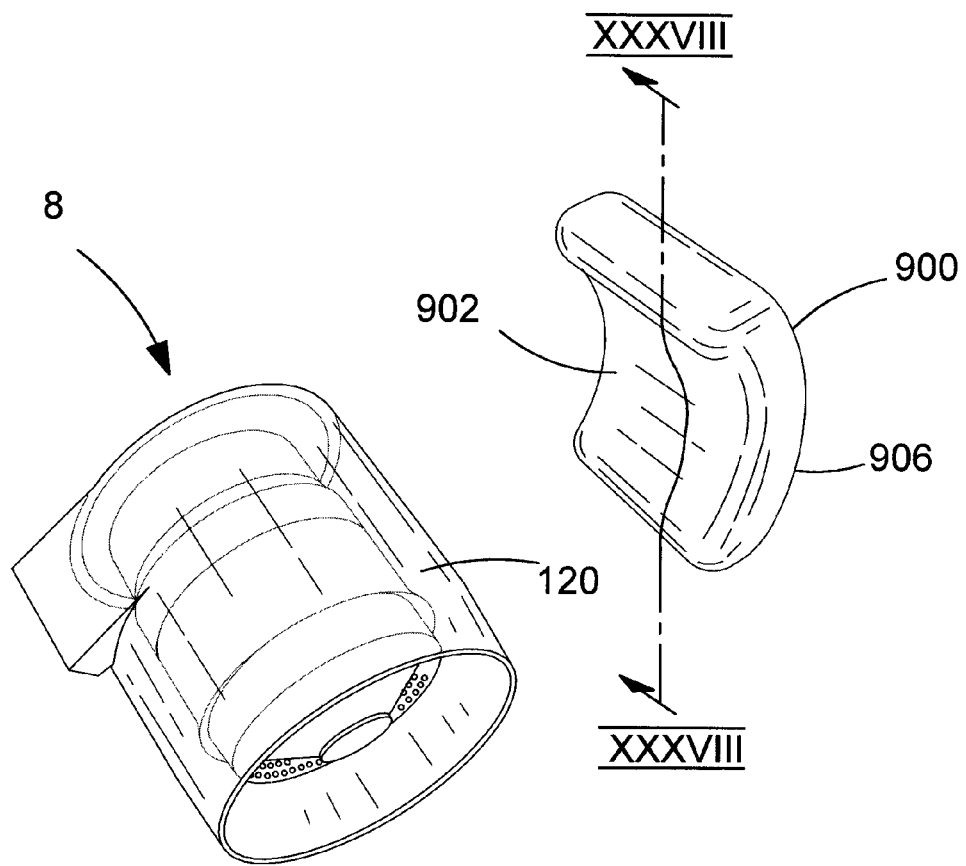
FIG. 38 shows a perspective view of a removable battery pack and the cyclonic separation apparatus of FIGS. 2 to 9.

Referring to FIG. 38, there is shown in perspective the shape of the battery pack 900 and, in particular, the curvilinear inner wall 902 which is to embrace, or connect to, the outside of the dirt container 120 of the cyclonic separation apparatus 8.\

Figure 39:
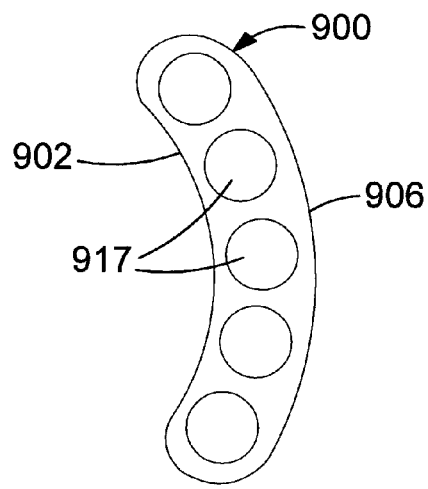
FIG. 39 shows a transverse cross-section XXXVIII-XXXVIII of the battery pack of FIG. 38 with cylindrical rechargeable cells.
Figure 40:
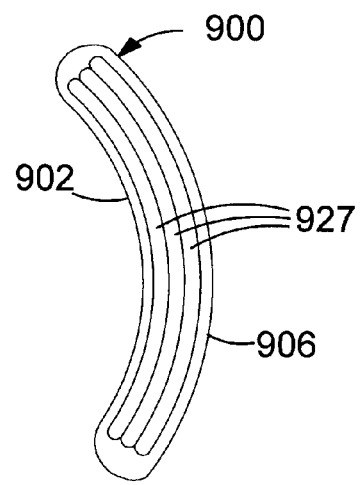
FIG. 40 shows a transverse cross-section XXXVIII-XXXVIII of the battery pack of FIG. 38 with flat plate rechargeable cells.

Referring to FIGS. 39 and 40, there is shown the battery pack 900 along cross-section XXXVIII-XXXVIII. Commercially available rechargeable cells may be cylindrical in shape. FIG. 39 shows five cylindrical cells 917 stacked in a curved array to conform to the internal cavity of the curvilinear cross-section profile of the battery pack. Also commercially available are plate rechargeable cells 927 composed of flexible anode and cathode plates, or sheets, interposed by a polymer electrolyte material and separator material. The anode sheets are electrically connected to the positive cell terminal and the cathode sheets are electrically connected to the negative cell terminal, and those sheets can be connected in series or in parallel to form a battery pack. These plate cells are flexible and they can be stacked upon each other. FIG. 40 shows three plate cells 927 stacked upon each other and curved to conform to the internal cavity of the curvilinear cross-section profile of the battery pack.

Figure 41:
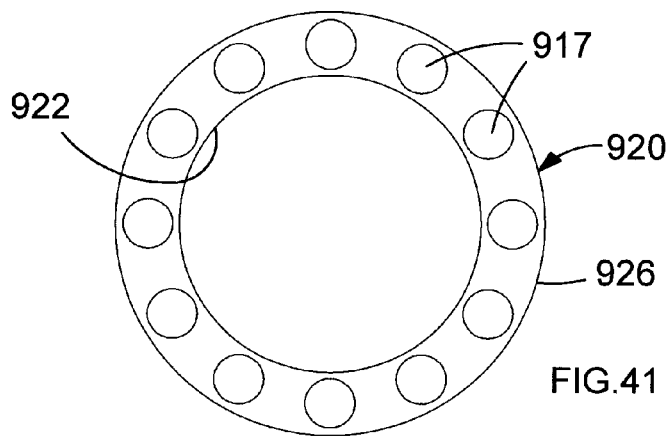
FIG. 41 shows a transverse cross-section of an annular battery pack with cylindrical rechargeable cells.
Figure 42:
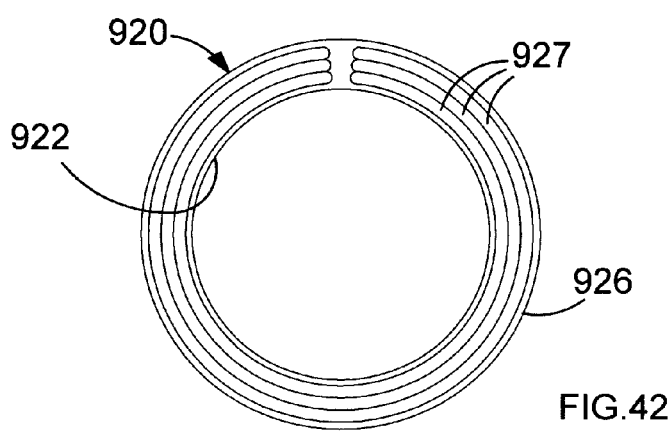
FIGS. 42 and 43 show a transverse cross-section of an annular battery pack with flat plate rechargeable cells.

Referring to FIGS. 41 to 43 there is shown an annular battery pack 920 in cross-section which is adapted to surround the dirt container 120 of the cyclonic separation apparatus 8 with a hollow cylindrical inner surface 922. The annular battery pack has a cylindrical inner wall 922 and a cylindrical outer wall 926.

FIG. 41 shows 12 cylindrical cells 917 arranged in a circular array to conform to the internal cavity of the annular cross-sectional profile of the annular battery pack 920.

FIG. 42 shows three plate cells 927 stacked upon each other and curved into a hollow cylindrical shape to conform to the internal cavity of the annual cross-section of the annular battery pack 920.

FIG. 43 shows five plate cells 927 wound into a hollow cylindrical shape to conform to the internal cavity of the annular cross-section of the annular battery pack 920.

The curved plate cells 927 improve use of the internal cavity of the battery packs 920 by eliminating the gaps which naturally exist between the cylindrical cells 917. This results in a more compact design of battery pack with reduced packaging and a higher energy density.

The curvilinear or cylindrical inner walls 902,922 of the curvilinear battery pack 900,910 and the annular battery pack 920 embrace, or attach themselves to, the dirt container 120. This facilitates new design choices for accommodating cells in a compact manner.

The skilled addressee will appreciate that the rechargeable cells can be any type of energy accumulator, including rechargeable Lithium Ion, Nickel Metal Hydride or Nickel Cadmium rechargeable cells, for driving the electric motor 16, 216, 416.

The skilled addressee will appreciate that the specific overall shapes and sizes of the arrangements comprising the motor 16, 216, 416 the fan 18, 218, 418 and the cyclonic separation apparatus 8, 208, 408 can be varied according to the type of vacuum cleaner in which either of the arrangements is to be used. For example, the overall length or width of each arrangement, and, in particular, the cyclonic separation apparatus, can be increased or decreased with respect to its diameter, and vice versa.

In particular, the hand-holdable vacuum cleaner 702 of FIGS. 33 and 34 can be modified to comprise the motor 216, fan 218 and cyclonic separation apparatus 208 of the embodiment by modifying the form of the battery pack 910 to suit the underside of the dirt container 320. The flexible hose 710 would need extension to be wrapped around the dirt container 320 and the central housing 226 and motor housing 228.

Further, the hand-holdable vacuum cleaner 802 of FIGS. 35 to 38 can be modified to comprise the motor 216, fan 218 and cyclonic separation apparatus 208 of the second embodiment by substituting the central housing 226 and motor housing 228 for the main bracket 805. This could be done by attaching the elongate body 804 directly to the central housing 226 in place of the handle 206 and the bracket 805. The cyclonic separation apparatus outlet duct 260 would need extension to create enough clearance for the support wheel 807 and bearing 809 to surround the dirt container 320.

The motor 16, 216, 416 discussed above is a typically a brushed d.c. motor with its drive shaft 20,220,420 directly coupled to the centrifugal fan 18, 218, 418. The motor's drive shaft has a rotational speed within a range of 25,000 and 40,000 revolutions per minute (rpm). A centrifugal fan with a rotational speed within this range has an outer diameter approximately double the outer diameter of the motor can in order to have sufficient tip speed to generate the required volumetric flow rate through the cyclonic separation apparatus. The skilled person will appreciate that the motor 16,216, 416 can be a d.c. motor, an a.c. motor, or an asynchronous multi-phase motor controlled by an electronic circuit. A permanent magnet brushless motor, a switched reluctance motor, a flux switching motor, or other brushless motor type, may have a high rotational speed within a range of 80,000 to 120,000 rpm. If such a high speed motor were used then the fan diameter could be at least halved and yet still generate the required volumetric flow through the cyclonic separation apparatus because the fan's tip speed would be so much higher. This would make the fan's outer diameter the same as the motor can's outer diameter and could possibly make it less than the motor can's outer diameter if the motor operates at around the upper end of the high rotational speed range. A smaller diameter fan operating within this range of high rotational speeds would typically be an impeller although it may be an axial fan or a centrifugal fan. The outer profile of the smaller fan coupled to the drive shaft of the high rotational speed motor would have a generally cylindrical outer profile. This provides additional flexibility in the layout of the cyclonic separation apparatus.

In a modification of the first or second embodiment of a cyclonic separation apparatus 8,208 which is not shown in the drawings, the cyclones 84,284 can be rearranged to accommodate a high rotational speed permanent magnet brushless motor, a switched reluctance motor or a flux switching motor coupled to a fan which is coaxial with the motor and has an outer diameter substantially the same as or less than the outer diameter of the motor. The generally cylindrical outer profile of high speed motor and fan can be sunk into the cyclonic separation apparatus amongst the cyclones and clustered into a generally circular array. Air flow can be directed to the axial input of the fan and expelled from the tangential output of the fan by a baffle. The high speed motor and fan may be located on the periphery of the circular array in which case air flow from the fan may be expelled from one side of the circular array and directed out of the cyclonic separating apparatus. The high speed motor and fan may be nested near, or at, the middle of the circular array in which case air flow from the fan may be expelled from one end of the circular array and directed out of the cyclonic separating apparatus. If the high speed motor and fan were nested in a circular array of cyclones inclined with respect to a central axis, like, for example, a modified version of the cyclones disclosed by GB 2 440 110 A, then air flow from the fan may be expelled from one end of the circular array of cyclones or through gaps between the cyclones.

The invention claimed is:

1. A motor, fan and dirt separating means arrangement for a vacuum cleaner, the arrangement comprising:
    a motor with a drive shaft;
    a fan coupled to the motor for generating air flow; and
    a dirt separating means located in a cleaning path of the air flow generated by the fan, the cleaning path being between a dirty air inlet and the fan,
    wherein the motor is located in a cooling path of the air flow generated by the fan, the cooling path being between a clean air inlet and the fan, wherein the air flow through the cleaning path is substantially greater than through the cooling path in normal operating conditions and wherein the cleaning path and the cooling path of the air flow combine where the cleaning path is downstream of the dirt separating means and upstream of the fan and the cooling path is downstream of the motor and upstream of the fan;
    wherein the motor is nested within an inner wall of the dirt separating means; and
    wherein the clean air inlet and the exhaust of the combined cleaning path and cooling path are located on a same side of the dirt separating means.

2. An arrangement as claimed in claim 1, wherein the cleaning path and the cooling path combine substantially at an input of the fan.

3. An arrangement as claimed in claim 1, wherein the motor has vents for ventilating the interior of the motor.

4. An arrangement as claimed in claim 1, wherein the arrangement comprises supplementary means for augmenting air flow in the cooling path about an opposite end of the motor to the fan.

5. An arrangement as claimed in claim 4, wherein the arrangement comprises a pre-fan filter located in the cleaning path of the air flow downstream of the dirt separating means and upstream of the fan and wherein the pre-fan filter communicates with an air outlet from the dirt separating means.

6. An arrangement as claimed in claim 5, wherein the motor is housed in a motor housing wherein the motor housing interposes the motor and the inner wall of the dirt separating means and wherein the cleaning path and the cooling path each permeate the motor housing.

7. An arrangement as claimed in claim 6, wherein the pre-fan filter has an annular cross-sectional profile normal to a central axis of the motor drive shaft, wherein the pre-fan filter is nested within the inner wall of the dirt separating means and wherein the annular cross-sectional profile surrounds the motor housing.

8. An arrangement as claimed in claim 7, wherein the cooling path crosses an interface of communication between the pre-fan filter and the air outlet from the dirt separating means.

9. A motor, fan and dirt separating means arrangement for a vacuum cleaner, the arrangement comprising:
a motor with a drive shaft;
a fan coupled to the motor for generating air flow; and
a dirt separating means located in a cleaning path of the air flow generated by the fan, the cleaning path being between a dirty air inlet and the fan,
wherein the motor is located in a cooling path of the air flow generated by the fan, the cooling path being between a clean air inlet and the fan, wherein the air flow through the cleaning path is substantially greater than through the cooling path in normal operating conditions and wherein the cleaning path and the cooling path of the air flow combine where the cleaning path is downstream of the dirt separating means and upstream of the fan and the cooling path is downstream of the motor and upstream of the fan;
wherein the motor is nested within an inner wall of the dirt separating means;
wherein the arrangement comprises supplementary means for augmenting air flow in the cooling path about an opposite end of the motor to the fan; and
wherein the supplementary means for augmenting air flow in the cooling path comprises a second fan coupled to an opposite end the drive shaft to the fan.

10. A motor, fan and dirt separating means arrangement for a vacuum cleaner, the arrangement comprising:
a motor with a drive shaft;
a fan coupled to the motor for generating air flow; and
a dirt separating means located in a cleaning path of the air flow generated by the fan, the cleaning path being between a dirty air inlet and the fan,
wherein the motor is located in a cooling path of the air flow generated by the fan, the cooling path being between a clean air inlet and the fan, wherein the air flow through the cleaning path is substantially greater than through the cooling path in normal operating conditions and wherein the cleaning path and the cooling path of the air flow combine where the cleaning path is downstream of the dirt separating means and upstream of the fan and the cooling path is downstream of the motor and upstream of the fan;
wherein the motor is nested within an inner wall of the dirt separating means;
wherein the arrangement comprises supplementary means for augmenting air flow in the cooling path about an opposite end of the motor to the fan;
wherein the arrangement comprises a pre-fan filter located in the cleaning path of the air flow downstream of the dirt separating means and upstream of the fan and wherein the pre-fan filter communicates with an air outlet from the dirt separating means;
wherein the motor is housed in a motor housing wherein the motor housing interposes the motor and the inner wall of the dirt separating means and wherein the cleaning path and the cooling path each permeate the motor housing;
wherein the pre-fan filter has an annular cross-sectional profile normal to a central axis of the motor drive shaft, wherein the pre-fan filter is nested within the inner wall of the dirt separating means and wherein the annular cross-sectional profile surrounds the motor housing;
wherein the cooling path crosses an interface of communication between the pre-fan filter and the air outlet from the dirt separating means; and
wherein the cooling path crosses at four gaps in the interface of communication between the pre-fan filter and the air outlet, wherein the clean air inlet comprises four clean air inlet ports through an external wall of the dirt separating means, and wherein the four clean air inlet ports and the four gaps are axially aligned at equiangular intervals about the central axis, wherein the cooling path permeates the motor housing at four slots arranged about said opposite end of the motor and wherein the four slots in the motor housing are axially aligned with the four clean air inlet ports and the four gaps.

11. An arrangement as claimed in claim 10, wherein the dirt separating means comprises a cyclonic separation apparatus comprising:
a first cyclonic separating unit comprising a hollow substantially cylindrical dirt container with a dirty air inlet arranged tangentially through a side of the dirt container; and
a second cyclonic separating unit comprising a plurality of cyclones arranged in a circular array about the inner wall wherein the dirt container is arranged about the circular array of cyclones and concentric with the central axis, wherein the second cyclonic separating unit is located in the cleaning path of the air flow downstream of the first cyclonic separating unit and wherein the second cyclonic separating unit has higher separation efficiency than the first cyclonic separating unit.

12. An arrangement as claimed in claim 11, wherein the cyclonic separating apparatus comprises a substantially cylindrical intermediate wall arranged within the dirt container and wherein the intermediate wall has an air permeable wall arranged as an air outlet from the first cyclonic separating unit.

13. An arrangement as claimed in claim 12, wherein the intermediate wall is arranged about the air inlet ports of the circular array of cyclones and wherein the air outlet from the first cyclonic separating unit is ducted to the air inlet ports of the cyclones.

* * * * *